US012646379B2

(12) United States Patent
Marks et al.

(10) Patent No.: US 12,646,379 B2
(45) **Date of Patent: *Jun. 2, 2026**

(54) SYSTEM AND METHOD OF PROVIDING A HOLD AND SPIN FEATURE GAME WITH DYNAMICALLY VARIABLE SYMBOL VALUES

(71) Applicant: Aristocrat Technologies, Inc. (ATI), Las Vegas, NV (US)

(72) Inventors: Daniel Marks, Decatur, GA (US); Hua Xu, Marietta, GA (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,346

(22) Filed: Apr. 17, 2023

(65) Prior Publication Data

US 2023/0260370 A1 Aug. 17, 2023

Related U.S. Application Data

(63) Continuation of application No. 16/836,296, filed on Mar. 31, 2020, now Pat. No. 11,640,748.

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/34* (2013.01)

(58) Field of Classification Search
CPC ... G07F 17/3267; G07F 17/3213; G07F 17/34
See application file for complete search history.

(56) References Cited

U.S. PATENT DOCUMENTS 5,584,763 A * 12/1996 Kelly ........................ A63F 5/04 463/16
7,056,215 B1 6/2006 Olive
7,563,163 B2 7/2009 Crumby
(Continued)

FOREIGN PATENT DOCUMENTS

AU 2015210489 A1 2/2016
AU 2018203481 A1 2/2019
(Continued)

OTHER PUBLICATIONS

Slot Machine Wins—A full screen big win! Winning at the local! Sparkling Night life & more slot machine wins Uploaded by Albert's Slot Channel—Slot Machine Videos Uploaded on Apr. 12, 2019 https://www.youtube.com/watch?v=88AnX_fAjjM (Year: 2019).*
(Continued)

*Primary Examiner* — Jeffrey K Wong
(74) *Attorney, Agent, or Firm* — Weaver Austin Villeneuve & Sampson LLP

(57) ABSTRACT

A feature game presented on a gaming machine after a base game includes symbols having corresponding values which may be incremented based at least in part on a random determination during an instance of the feature game. Such symbols and their associated values may persist through one or more subsequent instances of the feature game. In some embodiments values of individual symbols may be incremented multiple times.

19 Claims, 26 Drawing Sheets

(56) References Cited

U.S. PATENT DOCUMENTS 7,819,741 B1 10/2010 Luciano
8,360,851 B2 1/2013 Aoki
8,460,092 B1* 6/2013 Slomiany .............. G07F 17/326 463/19
8,821,256 B2 9/2014 Okada
9,424,720 B2 8/2016 Suda
9,928,691 B2 3/2018 Olive
10,395,480 B2 8/2019 Wortmann
10,600,286 B2 3/2020 Marks
2001/0031659 A1* 10/2001 Perrie ................. A63F 3/00643 463/18
2003/0216165 A1 11/2003 Singer
2004/0137982 A1 7/2004 Cuddy
2005/0017448 A1* 1/2005 Scibetta .............. A63F 3/00157 463/9
2005/0096130 A1 5/2005 Mullins
2005/0215314 A1* 9/2005 Schneider ........... G07F 17/3244 463/26
2005/0239538 A1* 10/2005 Dixon ..................... G07F 17/34 463/20
2006/0063584 A1 3/2006 Brill
2006/0189369 A1 8/2006 Taylor
2009/0042652 A1 2/2009 Baerlocher
2009/0075722 A1 3/2009 Louie
2009/0124371 A1* 5/2009 Gilmore .............. G07F 17/3258 463/27
2009/0215515 A1 8/2009 Meyer
2009/0239634 A1 9/2009 Nguyen
2010/0227668 A1* 9/2010 Scibetta .............. G07F 17/3293 463/25
2010/0234092 A1 9/2010 Gomez
2011/0105218 A1 5/2011 Anderson
2012/0094738 A1 4/2012 Aoki
2012/0178517 A1 7/2012 Montenegro
2012/0309487 A1 12/2012 Yoshikawa
2013/0079118 A1 3/2013 Ellis
2014/0274292 A1 9/2014 Suda
2014/0274316 A1 9/2014 Elias
2014/0323198 A1 10/2014 Tuck
2015/0154834 A1 6/2015 Grace
2015/0287286 A1* 10/2015 Beria .................. G07F 17/3262 463/20
2015/0348371 A1* 12/2015 Blazevic ............... G07F 17/322 463/11
2015/0356813 A1 12/2015 Mead
2015/0363998 A1 12/2015 Comeau
2016/0042597 A1 2/2016 Olive
2016/0042614 A1 2/2016 Kojima
2016/0086430 A1 3/2016 Kitamura
2016/0104344 A1 4/2016 Meyer
2016/0163152 A1 6/2016 Ko
2016/0253873 A1 9/2016 Olive
2016/0321875 A1 11/2016 Tessmer
2016/0358424 A1* 12/2016 Thomas .............. G07F 17/3272
2017/0032610 A1 2/2017 Loz
2017/0046913 A1 2/2017 Fong
2017/0061743 A1 3/2017 Itagaki
2017/0092042 A1 3/2017 Nakamura
2017/0146906 A1 5/2017 Nakajima
2017/0154498 A1 6/2017 Olive
2018/0025588 A1 1/2018 Ma
2018/0061176 A1 3/2018 Berman
2018/0089948 A1 3/2018 Olsen
2018/0130298 A1 5/2018 Koshorek
2018/0130303 A1 5/2018 Lamb
2018/0130308 A1 5/2018 Berman
2018/0232999 A1 8/2018 Comeau
2018/0268655 A1 9/2018 Olive
2019/0051097 A1 2/2019 Marks
2019/0051108 A1 2/2019 Marks
2019/0051109 A1 2/2019 Marks
2019/0051113 A1 2/2019 Marks
2019/0188966 A1 6/2019 Chan
2020/0051381 A1 2/2020 Tam
2020/0074814 A1 3/2020 Marks
2020/0184766 A1 6/2020 Halvorson
2020/0279457 A1 9/2020 Chesworth
2021/0019996 A1 1/2021 Halvorson

FOREIGN PATENT DOCUMENTS

AU 2018220052 A1 2/2019
AU 2019264594 A1 12/2019

OTHER PUBLICATIONS

Australian Examination Report No. 1 issued in App. No. AU2018220052, dated Dec. 2, 2022, 7 pages.
Office Action dated Oct. 4, 2019 for U.S. Appl. No. 16/059,769 (pp. 1-19).
Notice of Allowance dated Mar. 3, 2020 for U.S. Appl. No. 16/059,629 (pp. 1-10).
Office Action dated Oct. 4, 2019 for U.S. Appl. No. 16/059,687 (pp. 1-20).
Office Action dated Oct. 4, 2019 for U.S. Appl. No. 16/059,596 (pp. 1-14).
Notice of Allowance dated Jan. 24. 2020 for U.S. Appl. No. 16/059,596 (pp. 1-16).
Corrected Notice of Allowability dated Apr. 21, 2020 for U.S. Appl. No. 16/059,687 (pp. 1-3).
U.S. Office Action dated Oct. 4, 2019, in U.S. Appl. No. 16/059,687.
U.S. Office Action dated Oct. 4, 2019, in U.S. Appl. No. 16/059,769.
U.S. Appl. No. 16/558,735, filed Sep. 3, 2019, Inventor Daniel Marks.
U.S. Appl. No. 16/566,446, filed Sep. 10, 2019, Inventor Daniel Marks.
U.S. Office Action dated Oct. 4, 2019, in U.S. Appl. No. 16/059,596.
Notice of Allowance dated Mar. 17, 2020, for U.S. Appl. No. 16/059,687 (pp. 1-15).
Notice of Allowance dated Mar. 16, 2020, for U.S. Appl. No. 16/059,769 (pp. 1-7).
Corrected Notice of Allowability dated Mar. 25, 2020, for U.S. Appl. No. 16/059,629 (pp. 1-2).
Corrected Notice of Allowability dated Apr. 1, 2020, for U.S. Appl. No. 16/059,769 (pp. 1-2).
U.S. Notice of Allowance dated Mar. 3, 2020, in U.S. Appl. No. 16/059,629.
Unpublished U.S. Appl. No. 16/566,446, filed Sep. 10, 2019, Inventor Marks et al.
Unpublished U.S. Appl. No. 16/818,973, filed Mar. 13, 2020, Inventor Marks.
Office Action dated Oct. 4, 2019 for U.S. Appl. No. 16/059,629 (pp. 1-16).
Australian Examination Report No. 1 for App. No. AU2019264594, dated Nov. 30, 2020, 5 pages.
Australian Examination Report No. 1 for App. No. AU2019264644, dated Jan. 7, 2021, 7 pages.
Office Action dated Mar. 26, 2021 for U.S. Appl. No. 16/818,973 (pp. 1-5).
Notice of Allowance dated May 3, 2021 for U.S. Appl. No. 16/818,973 (pp. 1-9).
Office Action (Non-Final Rejection) dated Oct. 4, 2021 for U.S. Appl. No. 16/824,574 (pp. 1-6).
Office Action (Non-Final Rejection) dated Dec. 10, 2021 for U.S. Appl. No. 16/843,440 (pp. 1-6).
Office Action (Non-Final Rejection) dated Dec. 15, 2021 for U.S. Appl. No. 16/858,396 (pp. 1-13).
Office Action (Non-Final Rejection) dated Dec. 15, 2021 for U.S. Appl. No. 16/848,134 (pp. 1-10).
Office Action (Notice of Allowance and Fees Due (PTOL-85)) dated Feb. 28, 2022 for U.S. Appl. No. 16/843,440 (pp. 1-5).
Office Action (Notice of Allowance and Fees Due (PTOL-85)) dated Mar. 9, 2022 for U.S. Appl. No. 16/843,440 (pp. 1-4).
Office Action (Notice of Allowance and Fees Due (PTOL-85)) dated Jan. 14, 2022 for U.S. Appl. No. 16/824,574 (pp. 1-5).

(56) References Cited

OTHER PUBLICATIONS

Office Action (Notice of Allowance and Fees Due (PTOL-85)) dated Jan. 27, 2022 for U.S. Appl. No. 16/824,574 (pp. 1-2).
Office Action (Non-Final Rejection) dated Mar. 8, 2022 for U.S. Appl. No. 16/836,296 (pp. 1-26).
Office Action (Notice of Allowance and Fees Due (PTOL-85)) dated Mar. 24, 2022 for U.S. Appl. No. 16/858,396 (pp. 1-7).
Office Action (Notice of Allowance and Fees Due (PTOL-85)) dated May 3, 2022 for U.S. Appl. No. 16/824,574 (pp. 1-2).
Office Action (Notice of Allowance and Fees Due (PTOL-85)) dated Jun. 8, 2022 for U.S. Appl. No. 16/843,440 (pp. 1-7).
Office Action (Notice of Allowance and Fees Due (PTOL-85)) dated Jun. 27, 2022 for U.S. Appl. No. 16/848,134 (pp. 1-7).
Office Action (Final Rejection) dated Oct. 5, 2022 for U.S. Appl. No. 16/836,296 (pp. 1-18).
Office Action (Notice of Allowance and Fees Due (PTOL-85)) dated Feb. 7, 2023 for U.S. Appl. No. 16/836,296 (pp. 1-9).
Australian Examination Report No. 1 issued in App. No. AU2022200079, dated Feb. 24, 2023, 5 pages.
Office Action (Non-Final Rejection) dated Sep. 21, 2023 for U.S. Appl. No. 17/810,761 (pp. 1-6).
Office Action (Non-Final Rejection) dated Sep. 21, 2023 for U.S. Appl. No. 17/812,962 (pp. 1-6).
Office Action (Notice of Allowance and Fees Due (PTOL-85)) dated Nov. 17, 2023 for U.S. Appl. No. 17/812,962 (pp. 1-5).
Office Action (Notice of Allowance and Fees Due (PTOL-85)) dated Jan. 4, 2024 for U.S. Appl. No. 17/810,761 (pp. 1-8).
Office Action (Notice of Allowance and Fees Due (PTOL-85)) dated Mar. 1, 2024 for U.S. Appl. No. 17/812,962 (pp. 1-2).
Notice of Allowance dated Mar. 13, 2024 for U.S. Appl. No. 17/810,761 (pp. 1-2).
Office Action (Notice of Allowance and Fees Due (PTOL-85)) dated Mar. 13, 2024 for U.S. Appl. No. 17/810,761 (pp. 1-2).
Notice of Allowance dated Mar. 28, 2024 for U.S. Appl. No. 17/810,761 (pp. 1-2).
Australian Examination Report No. 1 issued in App. No. AU2019200768, dated May 6, 2024, 3 pages.
Office Action (Non-Final Rejection) dated Sep. 24, 2024 for U.S. Appl. No. 18/612,466 (pp. 1-6).
Australian Examination Report No. 1 issued in App. No. AU2023274211, dated Dec. 4, 2024, 3 pages.
Office Action (Notice of Allowance and Fees Due (PTOL-85)) dated Jan. 3, 2025 for U.S. Appl. No. 18/612,466 (pp. 1-8).
Australian Examination Report No. 1 issued in App. No. AU2024201253 dated Mar. 18, 2025, 2 pages.
Australian Examination Report No. 2 issued in App. No. AU2019200768, dated May 5, 2025, 3 pages.
Australian Examination Report No. 1 issued in App. No. AU2021202024, dated Feb. 24, 2026 (pp. 1-6).

* cited by examiner

SYSTEM AND METHOD OF PROVIDING A HOLD AND SPIN FEATURE GAME WITH DYNAMICALLY VARIABLE SYMBOL VALUES

RELATED APPLICATIONS

This application is a continuation of U.S. patent application Ser. No. 16/836,296, having a filing date of Mar. 31, 2020, the contents of the above-identified application is hereby incorporated herein by reference in its entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

In existing gaming methods and systems, a base game is commonly presented to the player, and optionally, a feature game will be may be triggered, for example, after conclusion of the base game results in a base game outcome. Such a feature game typically presents players an additional opportunity, or a greater opportunity, to win different awards or larger awards than may be wondering the base game. In some examples, such a feature game can offer different gameplay from that available during the base game.

The popularity of such gaming machines with players is heavily dependent on the entertainment value of the machine relative to other gaming options and the player's gambling experience. Operators of gaming businesses therefore strive to provide the most entertaining, engaging, and exciting machines to attract customers to use the machines while also providing a machine that allows the player to enjoy their gambling experience. The selective presentation of such a feature game, with different or increased award opportunities can provide a relatively enhanced gambling experience. Both the gameplay, and the presentation of the game to the player, can also significantly impact the quality the player's gambling experience. As a result, improvements to either aspect of the game can result in a better experience for the player.

SUMMARY

An embodiment provides a gaming system, including: a player interface; a display system including one or more display devices; and a control system including one or more processors, the control system executing instructions which cause the control system to: determine a base game outcome and corresponding display symbols, the base game outcome including a feature game trigger event; and in response to the feature game trigger event, initiate a feature game having multiple instances; control the display system to present the multiple instances of the feature game; for each instance of the feature game, determine an outcome and corresponding display symbols for the instance, the display symbols selected from a feature game symbol set including configurable symbols and non-configurable symbols, wherein the configurable symbols include value symbols having a corresponding value; control the display to present a respective array of display symbols as multiple reels of display symbols at a selected number of symbol positions on a display screen, wherein the value symbols are displayed with the corresponding value, control the display to present an interval of moving display symbols, and a subsequent display of display symbols fixed at respective symbol positions representing the determined outcome, and control the display system to hold each value symbol displayed at an outcome of the instance in the corresponding display symbol position for a subsequent instance of the feature game; in response to determining that the outcome for an instance includes one or more value symbols, determine whether to increase the corresponding value of the one or more value symbols; for each value symbol for which a determination is made to increment the corresponding value of the value symbol, determine whether a corresponding value of the individual value symbol was previously incremented, in response to such determination, select a first group of value increments from multiple groups of value increments; select a value increment from the selected first group of multiple value increments, and update the corresponding value of the first value symbol to a second corresponding value in accordance with the selected value increment.

Another embodiment is a gaming device, including: a player interface; a display system including one or more display devices; and a control system including one or more processors, the control system executing instructions which cause the control system to: determine a base game outcome and corresponding display symbols, the display symbols selected from a base game symbol set; control the display system to present the base game outcome; determine that a first feature game trigger condition exists when the base game outcome includes at least one a first trigger symbol; in response to the first feature game trigger condition, initiate a first feature game including multiple instances; control the display system to present the first feature game; and wherein for each instance of the first feature game, the instructions executed by the control system will: determine an outcome and corresponding display symbols for the instance, the display symbols selected from a feature game symbol set including configurable symbols and non-configurable symbols, wherein multiple of the configurable symbols are value symbols having a respective corresponding value; control the display system to hold each displayed value symbol at its corresponding display symbol position for a subsequent instance of the first feature game; determine that an outcome of an instance of the first feature game includes at least a second trigger symbol establishing a second trigger condition, and in response to the second trigger condition initiate an enhanced feature game having multiple instances; control the display system to present the enhanced feature game; wherein for each instance of the enhanced feature game the instructions executed by the control system further cause the control system to, determine an outcome and corresponding display symbols for the instance, the display symbols selected from an enhanced feature game symbol set including configurable symbols and non-configurable symbols, wherein the configurable symbols include value symbols having respective corresponding values; control the display system to hold any displayed value symbol at its corresponding display symbol position for a subsequent instance of the enhanced feature game; in response to determining that the outcome for an instance includes at least at least a first value symbol, determine whether to increase the corresponding value of the first value symbol; and in response to a determination to increment the corresponding value of the first value symbol, determine whether a corresponding value of the first value symbol was previously incremented, in response to such determination, select a group including multiple possible value increments; select a value increment from the selected tier, and associate the selected value increment with the first value symbol.

A further embodiment is a gaming device, including: a player interface; a display system including one or more display devices; and a control system including one or more processors, the control system executing instructions which cause the control system to: determine a base game outcome and corresponding display symbols, the display symbols selected from a base game symbol set; control the display system to present the base game outcome; determine that a first feature game trigger condition exists when the base game outcome includes at least a first trigger symbol; determine to initiate either a first feature game or an enhanced feature game, wherein both the first feature game and the second feature game include multiple instances; in response to a determination to initiate the enhanced feature game, control the display system to present the enhanced feature game; and wherein for each instance of the enhanced feature game, the instructions executed by the control system will: determine an outcome and corresponding display symbols for the instance, the display symbols selected from a feature game symbol set including configurable symbols and non-configurable symbols, wherein multiple of the configurable symbols are value symbols having a corresponding value; in response to determining that the outcome for an instance includes at least at least a first value symbol, determine whether to increase the corresponding value of the first value symbol; in response to determining to increment the corresponding value of the first value symbol, determine whether a corresponding value of the first value symbol was previously incremented, and in response to such determination, select a tier including multiple possible value increments; select a value increment from the selected tier, and associate the selected value increment with the first value symbol. A further embodiment is a method of presenting a player graphic interface for a gaming machine, including: executing instructions stored on one or more non-transitory storage media to display multiple instances of a base game and of a feature game on a display system of a gaming machine, the multiple instances of the base game and of the feature game displayed after respective user inputs to the gaming machine; wherein displaying each of the multiple instances of the base game, includes, displaying a respective array of first display symbols as multiple reels of display symbols and at a selected number of symbol positions on a display screen, wherein the first display symbols include both configurable symbols and non-configurable symbols, displaying the value symbols with the corresponding value, and displaying a period of moving symbols, followed by instance outcome having display symbols fixed at respective symbol positions; after a final instance of the base game, displaying a base game outcome including a trigger symbol; after display of the base game outcome including a trigger symbol, sequentially displaying multiple instances of a feature game on the display system of the gaming machine, wherein displaying each of the multiple instances of the feature game includes, displaying a respective array of second display symbols at the selected number of symbol positions on the display screen, wherein the second display symbols include both configurable symbols and non-configurable symbols, the configurable symbols including value symbols with a corresponding value, displaying value symbols with the respective corresponding value, and displaying a period of moving symbols, followed by instance outcome having display symbols fixed at respective symbol positions; during an instance of the feature game, displaying one or more value symbols at respective outcome positions of the selected number of symbol positions, and during all following instances of the feature game displaying the one or more value symbols at the same respective outcome position; during one instance of the feature game during which one or more value symbols is displayed, further displaying a first incremental value to a first displayed corresponding value of a first value symbol, and subsequently displaying the first value symbol with a second displayed corresponding value equal to the original displayed corresponding value modified by the first incremental value; during a subsequent instance of the feature game relative to the one instance, further displaying a second incremental value to the second displayed corresponding value of the first value symbol, and subsequently displaying the first value symbol with a third displayed corresponding value equal to the second displayed corresponding value modified by the displayed second incremental value.

A further embodiment is a gaming device, including: a player interface; a display system including one or more display devices; and a control system including one or more processors, the control system executing instructions which cause the control system to: determine a base game outcome and corresponding display symbols, the display symbols selected from a base game symbol set; control the display system to present the base game outcome; determine that a first feature game trigger condition exists when the base game outcome includes at least one trigger symbol; control the display system to present a feature game having multiple instances; and for each instance of the feature game, determine an outcome and corresponding display symbols for the instance, the display symbols selected from a feature game symbol set including configurable symbols and non-configurable symbols, wherein the configurable symbols include value symbols, and wherein the determined outcome includes at least one value symbol; control the display system to display the corresponding display symbols for the instance outcome at respective display positions, including holding each displayed configurable symbol at its corresponding display symbol position for a subsequent instance of the feature game; in response to determining that the outcome for an instance includes at least a first value symbol having a corresponding value, determine whether to increase the corresponding value of at least the first value symbol; and in response to determining to increment the corresponding value of at least the first value symbol, determine whether a corresponding value of the at least the first value symbol was previously incremented, in response to such determination, select a first group of value increments from multiple groups of value increments; select a value increment from the selected first group of multiple value increments, and associate the selected value increment with the first value symbol.

A further embodiment is a method of operating a gaming device including a player interface, a display system including one or more display devices, and a control system including one or more processors and executing instructions which cause the control system to control game operations, including: determining a base game outcome and corresponding display symbols, the display symbols selected from a base game symbol set; controlling the display system to present the base game outcome; determining that a first feature game trigger condition exists when the base game outcome includes at least one trigger symbol; controlling the display system to present a feature game having multiple instances; and for each instance of the feature game, determining an outcome and corresponding display symbols for the instance, the display symbols selected from a feature game symbol set including configurable symbols and non-configurable symbols, the configurable symbols including value symbols having respective corresponding values; controlling the display system to display the corresponding display symbols for the instance outcome at respective display symbol positions, and to hold each displayed value symbol at its corresponding display symbol position for each remaining instance of the feature game; in response to determining that the outcome for an instance includes at least a first value symbol, determining whether to increase the corresponding value of at least the first value symbol; in response to determining to increment the corresponding value of at least the first value symbol, determining whether a corresponding value of the at least the first value symbol was previously incremented, and in response to such determination, select a first group of value increments from multiple groups of value increments; selecting a value increment from the selected first group of multiple value increments, and associating the selected value increment with the first value symbol.

A further embodiment includes one or more non-transitory storage devices having instructions stored thereon wherein the instructions, when executed cause one or more devices to perform operations, including: determining a base game outcome and corresponding display symbols, the display symbols selected from a base game symbol set; controlling the display system of a gaming machine to present the base game outcome; determining that a first feature game trigger condition exists when the base game outcome includes at least one trigger symbol; controlling the display system of the gaming machine to present a feature game having multiple instances; and for each instance of the feature game, determining an outcome and corresponding display symbols for the instance, the display symbols selected from a feature game symbol set including configurable symbols and non-configurable symbols, wherein the configurable symbols include value symbols having a respective corresponding value; controlling the display system to display the corresponding display symbols for the instance outcome at respective display symbol positions, and to hold any displayed value symbol at its corresponding display symbol position for further instances of the feature game; in response to determining that the outcome for an instance of the feature game includes at least a first value symbol having a corresponding value, determining whether to increase the corresponding value of the first value symbol; in response to determining to increment the corresponding value of at least the first value symbol, determining whether a corresponding value at least the first value symbol was previously incremented, and in response to such determination, selecting a first group of value increments from multiple groups of value increments; selecting a value increment from the selected first group of multiple value increments; and associating the selected value increment with the first value symbol.

Additional embodiments are identified in the description below; and may include only a portion (subset) of the structures or functionality of any of the above presented embodiments.

DETAILED DESCRIPTION

Figure 1:
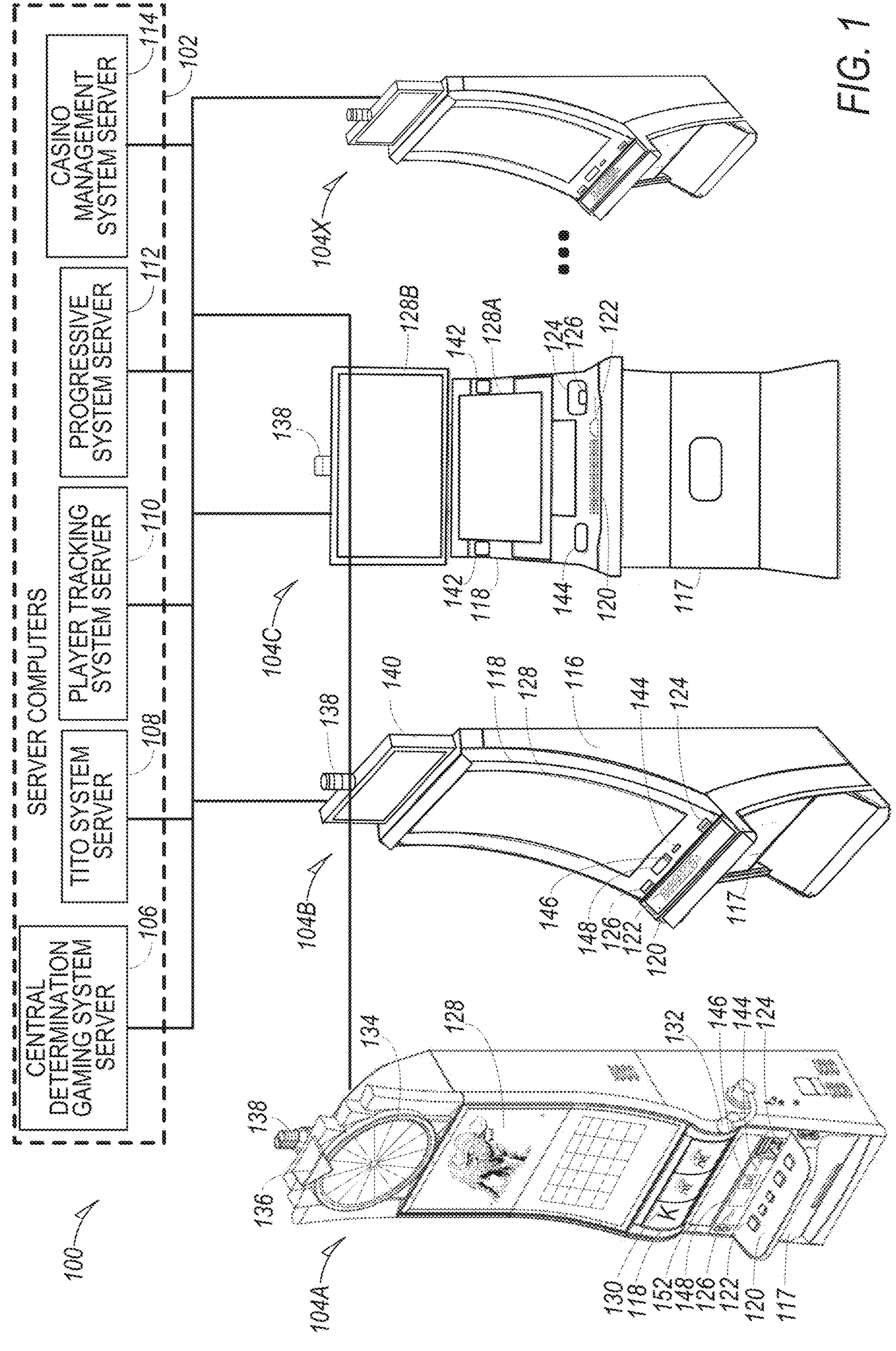
FIG. 1 is an exemplary diagram showing several electronic gaming machines EGMs networked with various gaming related servers.

Embodiments provide a gaming device, a method, a method of presenting a user interface, and a gaming system for presenting gameplay having a base game, from which a hold and spin feature game may be triggered in response to a base game outcome; in which select configurable symbols (in some examples, configurable symbols having corresponding values) may have the corresponding value dynamically incremented during one or more instances of the feature game. In various embodiments, the corresponding value may be incremented independent of any other symbols (configurable or non-configurable) that may be presented during a feature game instance.

Methods and systems are described which enable providing novel gameplay to a player through an EGM in a feature game presented subsequent to a base game. For example, a base game may first be presented to the player, and based upon a base game outcome, a feature game implementation, described herein has an "enhanced feature game," may then be presented, in which values of selected symbols during a feature game may be dynamically incremented. In some described embodiments, the base game outcome may trigger either of two forms of feature games: termed herein, for ease of reference, a "standard feature game" (not including such dynamic incrementing) and an "enhanced feature game." The terminology of "standard" and "enhanced" is used for clarity as to what form of feature game is being discussed at a time (as an alternative, for example to referring to "first" and "second" feature games, which may more easily be confused). No other distinction is implied by such designations.

In various described embodiments, at least the enhanced feature game will be implemented as a "hold and spin" spinning reel game. During multiple instances of the enhanced feature game, the multiple spinning reels will stop to display an array of display symbols at each of multiple display positions as an instance outcome. The display symbols used for the reels during the enhanced feature game include non-configurable symbols and configurable symbols. Certain of the configurable symbols will have an associated value which may be, for example, an associated number of credits. These configurable symbols having an associated value may be termed, for example, "prize on" or "what you see is what you get" (WYSIWYG) symbols. Others of the configurable symbols may include symbols that indicate one or more types of jackpots, multiplier symbols, reel modification symbols, etc.

The term "value symbol" is used herein to identify the configurable symbols having a corresponding value (such as a number of credits, or unit of currency), indicated to a player. In some embodiments, some portion of the value symbols may display the corresponding value directly on the symbol, and in such instances could also be described as "WYSIWYG symbols." In certain embodiments, the value symbols may be configured to not display the associated value or prize on them initially; and, for example, after the reels stop spinning, or after some other trigger event, the value associated with each value symbol is revealed.

Alternatively, or in addition, some portion of the value symbols may display the corresponding value through reference to an otherwise displayed value. For example, in some embodiments, the value symbols may include, for example, jackpot symbols. Such jackpot symbols may display the name of jackpot indicator (FIGS. 9A-F identify example jackpots of Mini, Maxi, Minor, Major, and Grand), indicating the corresponding value of the value symbol as one associated with the indicated jackpot (for example, the value of the jackpot, or a multiple or fraction of the value of the jackpot). In some embodiments, the value of one or more jackpots may be displayed outside of the grid of symbol positions of the game.

In some embodiments not all value symbols will be upgradable (i.e. may not be candidates for having the value incremented). In some embodiments, value symbols that are upgradable may be displayed with a different form (shape, color, etc.) relative to other value symbols. However, in some embodiments, some or all configurable symbols of a feature game configurable symbol set may also be upgradeable, in an analogous manner to the upgradable value symbols, as discussed herein. In some embodiments with additional upgradable configurable symbols, the upgradable configurable symbols may again be presented with a different form (shape, color, etc.), relative to other configurable symbols to identify their upgradability.

Embodiments described herein include optional dynamic incrementing of the corresponding value of such value symbols during an enhanced feature game. For example, when the instance outcome of the enhanced feature game includes one or more of such value symbols, those value symbols may be retained on the display, fixed in their respective symbol positions during one or more subsequent instances of the enhanced feature game. In some described embodiments, the gameplay will include only an enhanced feature game to be optionally provided after the base game outcome. While in other embodiments, either a standard feature game or the enhanced feature game may optionally be provided after the base game.

During the enhanced feature game, when an instance outcome includes one or more value symbols, a decision may be made as to one or more of those value symbols whether to increment the corresponding value of the configurable symbol. In various embodiments, this decision of whether to increment the corresponding value of the configurable symbol is made at least partially at random (potentially subject to one or more qualifying rules). For example, in various embodiments in which not all value symbols are upgradable, such a qualifying rule would include whether each displayed value symbol of the instance outcome is an upgradable value symbol qualifying for incrementing. Additionally, in various embodiments, this decision of whether to increment the corresponding value is made independent from any other displayed symbol (In other words, the decision of whether to increment the corresponding value is not dependent upon another configurable symbol displayed in the instance outcome). Additionally, the amount or value of the increment is also determined at least partially at random (again, potentially subject to one or more rules or constraints as described further below).

As described in more detail below, this added variability in the gameplay, of whether the value of any display configurable symbol will be incremented, and as to the amount of the increment if provided, provides additional incremental game objectives to a player, enhancing the player's interest in the game. Also as described in more detail below, in various embodiments, resolution of these variables may be presented to the user through a user interface in ways to inform the player of the results of the variables, and thus will of achieving incremental game objectives, thereby increasing the player's satisfaction from the game.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2A:
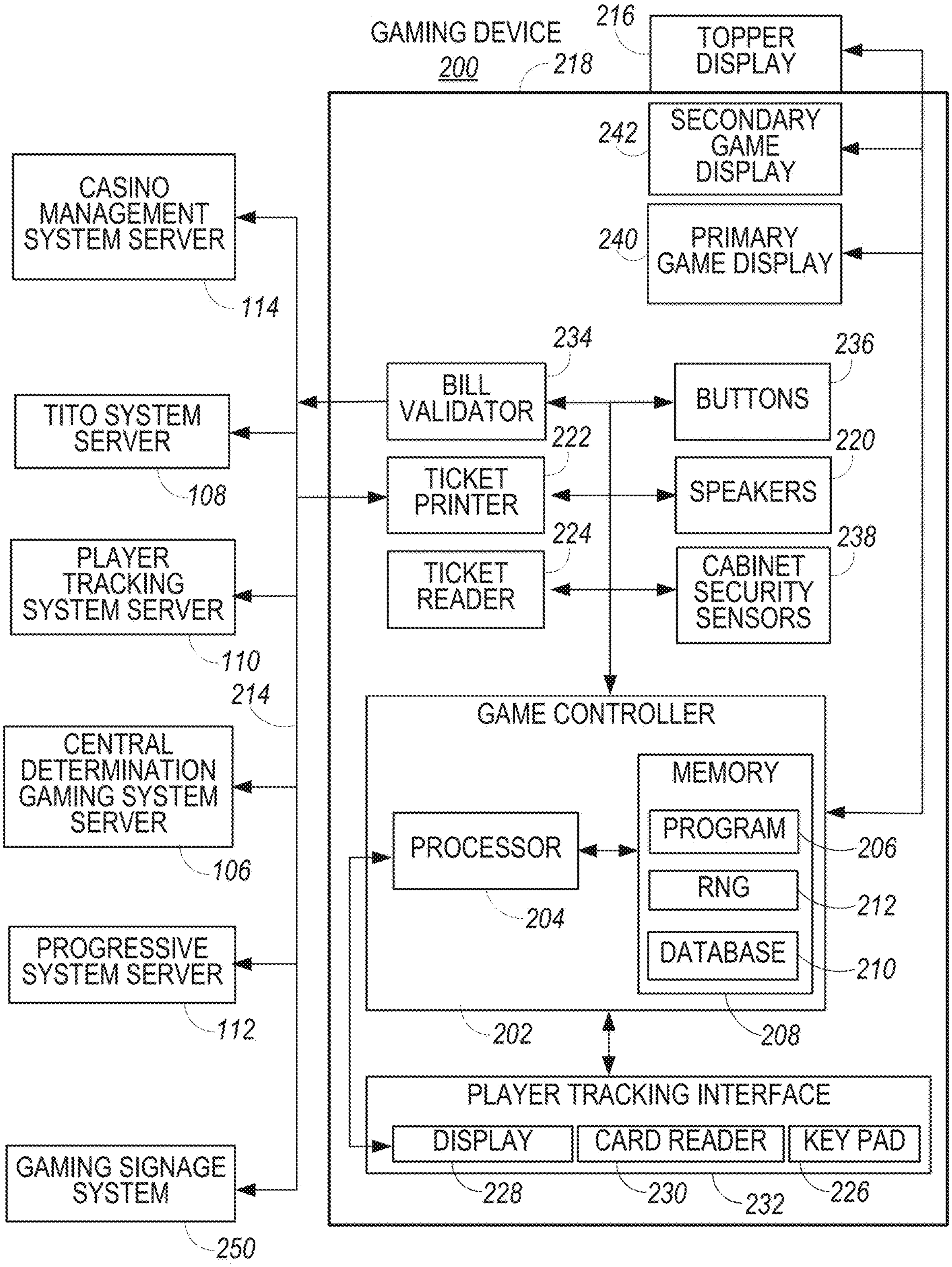
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc' model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the example gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 includes an RNG 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more embodiments, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

The lookup tables, in the form of weighted tables, can have one of many possible configurations. In general, a weighted table can be implemented as any data structure that assigns probabilities to different options, in order for one of the different options to be selected using a random number. Different options are represented in different entries of a weighted table. For example, there may be multiple possible values within each tier of the weighted table, and the multiple possible values may be unequally weighted. The probabilities for different options can be reflected in threshold values (e.g., 1<RND<=40 for option 1, 40<RND<=70 for option 2, 70<RND<=90 for option 3, and 90<RND<=100 for option 4, given four options and a random number RND where 0<RND<=100). The threshold values can represent percentages or, more generally, subranges within the range for a random number. In some example implementations, the threshold values for a weighted table are represented as count values for the respective entries of the weighted table. For example, the following table shows count values for the four options described above:

TABLE 1

Example Weighted Table

| count value | entry |
|---|---|
| 40 | <value a1, value a2, . . . > |
| 30 | <value b1, value b2, . . . > |
| 20 | <value c1, value c2, . . . > |
| 10 | <value d1, value d2, . . . > |

The sum total of the count values indicates the range of the options. Control logic can use a random number, generated between 1 and the sum total of the count values, to select one of the entries in the weighted table by comparing the random number to successive running totals. In the example shown in Table 1, if the random number is 40 or less, the first entry is selected. Otherwise, if the random number is between 41 and 70, the second entry is selected. Otherwise, if the random number is between 71 and 90, the third entry is selected. Otherwise, the last entry is selected.

The threshold values for a weighted table can be fixed and pre-determined. Or, the threshold values for a weighted table can vary dynamically (e.g., depending on bet level). Or, a weighted table can be dynamically selected (e.g., depending on bet level) from among multiple available weighted tables. Different parameters or choices during game play can use different weighted tables. Or, different combinations of parameters or choices can be combined in entries of a given weighted table.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although FIGS. 1 and 2A illustrate specific embodiments of a gaming device (e.g., gaming devices 104A-104X and 200), the disclosure is not limited to those embodiments shown in FIGS. 1 and 2. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that outputs credits from and/or loads credits onto the gaming device 104A by communicating with a player's smartphone (e.g., a digital wallet interface). Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
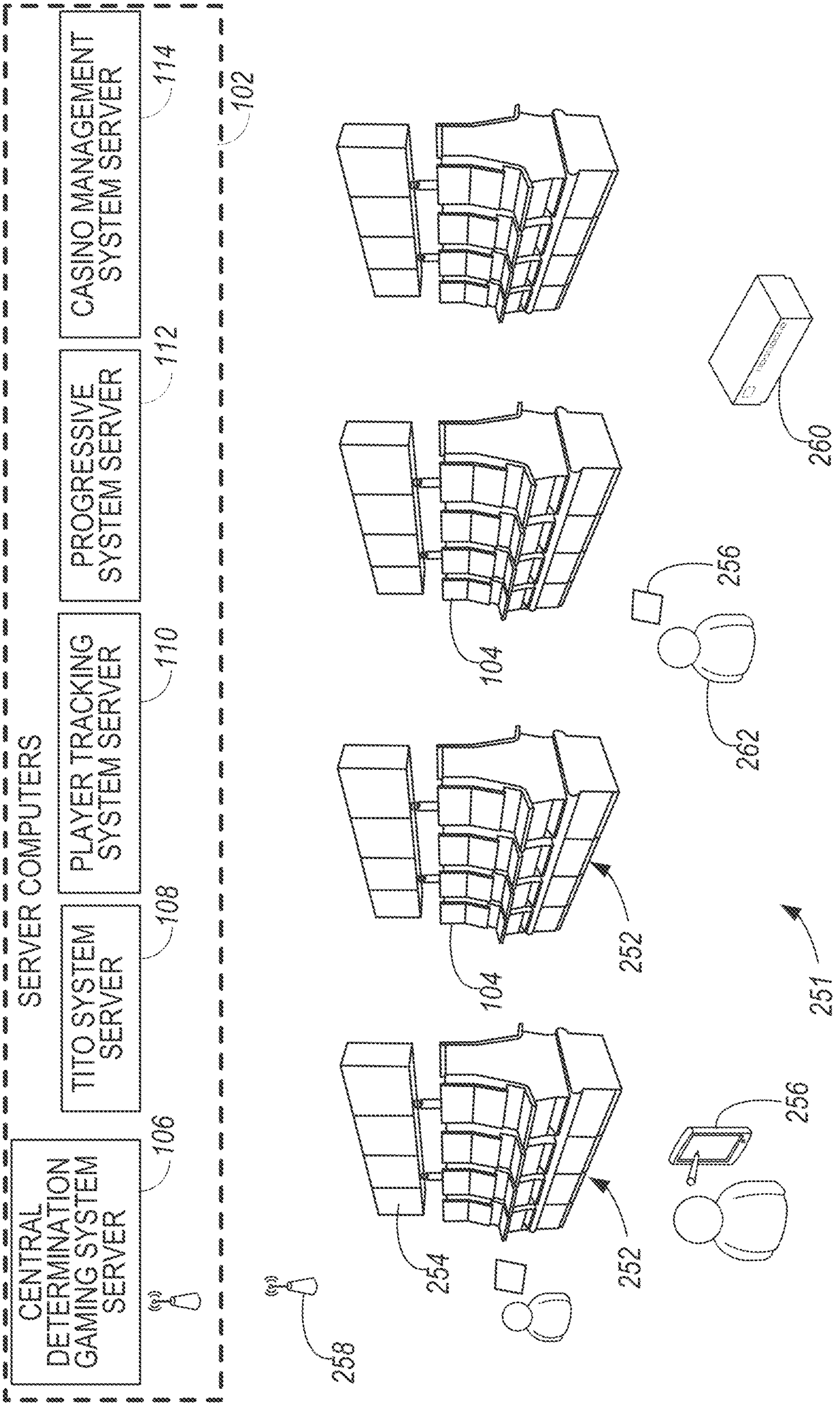
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254. According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
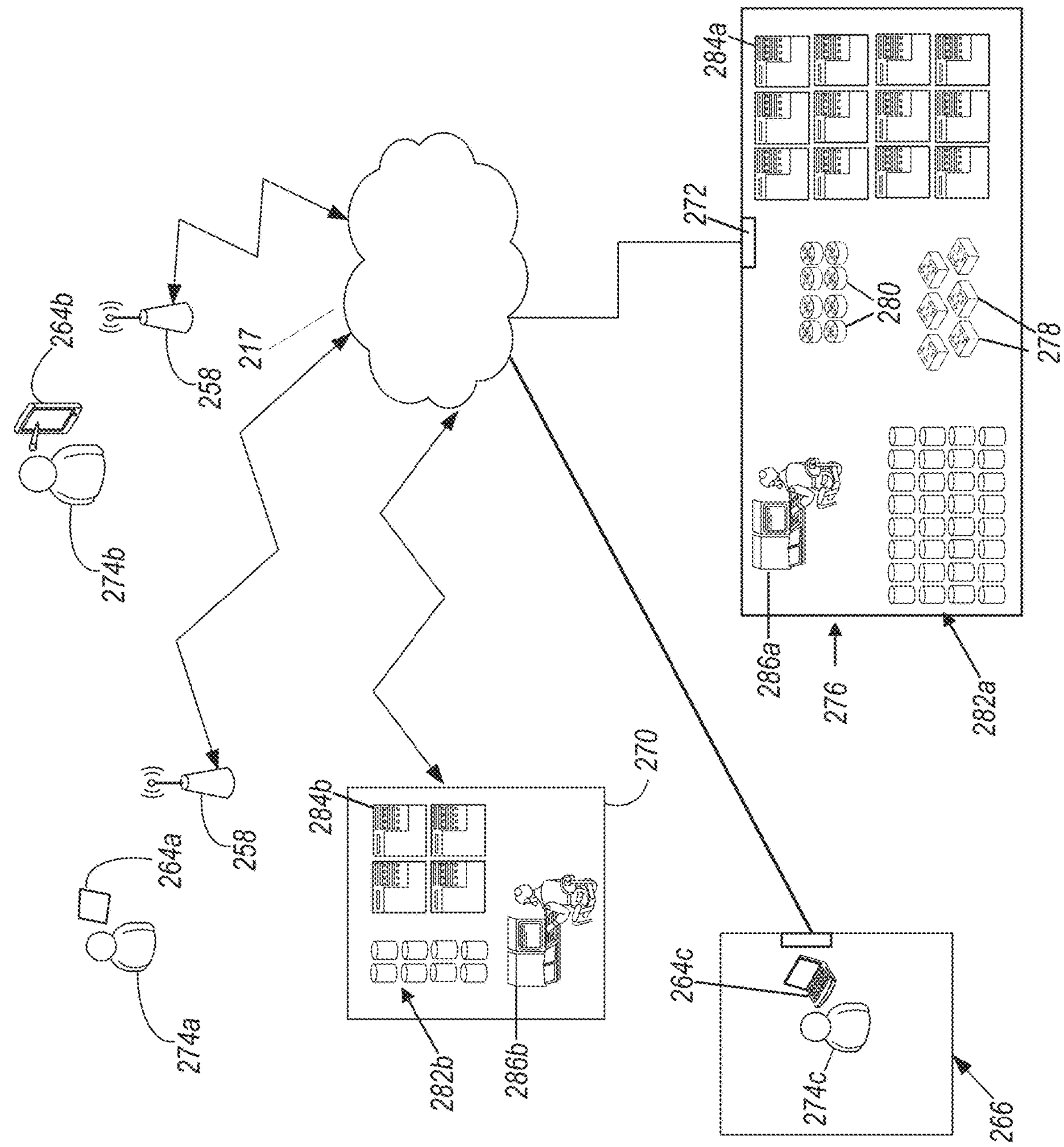
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other FIGS. presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 217. The networks 217 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 217. The gaming data center 276 is capable of communication with the networks 217 via the gateway 272. In this example, switches 278 and routers 280 are configured to provide network connectivity for devices of the gaming data center 276, including storage devices 282*a*, servers 284*a* and one or more workstations 270*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 217. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 217. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
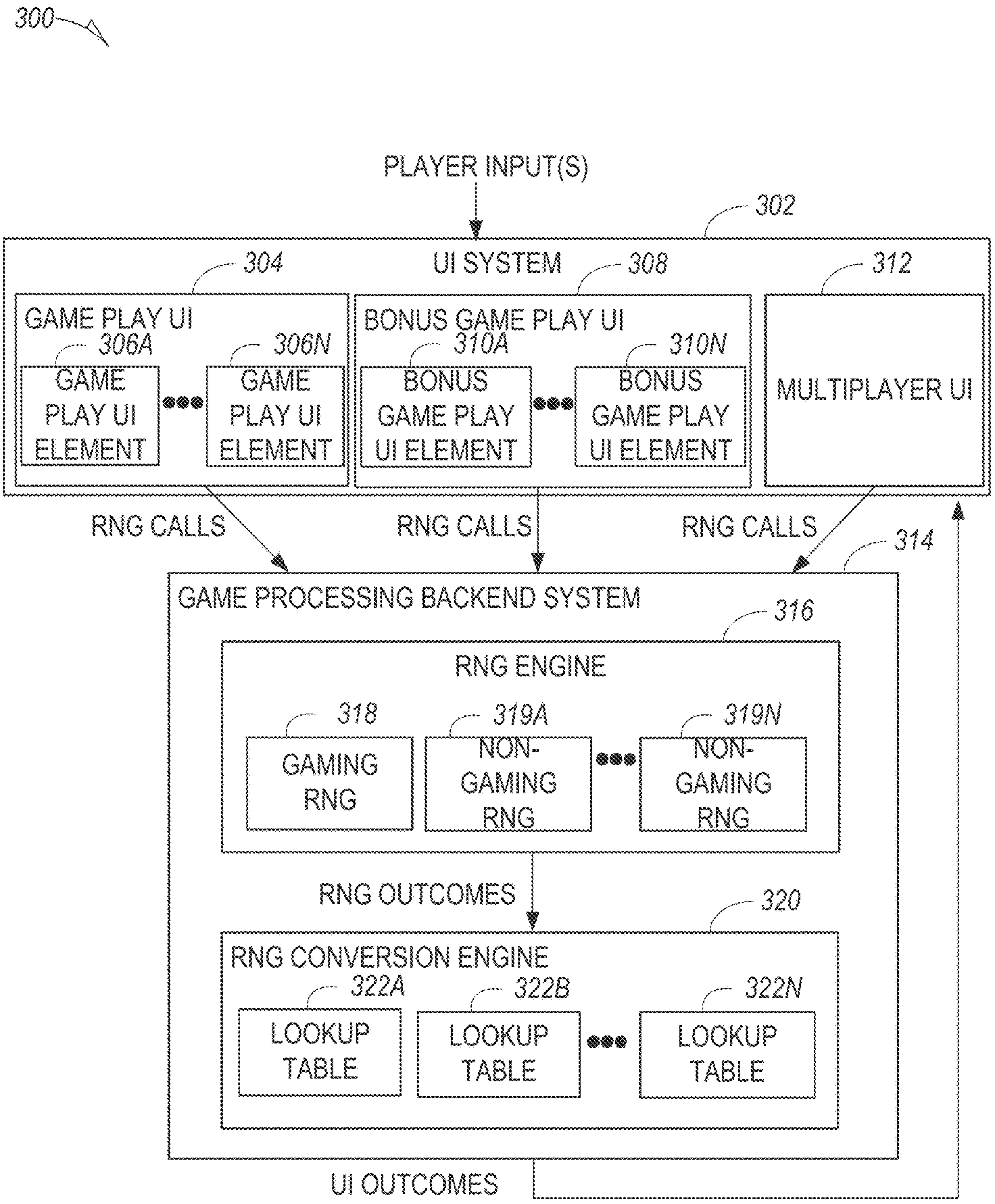
FIG. 3 illustrates, in block diagram form, an embodiment of a game processing architecture algorithm that implements a game processing pipeline for the play of a game in accordance with various embodiments described herein.

FIG. 3 illustrates, in block diagram form, an embodiment of a game processing architecture 300 that implements a game processing pipeline for the play of a game in accordance with various embodiments described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more embodiments, at least some of the game play UI element 306A-306N are similar to the bonus game play UI elements 310A-310N. In other embodiments, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 corresponds to RNG 212 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could be a cryptographic random or pseudorandom number generator (PRNG) (e.g., Fortuna PRNG) that securely produces random numbers for one or more game features. To generate random numbers, gaming RNG 318 could collect random data from various sources of entropy, such as from an operating system (OS) and/or a hardware based RNG (not shown in FIG. 3). Alternatively, non-gaming RNGs 319A-319N may not be cryptographically secure and/or be computationally less expensive. Non-gaming RNGS 319A-319N can, thus, be used to generate outcomes for non-gaming purposes. As an example, non-gaming RNGs 319A-319N can generate random numbers for such as generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Referring now to FIGS. 4A to 4D, figures depict an example flow diagram 400 of an example process for providing a base game, a standard feature game, and an enhanced feature game. To initiate play of the base game, at 402, the gaming device 200 may establish an associated credit value on a credit meter. To this end, a player may insert a physical item having monetary value into a credit input mechanism or device, such as the ticket reader 224 or bill validator 234, of the gaming device 200. In response to the received physical item, the gaming device 200 may increase a credit value of a credit meter displayed to a user (see FIG. 9A, at 907), based on the monetary value of the physical item.

At 404, the gaming device 200 may receive a wager. A player may use the player input buttons 236 to specify a value of an amount to be wagered with the wager being funded by the credit value of the credit meter. The gaming device 200 may display a message such as "Press SPIN to play" in a message box, e.g., on the primary game display 240. When the player presses a SPIN button, e.g., in the player input buttons 236, the gaming device 200, at 406, may decrease the player's credit balance by the specified wager and initiate play of a spinning reel game by spinning one or more reels.

Next, at 408, the gaming device 200 may stop the reels based on one or more random values generated by RNG 212 to obtain a base game outcome comprising a matrix, or any other formation or arrangement, of symbols. In other embodiments, the gaming device 200 may stop the reels based on information received from central determination gaming system server 106, or using a bingo game outcome.

The gaming device 200, at 410, may then determine whether the symbols displayed in the display matrix include one or more winning symbol combinations. For example, at 410, the gaming device 200 may determine if there are any winning combinations of symbols along one of the activated paylines. Winning symbol combinations along the activated paylines may result in the award of prize(s) by increasing the credit value of the credit meter based on the prize(s) for such winning combination(s).

At 412, the gaming device 200 may adjust the credit balance on the credit meter (818 in FIG. 8) in accordance with any winning symbol combinations that were identified in 406. The gaming device 200 may also control the display 240 to provide a message reflective of the game outcome. For example, when the game outcome includes one or more winning symbol combinations, the display 240 may display a message such as "Congratulations—You Won X Credits!" (where X is the number of credits won by the player). Conversely, when the game outcome does not include any winning symbol combinations, a message such as "Sorry—You Didn't Win—Spin Again" may be displayed to the player.

At 414, the gaming device 200 determines whether a feature triggering event occurred. In the depicted embodiment, the gaming device 200 determines whether either of a standard feature (S) game or an enhanced feature (E) game is triggered. Alternatively, the determination may only be of whether an enhanced feature game is triggered (i.e. without an option for an alternative form of feature game). While in other examples, the standard feature game and the enhanced feature game may be triggered in response to different game triggering events. For example, a first game triggering event may establish (alone or with other symbols), at least in part, a trigger condition for the standard feature game; while a second game triggering event establishes (alone or with other symbols), at least in part, a trigger condition for the enhanced feature game. In yet another alternative, a single feature game triggering event may occur to result in a feature game being triggered, and the selection of whether a standard feature game or the enhanced feature game is initiated may be, for example, a random selection (which may be a weighted random selection), based on a value from the RNG 212.

A game triggering event may occur, for example, on the occurrence of one or more trigger symbols, or at random, or by some other process. In various embodiments, the minimum number of trigger symbols needed to trigger the feature game may be predetermined, or randomly determined, based on a wager amount, or based on a denomination, etc. In certain embodiments, the trigger symbols may be value symbols, or may be replaced with value symbols before or after the triggering of the feature game. The replacement of a trigger symbol may occur as a simple reveal animation where the trigger symbol reveals a value associated with the symbol, similar to the value symbols having a displayed value corresponding value. Such a reveal animation may further include a change in appearance of the configurable symbol, such as a change in color, shape, or other appearance of the configurable symbol, which also may also include a text indication of the trigger condition. In an example embodiment, a game triggering event will occur when at least a predetermined quantity of, such as six, configurable symbols are displayed in the base game outcome. In some examples, the six configurable symbols may need to be one or more specific forms of configurable symbols (which could be, in some embodiments, specific forms of value symbols); In other examples, a triggering event may occur based upon less than six (specific forms of) configurable symbols, based on the presence of an additional "special" configurable symbol, which either alone, or in combination with the displayed number of additional configurable symbols, provides the triggering event. In some embodiments, different configurations of configurable symbols, or a different number of displayed configurable symbols may directly trigger an enhanced feature game, as opposed to a standard feature game. In selected embodiments, only a subset of the configurable symbols contribute to establishing a trigger event. In certain embodiments, a special configurable symbol in the base game outcome may cause a random determination, the outcome of which, may determine whether to trigger one of the feature games. The random determination may be weighted, so as to control the frequency of triggering the feature games.

If the feature game is not triggered, the process returns to 404 to allow the player to continue playing the base game. Alternatively, when a feature game trigger event occurs, the gaming device 200 may transition to a feature game as described below.

Figure 4A:
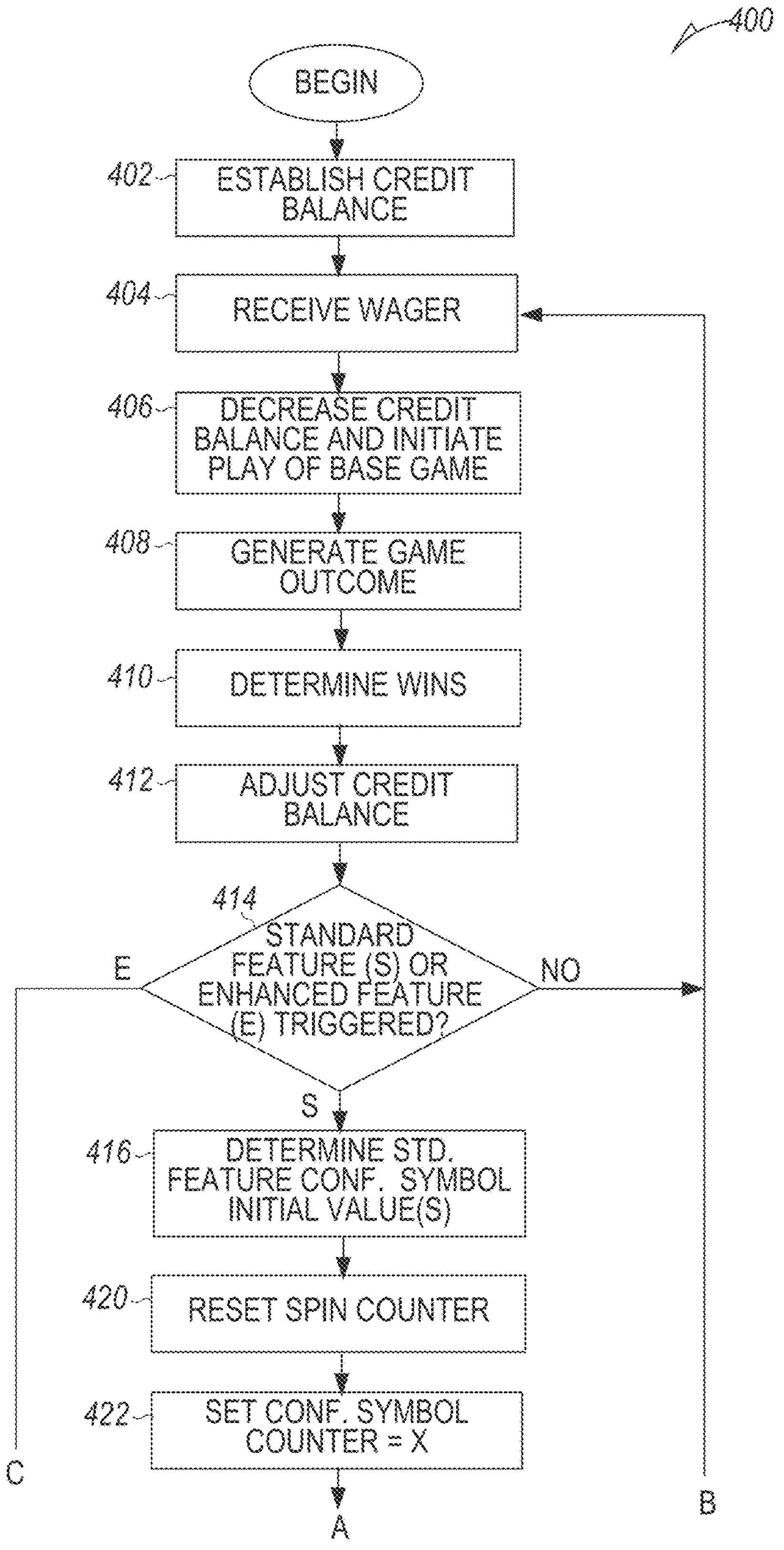
FIGS. 4A-4D depict a flow diagram for an example embodiment of a process for operating the EGM of FIG. 2A in accordance with various embodiments of the present disclosure.
Figure 4B:
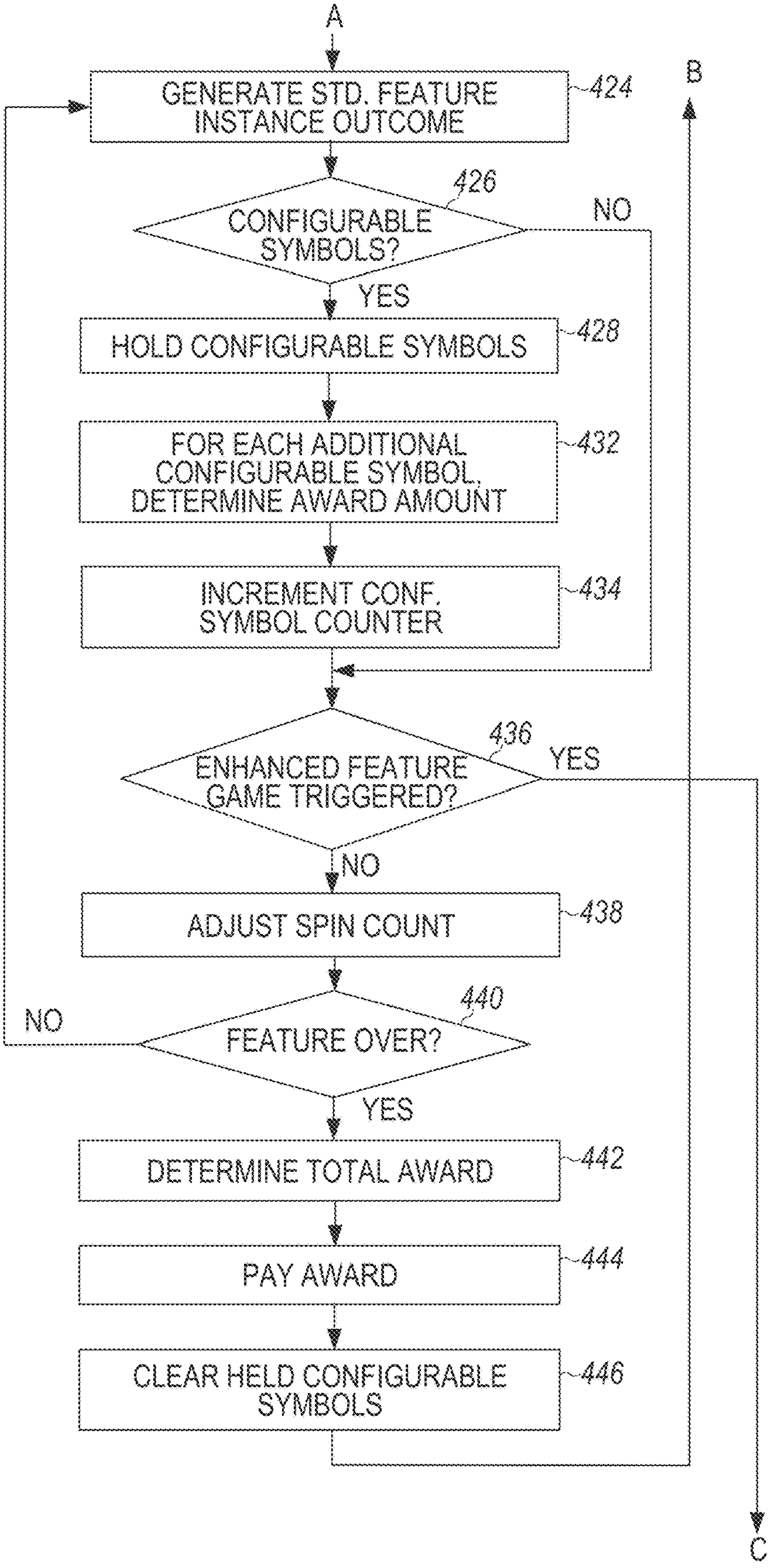
Figure 4C:
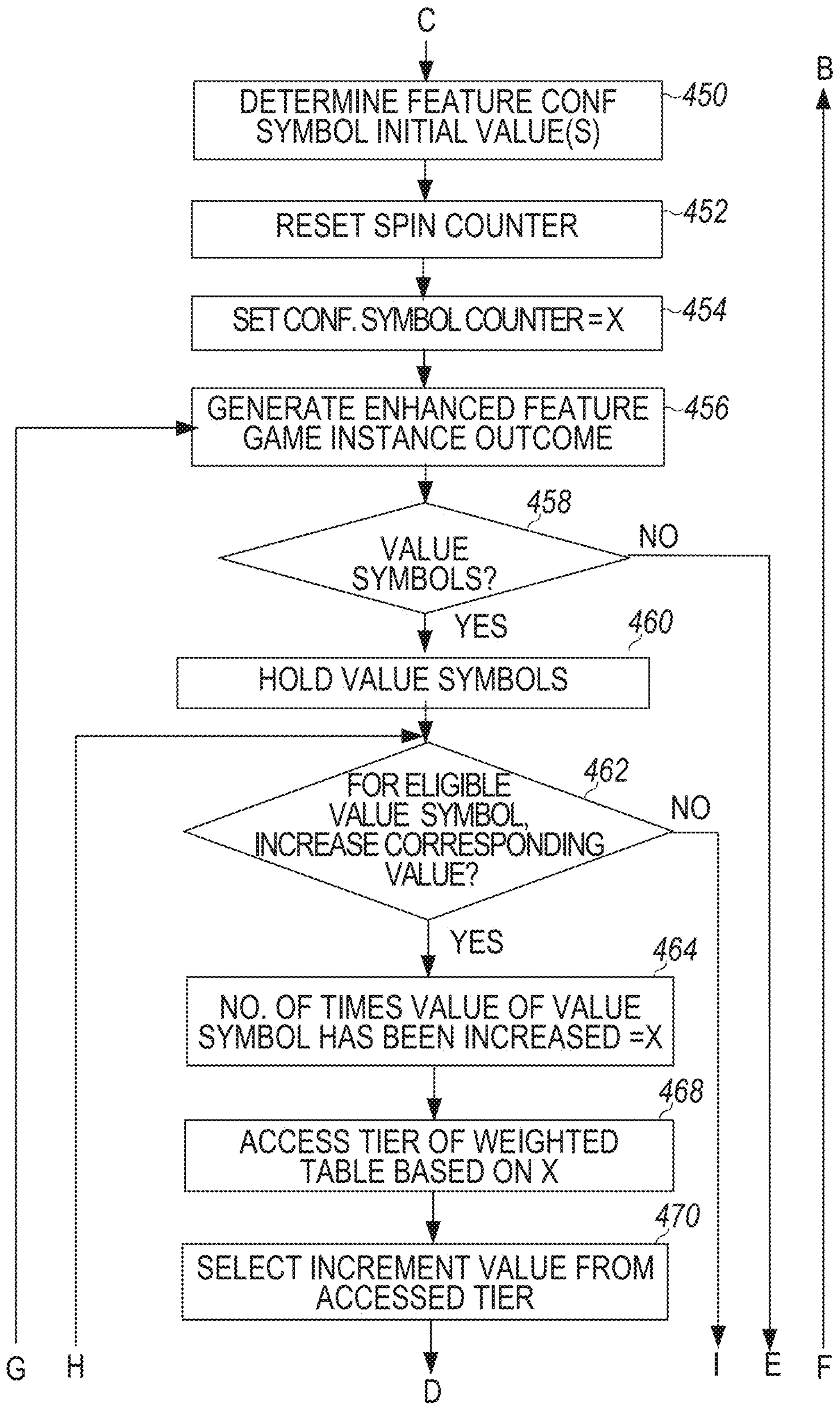
Figure 4D:
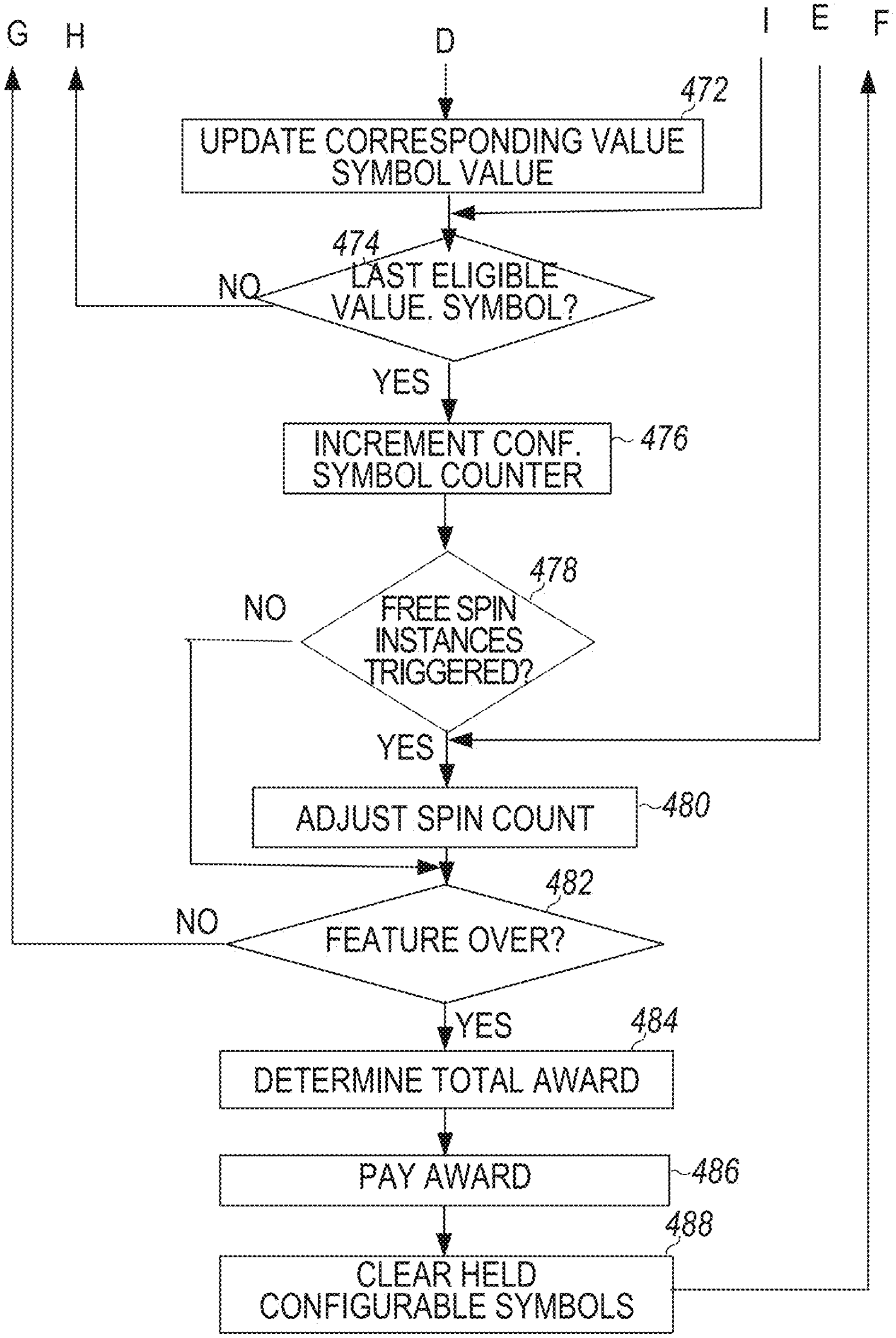

In a gameplay in which a standard feature game is triggered, the standard feature game may proceed in accordance with operations 416 to 440 of FIGS. 4A-4B. Alternatively, in a gameplay in which the enhanced feature game is triggered, gameplay may continue at operation 450 of FIG. 4C. As discussed below, in some embodiments, a standard feature game may be initiated, and an instance outcome of the standard feature game may optionally establish a trigger condition for the enhanced feature game, at 446. At which time, gameplay will move to 450.

Prior to transitioning to the standard feature game, the gaming device 200 may, at 416, determine the value(s) of value symbols that were displayed in the base game outcome that triggered the feature game. In some embodiments, the trigger symbol(s) may be configurable symbol(s). As discussed above, the gaming device 200 may determine the values to be assigned to the value symbols using a random determination, using weighted tables, or having preassigned values to each trigger symbol used in the primary game reels. Upon determining values for the triggering symbols, the gaming device 200 may cause the display 240 to replace the trigger symbols with their respective determined values.

Before beginning the hold and spin feature game, the gaming device 200 also resets the spin counter to its starting value, at 420, based on the configuration of the game. In selected embodiments, either the standard feature game or the enhanced feature game may provide a fixed number of spins (one per instance), such as six spins; and in other embodiments either the standard feature game or the enhanced feature game may provide, for example, 3 (three) instances/spins, potentially with options to obtain additional instances/spins during the gameplay. In such an example, spin counter is reset to indicate that an initial spin is spin 1 of 3, or that there are 3 spins remaining.

In transitioning from the base game to the standard feature game, the gaming device 200 may cause the display 240 to provide a transition screen. When the player presses a Start Feature button, e.g., on the player input buttons 236, the game transitions the display 240 to present the hold and spin standard feature game. In some embodiments, once either a standard or enhanced feature game is triggered, the gaming device 200 may cause the display to present a graphic metamorphic image which changes in one or more of size, form, color, etc. to graphically indicate to the player the transition to the triggered feature game. Example embodiments are discussed in more detail relative to FIGS. 7A-D and FIGS. 10A-B.

For example, the gaming device 200 may display a message such as "Press SPIN to Play" on the display 240. When the player presses the SPIN button, the gaming device 200, at 424, controls the display matrix to show multiple reels as spinning and stopping (based on one or more random values generated by RNG 212) to obtain a game outcome. For example, a block diagram representation an interface for presenting a feature game is discussed herein in reference to FIG. 8.

As noted above, the symbol set in the feature game utilizes non-configurable and configurable symbols—including value symbols. In some described embodiments, any value symbols that are carried over from the base game outcome are kept in their respective display positions one or more subsequent instances, and potentially for the remainder of the standard feature game. Upon landing (after the reels stop spinning) and the symbols that form the instance outcome are selected, the values associated with the value symbols may be revealed, or the value symbols may be replaced with another symbol which displays the values.

The gaming device 200, at 426, may then determine whether the standard feature game outcome from the first spin includes any new configurable symbols. If the standard feature game outcome does not include any new configurable symbols, control moves to 436. In some determinations, the determination will be made only as to value symbols; and in some embodiments only value symbols will be held for one or more subsequent instances of the standard feature game.

Figure 5:
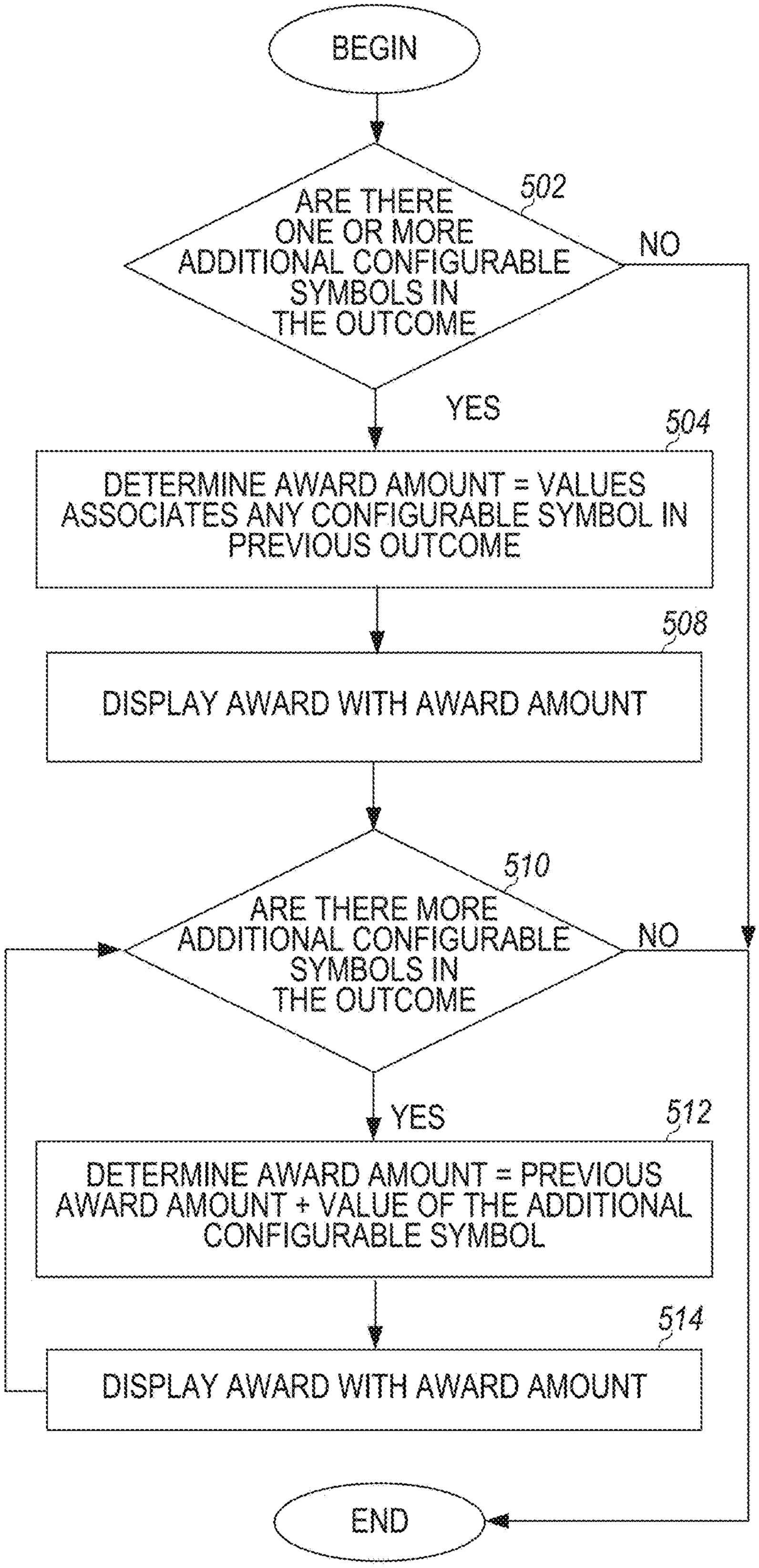
FIG. 5 depicts a flow diagram of an example process for determining the award amount of a spin or instance of a feature game outcome, in accordance with various embodiments of the present disclosure.
Figure 8:
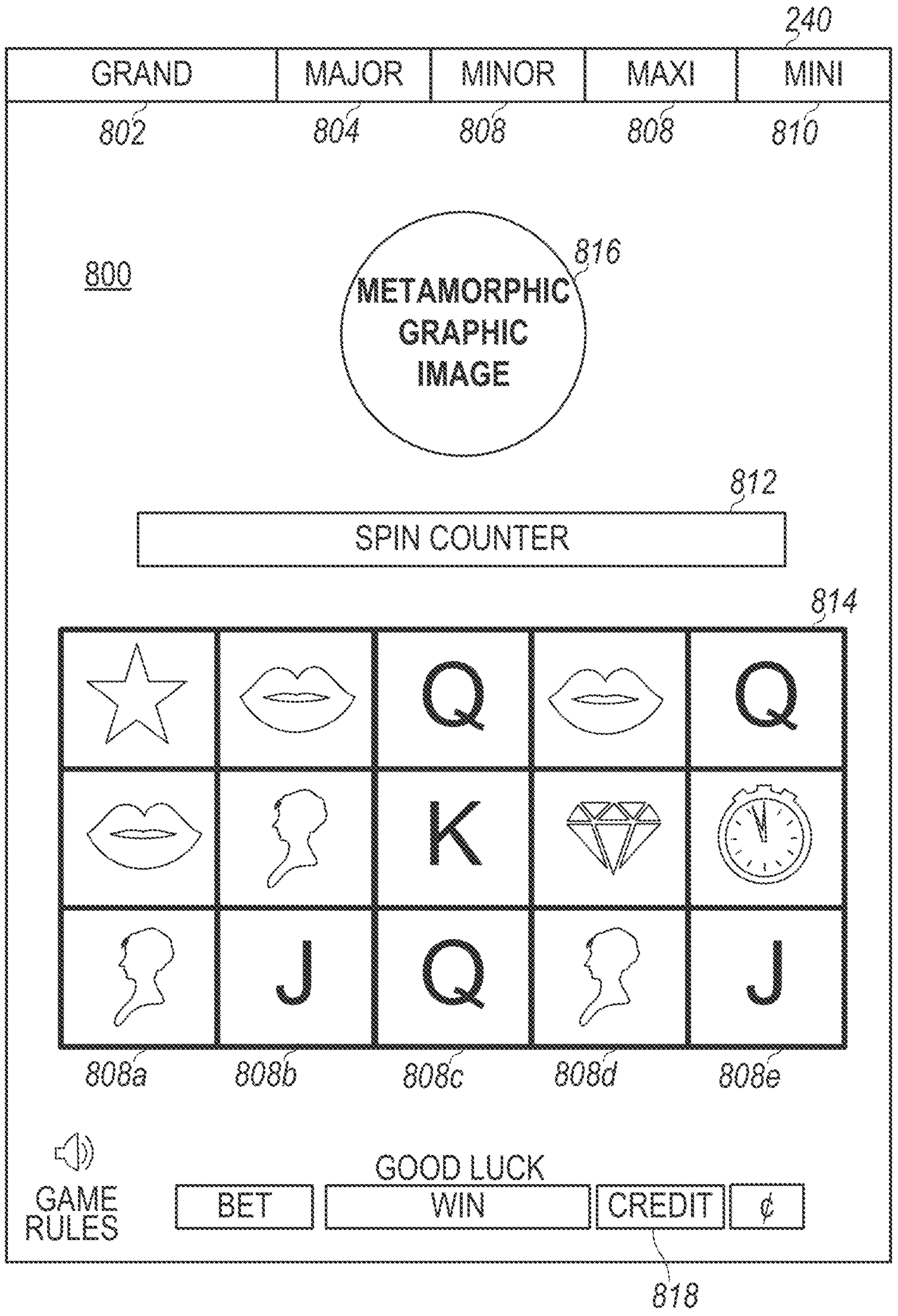
FIG. 8 depicts a block diagram representation of an example display screen that may be used to present an enhanced feature game on a display system.

At 428, any value symbols shown in the game outcome are held in their respective display symbol locations at a reel display region 814 in FIG. 8. In some embodiments, as indicated at 432, the gaming device 200 may determine an award amount for the instance outcome of the particular standard feature game, based on the number of value symbols in that particular outcome or instance. However, in other embodiments, award amounts will not be determined at individual instances, but only at the standard feature game outcome, as indicated at 442. FIG. 5, discussed below, is a flowchart depicting an exemplary process for determining the award amount of a standard feature game outcome, in accordance with various embodiments of the present disclosure. An analogous process may be used to determine an award amount of an enhanced feature game, after any value increments of the final instance have been applied.

At 434, the gaming device increments a configurable symbol counter to reflect the number of configurable symbols (including value symbols) that have been collected thus far by the player. Whether or not the number of configurable symbols is expressly identified to the player, the gaming machine will track the number of displayed configurable symbols (including the displayed value symbols). Next, at 436, the gaming device 200 optionally adjusts the feature game spin counter 812. In certain embodiments, the feature game may start with an initial quantity of spins or rounds. Prior to the start of a spin or instance, the gaming device 200 may decrease the number of available spins by a quantity, such as one. After the completion of a spin or instance, the remaining quantity may be adjusted based on the outcome of the spin or instance. For example, when the spin or instance results in one or more additional value symbols being selected, the feature game spin counter may be incremented by a quantity, such as one, or may be reset to the initial quantity. In certain embodiments, the feature game may start with an initial quantity of spins or rounds. Prior to the start of a spin or instance, the gaming device 200 may display that this is spin one of six, where six is the initial quantity of spins. After the completion of a spin or instance, the remaining quantity may be adjusted based on the outcome of the spin or instance. For example, when the spin or instance results in one or more additional value symbols being selected, the feature game spin counter may be incremented by a quantity, such as one. In certain embodiments, the feature game spin counter may not be incremented until all the initial quantity of spins are completed.

In the depicted example game process of flow diagram 400, an optional provision is included at 436 in which the enhanced feature game may be triggered during play of the standard feature game. For example, the enhanced feature game may be triggered by an outcome during an instance of the standard feature game. As an example, after the configurable symbol counter has been incremented (as at 434) based upon a standard feature game instance, the gaming machine determines, at 436, if an enhanced game feature game has been triggered. If an enhanced feature game has been triggered, the process continues at 450 (discussed further below). If an enhanced feature game has not been triggered, the spin count is adjusted at 438 (in accordance with the discussion above).

At 440, the gaming device 200 determines if the standard feature game is over. Specifically, the standard feature game ends in this example if no spins remain.

If the standard feature game is not over, control returns to 424 where the gaming device 200 waits for the player to press the spin button to generate another standard feature game instance outcome. The standard feature game continues in the manner described until all of the spins have been completed. In some examples the standard feature game may end before all spins have been completed, for example if all symbol display positions include value symbols, or one or more value symbols with other forms of configurable symbols.

Once the standard feature game is completed, control moves to 442 where the gaming device 200 determines the total award to be provided to the credit balance in connection with the feature game. If the symbol matrix is not completely filled with configurable symbols, the award may be determined by summing awards from each round or instance of the feature game. An award meter may be maintained during the play of the feature game which tallies the award from each instance or spin of the feature game. Alternatively, values associated with the displayed configurable symbols may be added after the completion of the feature game to determine an award amount for the feature game. An increased award may be provided for completely filling the reel display region 814 with value symbols and/or other configurable symbols. In some embodiments, the increased award may be a fixed prize such as a 2× multiplier of the accumulated value, or one or more of the jackpot prizes.

Upon determining the award, control moves to 444 where the gaming device 200 pays out any awards to the player, e.g., by adding the awarded credits to the credit balance on the credit meter 818. Next, at 446, the gaming device 200 clears the held configurable symbols, and control returns to 404 where the player may continue to play the base game.

In the circumstance in which the enhanced feature game was triggered, either at 414 or at 436, gameplay moves to 450. Basic operation of the enhanced feature game is similar to that of the standard feature game, in that both may, in some embodiments, be "hold and spin" games. Prior to conducting the enhanced feature game, the gaming device 200 may, at 450, access a set of display symbols for the enhanced feature game, including both non-configurable symbols and configurable symbols (including value symbols) and determine the value of those configurable symbols (including of the value symbols). Gaming device 200 may then reset the spin counter at 452, and in some cases may set a configurable symbol counter as at 454. Subsequently, typically in response to a user input to the gaming device, as discussed above, an enhanced feature game instance outcome will be generated, at 456.

For purposes of describing the dynamic incrementing feature of the enhanced feature game, the following description will focus on any value symbols forming part of an instance outcome. Though additional operations and determinations may be made based upon other forms of configurable symbols in an instance outcome. A determination is made, at 458, as to the presence of any value symbols in the instance outcome. If no value symbols are present, gameplay continues at 480. However, when one or more value symbols are present, the value symbols will be held at 460. A determination is then made, at 462, for each eligible value symbol whether to increase the corresponding value. As noted previously, in some embodiments, not every value symbol will be eligible for incrementing.

If a decision is made at 462 not to increment an eligible value symbol, then the process moves to 474, where a determination is made if that is the last eligible value symbol. If the decision is made at 462 to increment an eligible value symbol, then example operations as discussed below at 464-472 may be performed.

This determination of whether to increment an eligible value symbol can be completely at random, or may be subject to one or more conditional rules. For example, one conditional rule might be that in the event that four or more value symbols are displayed at an instance outcome, no more than three will be considered for value incrementing; though after implementation of that rule the determination of whether to increment the value of three of the four value symbols may be made randomly (and similarly, the identification of which three value symbols to increment may be made randomly). Additional rules can be contemplated, as described later herein.

In certain embodiments, each held value symbol may be evaluated for an increase based on a weighted table, which may take into consideration, whether the symbol has been previously increased or not, how many times has the configurable symbol increased in value, etc. Once the decision to increment the value of an individual value symbol has been made at 462, additional determinations may be made in order to select a value for the increment. In one example configuration, a determination will be made of whether the value of that individual value symbol has been previously incremented. In various embodiments this determination will further include the number of times the value of that individual value symbol has been incremented, as at 464. The number of times that the value of an individual value symbol has been incremented may be used to select a group of possible value increments. In an example configuration, the group of possible value increments can be represented in one or more tiers of a weighted table (as discussed earlier in reference to FIG. 3), as at 468. Subsequently, an increment value will be selected, at 470, for example at random, from the one or more tiers of the weighted table. The ultimate determination of an increment value will be, in many embodiments, a random selection. The weighted selection of multiple possible increment values from a group of values determined in response to previous increments to the value symbol provides a mechanism to increase suspense to the player, by offering a range of potential awards, thereby avoiding the gameplay becoming predictable, and therefore less interesting.

The corresponding value of the individual value symbol will then be updated, at 472, by the amount of the selected increment value. Various methods of presenting the incremented value of a value symbol to the player discussed below in reference to FIGS. 7A-7D.

In various embodiments, the described process will be implemented for each value symbol in the instance outcome. In certain embodiments, the described process of incrementing the values of the value symbols may be implemented for only those value symbols that were held in position from a previous instance; and those value symbols that are a part of the outcome of the present instance (new value symbols) are not upgradeable until the end of the next instance. Though as noted above the incrementing determination and selection may only be performed in response to some value symbols, under established rules or constraints. Once the last eligible value symbol considered for incrementing his been reached, at 474, then a configurable symbol counter (when present) may be updated at 476.

Some embodiments may offer the possibility of free spins added to the enhanced feature game (or presented after the enhanced feature game). Such free spins may be awarded randomly, or based upon one or more trigger symbols, one or more other forms of configurable symbols (such as special configurable symbols), and/or other conditions (such as combinations of configurable symbols) in an instance outcome. Where such free spins have been triggered, at 478, the spin count will be adjusted, at 480, and play may continue as described until the enhanced feature game is over, at 482. At such time the gaming machine 200 can proceed as described at the end of the standard feature game, to determine the total award based on the enhanced feature game, at 484; pay the awarded amount 486, and clear any held configurable symbols (including value symbols), at 488.

FIG. 5 is a flowchart depicting an exemplary process for determining the award amount of an instance (spin) of a standard or enhanced feature game outcome, in accordance with various embodiments of the present disclosure. As previously discussed, various embodiments of the present disclosure provide for determining an award for each instance of the hold and spin feature game. This is based on awards provided, if any, in previous instances, and configurable symbols (including value symbols) in the prior instance outcomes.

The following discussion describes how the flowchart of FIG. 5 is implemented by gaming device 200. In accordance with one such embodiment, a determination is made, at 502, whether the outcome of the spin or instance of the standard or enhanced feature game includes any configurable symbols. As will be apparent from the discussion of the enhanced feature game relative to FIGS. 4C-4D, the instance award amounts may be determined after the incrementing of any value symbols during the instance as described in reference to such FIGS. Give as a result the flowchart of FIG. 5 addresses how values of configurable symbols (which include value symbols), may be processed to determine an instance award, after any incrementing of values, as discussed above.

The determination 502 of whether the instance outcome includes any configurable symbols may be made by only considering those symbols that were not held from any previous spin. For example, for determining whether the first spin of the feature game has any additional configurable symbols, any configurable symbols that were used to trigger the feature game may be excluded from this determination. If there were one or more additional configurable symbols, control proceeds to 504. If there were no additional configurable symbols in the outcome of the spin or instance of the feature game, then the process for determining an award amount ends. Control may return to 424 (or 456) and the play of the feature game may continue.

At 504, an award amount is determined for a first of the additional configurable symbols (including value symbols) in the feature game outcome. In certain embodiments, the award amount is the sum of values associated with configurable symbols from the previous outcome, i.e., those that were held from the previous instance or outcome. In certain embodiments, the award amount is the sum of values associated with configurable symbols from the previous outcome, i.e., those that were held from the previous instance or outcome, and one of the additional configurable symbols from the outcome. In certain embodiments, where one or more of the configurable symbols display a multiplier value, the multiplier may be applied to the award sum to determine the award value. In certain embodiments, where one or more of the configurable symbols displays a name of a jackpot, such as one of mini, minor, maxi, major or grand (see block diagram example display screen 800), the current value of that jackpot would be used for determining the award amount. In some embodiments, the value of the jackpot is reset to its starting value.

At 508, the award amount is displayed via at least one display of gaming device 200. At 510, the gaming device 200 determines whether there are more additional configurable symbols in the feature game outcome. If there aren't any additional configurable symbols, then the process for determining an award amount ends. Control may return to 434 (or 456) and the play of the feature game may continue.

If there are more additional configurable symbols, a second award is determined. At 512, the second award amount is determined by adding the value of the first award amount and the value of the first additional configurable symbol in the feature game outcome. In certain embodiments, the second award amount is determined by adding the value of the first award amount (that included the value of the first configurable symbol) and the value of the second additional configurable symbol in the feature game outcome.

In certain embodiments, where one or more of the configurable symbols display a multiplier value, the multiplier may be applied to the award sum to determine the award value. In certain embodiments, where one or more of the configurable symbols displays a name of a jackpot, such as one of mini, minor, maxi, major or grand, the current value of that jackpot would be used for determining the award amount. If the configurable symbol from the previous feature game outcome displays a name of the jackpot, and that jackpot value is used to determine the first award amount, the jackpot value may either be reset to its default value for determining the second award amount, or be used as it was for the first award amount. At 514, the award amount is displayed via at least one display of gaming device 200. Control returns to 510, where a determination is made by gaming device 200 whether there are any additional configurable symbols. If no additional configurable symbols were part of the feature game outcome, the process for determining an award amount ends. Control may return to 434 or 456 and the play of the feature game may continue. In an outcome where there is a third additional configurable symbol, a third award may be determined, which may be based on the second award value and the value associated with the third additional configurable symbol.

Where there are two or more additional configurable symbols, there may be a determination made by gaming device 200 as to the order of using the additional configurable symbols for determining the award amount. In certain embodiments, the order may be based on the order of the symbol in display symbol matrix (814 in FIG. 8), going left to right by the reels and then top to bottom. In certain embodiments, a random determination may be made. In yet other embodiments, the order may be based on the values associated with the configurable symbols (including value symbols), such as by lowest to highest, or vice versa. As will be appreciated by those skilled in the art, the order will affect the award amounts. For example, having a higher value symbol first will be advantageous from the perspective of the player, since it will be used to determine the first award amount, and therefore, used for subsequent award amounts for that feature game instance outcome.

Figure 6A:
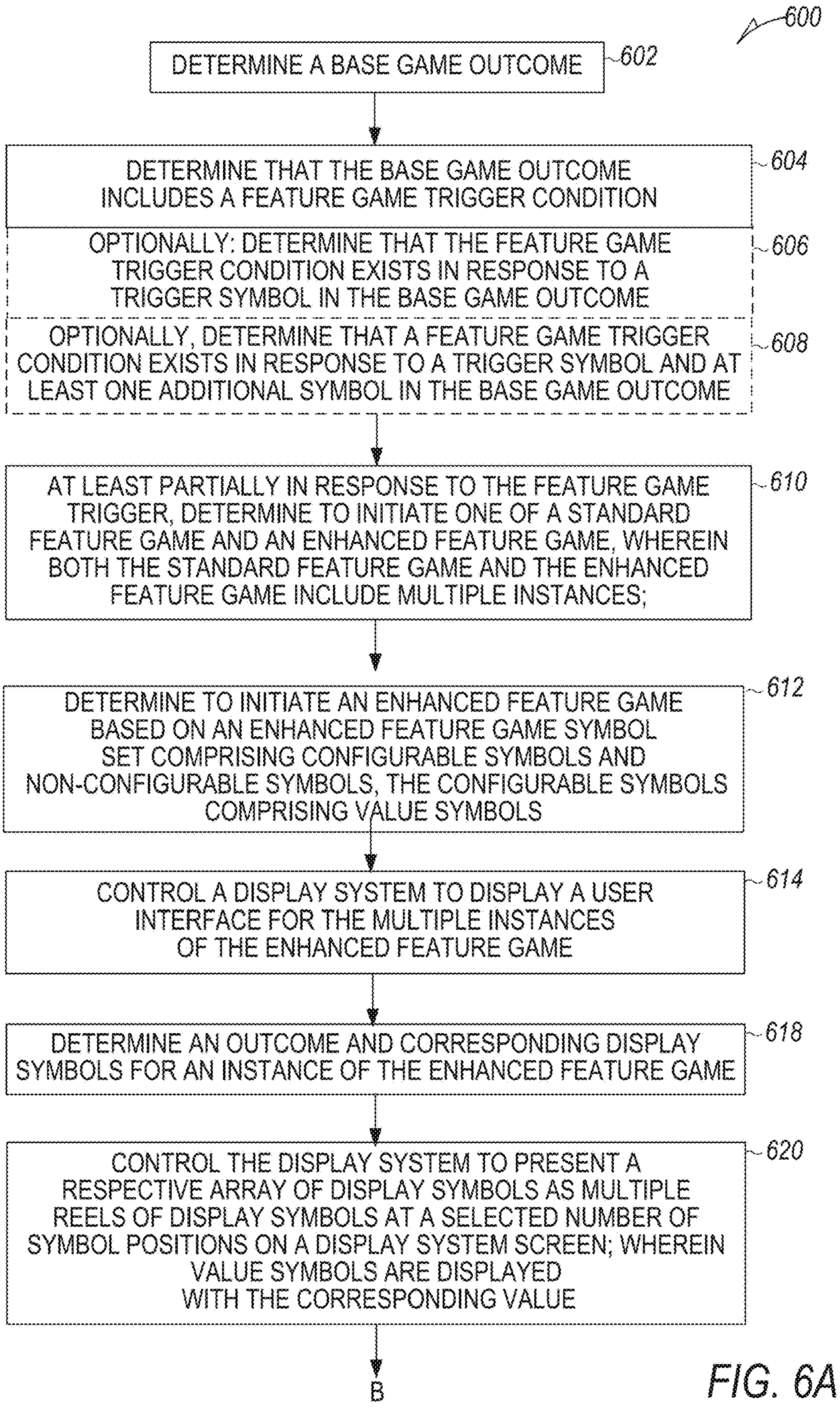
FIGS. 6A-6C depict an example flowchart for providing a feature game, as described in the present disclosure.
Figure 6B:
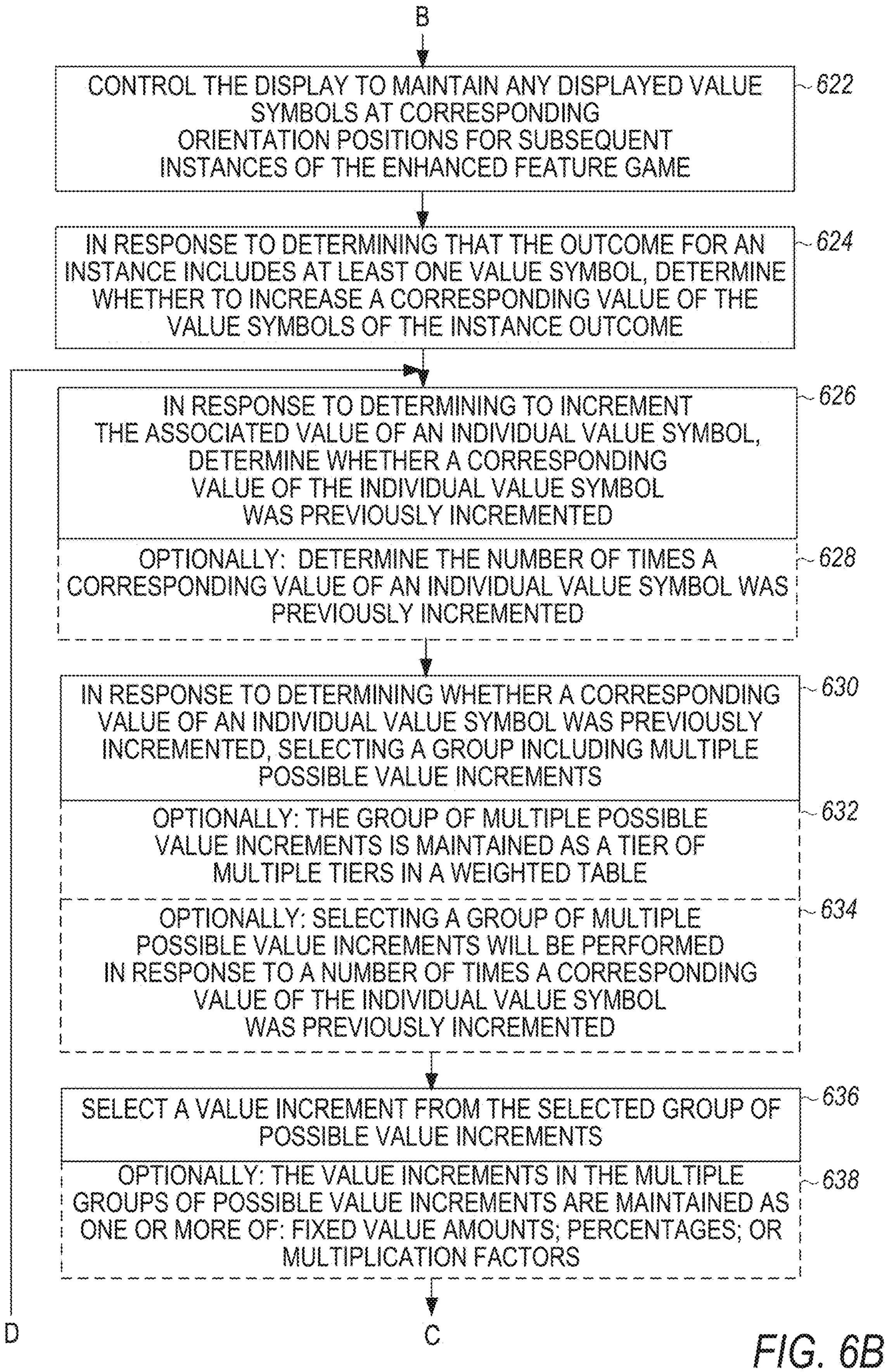
Figure 6C:
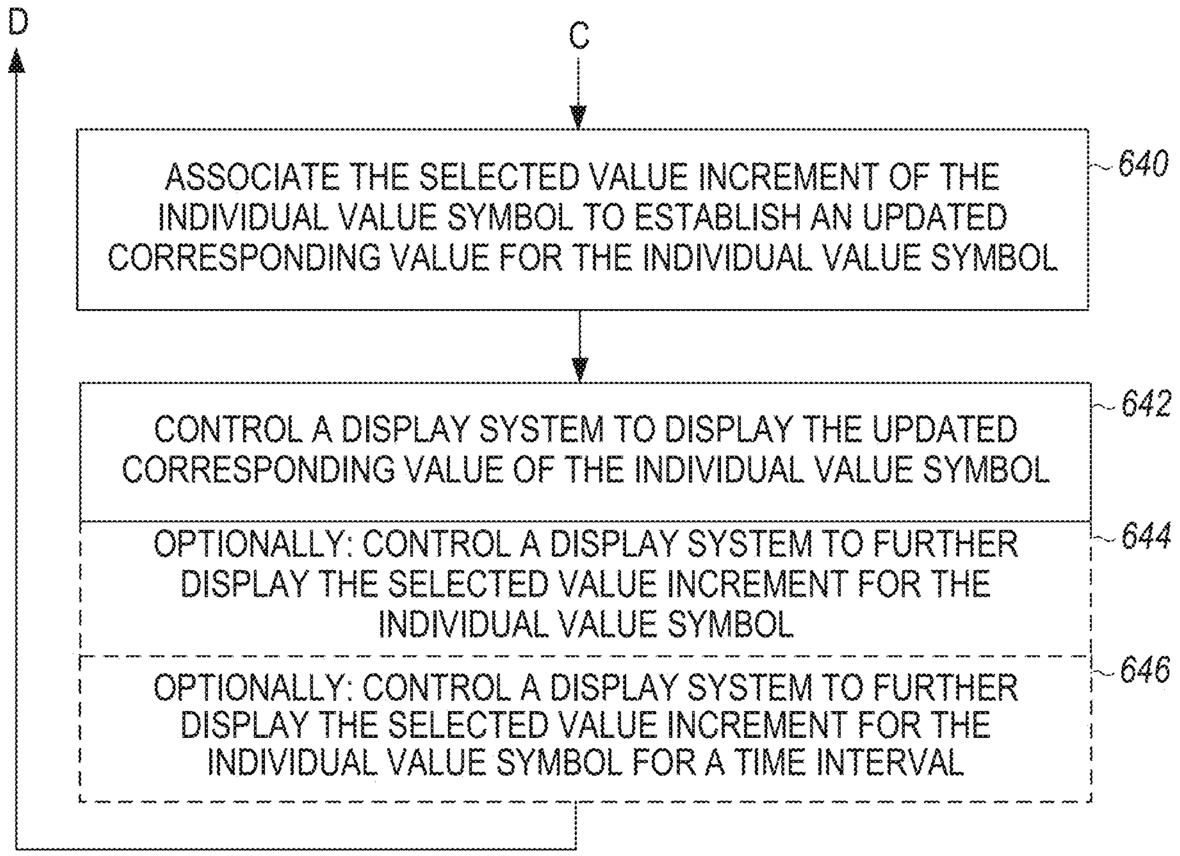

Referring now to FIGS. 6A-C, the FIGS. depict a flowchart 600 for an example game processing pipeline for an enhanced feature game, as may be implemented by a game processing architecture (300) as described relative to FIG. 3. Flowchart 600 depicts operations of an example embodiment (bounded by solid line boundaries); and also depicts optional operations or parameters that may be incorporated (bounded by dashed line boundaries). As previously described, such game processing architecture 300 can implement the game processing pipeline using one of multiple forms of a gaming system. Such a gaming system may be, for example, a gaming device, such as gaming devices 104A-104X and 200 shown in FIGS. 1 and 2, respectively, which implements the game processing pipeline; or alternatively, for example, a local gaming device and one or more remote gaming devices, such as central determination gaming system server 106 shown in FIG. 1. Additionally, various functions of the game processing pipeline may be implemented locally at a gaming device, while others are implemented at a gaming system server.

Because an enhanced feature game, in selected embodiments, is initiated based on a base game, and commonly on a base game outcome (or a base game instance outcome), flowchart 600 begins with determining a base game outcome, at 602. In various embodiments, the base game may be conducted with a base game symbol set; and the base game outcome will present a subset of the base game symbol set. In some embodiments, the base game symbol set will include configurable symbols—including value symbols—having respective corresponding values. At 604, a determination is made that the base game outcome includes at least one feature game trigger condition, as discussed earlier herein. As noted previously, such feature game trigger condition(s) can include, in selected embodiments, one or more trigger symbols (of which one or more may be another form of configurable symbol), representing a preselected condition. In other embodiments, the feature game trigger condition may be based on a parameter (or on a random value), not displayed as a symbol. Accordingly, optionally, as indicated 606, the feature game trigger condition may be determined to exist in response to a trigger symbol in the base game outcome. Though also optionally, as indicated at 608, the feature game trigger condition may be determined to exist in response to a trigger symbol and at least one other symbol in the base game outcome (for example another configurable symbol).

In certain embodiments where the feature game trigger condition includes a symbol or symbol combination, in a base game outcome, the enhanced feature game may be triggered after a second random determination is made to trigger the enhanced feature game. The second random determination may only be made after the first trigger condition is satisfied (trigger symbol or symbol combination in the base game outcome).

Figure 7A:
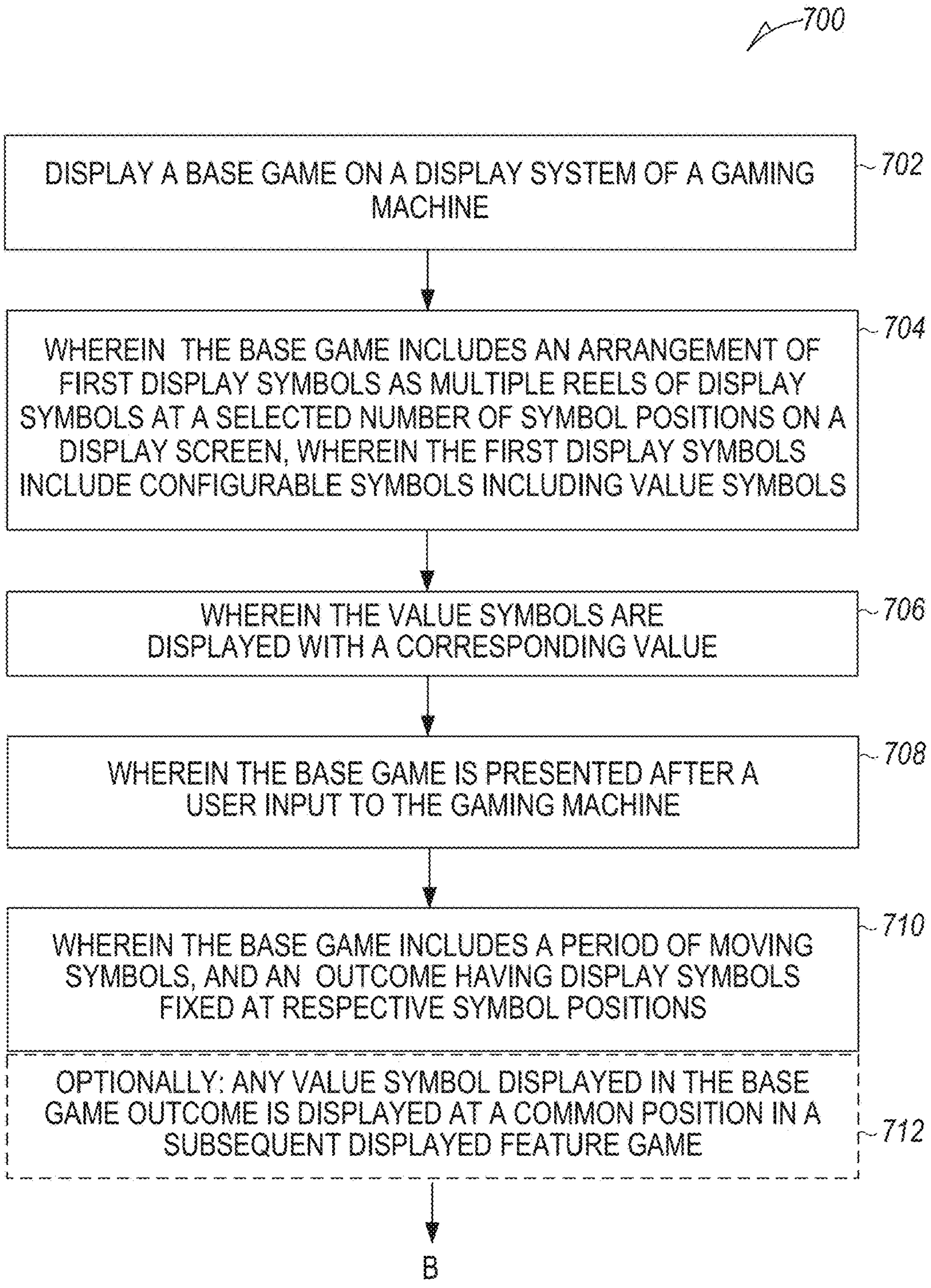
FIGS. 7A-7D depict an example flowchart of a method of presenting a user interface through a gaming machine for a feature game, in accordance with the present disclosure.
Figure 7B:
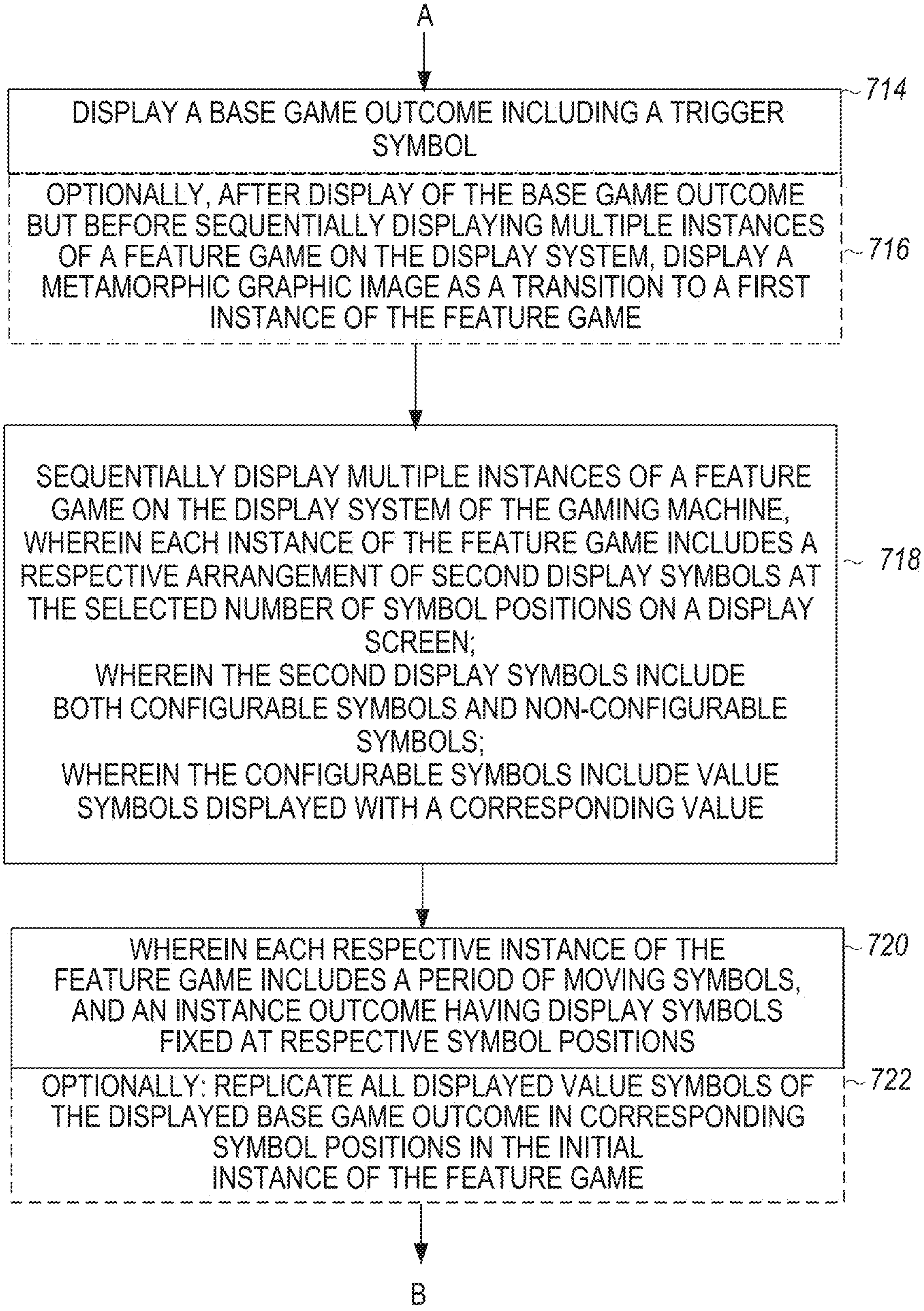

In selected embodiments, a feature game trigger condition may be associated with a metamorphic graphic image, as discussed in more detail relative to FIG. 7B, at 716. In certain embodiments, when a trigger symbol (or symbol combination, or any other trigger event) occurs in a base game, a metamorphic counter may be increased. The increase may be by one or any other count (random, predetermined, or based on the trigger condition—e.g. one for each trigger symbol in the outcome). Once the metamorphic counter reaches a trigger value (either predetermined, randomly determined, etc.), the feature game may be triggered.

Also as discussed previously relative to FIG. 4A, at least partially in response to the feature game trigger condition, a determination can be made to initiate either of multiple feature games (i.e., a "standard feature game" or an "enhanced feature game"), as indicated at 610. As previously discussed, the standard or enhanced features games may be triggered is response to a single trigger event (with which game is triggered, for example, being randomly selected); or may be triggered in response to separate trigger conditions. In either case, there may be multiple conditions that may exist, any one of which may result in a trigger condition. In many embodiments the standard feature game and/or the enhanced feature game will include multiple instances. The present flowchart addresses determining to initiate an enhanced feature game, at 612, based on an enhanced feature game symbol set comprising configurable symbols and non-configurable symbols, in which the configurable symbols include value symbols. The enhanced feature game symbol set may be different from the base game symbol set. In some embodiments, the standard and/or enhanced feature game may be based on a game symbol set that includes only configurable symbols as "active symbols"—symbols which may form part of an instance or game outcome. In some such embodiments, non-configurable symbols may be included in the game symbol set, but may be displayed in shaded form during an instance, to focus the player's attention on the configurable symbols pertinent to the instance or game outcome.

As indicated 614, the game processing architecture 300 will control a display system (for example primary game display 240 and secondary game display 242 of gaming device 200), to display a user interface for multiple instances of the enhanced feature game. And as indicated at 618, the game processing architecture 300 will determine an outcome and corresponding display symbols for the outcome, for each instance of the enhanced feature game.

In some embodiments, the enhanced feature game will be a "hold and spin," spinning reel-based game. In such embodiments, the user interface for a respective instance may include an interval of displayed spinning reels, followed by an instance outcome including display of an array of display symbols fixed at a selected number of display symbol positions (for example 9, 15, or another selected number of display symbol positions), as indicated at 620. When the instance outcome includes a value symbol, the corresponding value of the value symbol may be displayed.

When an enhanced feature game instance outcome includes one or more value symbols, those value symbols will be maintained into one or more subsequent instances; and as indicated at 622, the game processing architecture 300 will control the display to display the one or more value symbols at corresponding positions for such subsequent instances. In selected embodiments, value symbols in a feature game outcome will be maintained into all subsequent instances. As an alternative to maintaining all displayed value symbols into all subsequent instances; in a subsequent instance, the corresponding value of multiple displayed value symbols of a preceding instance outcome may be gathered into a single unified value symbol, thereby opening one or more display symbol positions of the instance outcome to potentially include and display a new value symbol.

As indicated at 624, in response to determining that an instance outcome includes at least one value symbol, the game processing architecture 300 will determine whether to increment (increase) a corresponding value of that value symbol. The determination of whether to increment the corresponding value of the value symbol may be at least in part based on a random value, such as a value from RNG 212 of gaming machine 200. In other embodiments, a non-random parameter may apply to the determination of whether to increment the corresponding value. For example, a conditional rule may be imposed in combination with a random determination. For example, such a conditional rule might be that a value symbol will not be considered for incrementing if it was incremented in an immediately preceding instance; but if such rule does not apply, then the determination is made at random. Other such conditional rules may be considered, as may provide either expectations or uncertainties to a player to promote the player's enjoyment of the game. In the described embodiments, wherein the incrementing the value symbol occurs dynamically, in the absence of player input, the value increments may be perceived as unexpected "bonus" awards, enhancing the player experience.

As indicated at 626, a decision may be made as to any eligible value symbol, to increment the associated value of the individual value symbol. In selected embodiments, when the decision to increment an individual value symbol is made, the game processing pipeline will further determine whether a corresponding value to the individual value symbol was previously incremented. Optionally, as indicated at 628, the game processing pipeline will determine the number of times a corresponding value of the individual value symbol was previously incremented (which may be zero).

As indicated at 630, in response to determining whether a corresponding value of an individual value symbol was previously incremented, and in selected embodiments, in response to a number of times the individual value symbol was previously incremented (at 628), a group of multiple possible value increments is selected. The group of multiple possible value increments may optionally be maintained in one or more respective tiers of a table, such as a weighted table, as indicated at 632 (and as discussed in reference to FIG. 3). In such embodiments, the tiers of the weighted table may each include at least three, or more, possible value increments. In various embodiments, the tiers of the weighted table may be selected at least partially in response to a determined number of times the individual value symbol was previously incremented, at 634. For example, a group of possible values for a value symbol may be selected in direct relation to a determined number of times that the symbol has been previously incremented. For example, for a value symbol that has "0" previous increments, a group of possible values in a first tier of the weighted table may be selected. Alternatively, the selection of a group of possible values for value symbol may be selected in indirect relation to the number of previous increments of the corresponding value of the value symbol. For example, for a value symbol that has "1" previous increments, values in either of "tier 2" or "tier 3" of a weighted table might be candidates, with an individual tier of those two tiers selected by a random value. The weighted table may be the any of multiple configurations. For example, the weighted table may include at least one tier for each instance of the enhanced feature game, potentially including additional tiers for each potential free spin instance. In some embodiments, the weighted table may include a greater number of tiers than the instances of the enhanced feature game. In some embodiments, the highest value increment within a selected tier of the weighted table may be greater than the highest value increment within a lower tier of the weighted table. And in some embodiments, the weighting of individual values in one tier of the weighted table may be different than the weighting of individual values in one or more other tiers of the weighted table.

After selecting a group of possible values for incrementing the corresponding value, an individual value increment will be selected from the selected group, as indicated at 636. The individual value increments in such a weighted table (or other accessible logical structure) may be maintained in various representations; for example, as optionally indicated at 638, the individual value increments may be maintained as one or more of: fixed value increments, such as 25 credits (or other value units), 50 credits, 100 credits; percentage increments (of an existing corresponding value), such as 25%, 50%, 100%; or as corresponding multiplication values (of an existing corresponding value). In other implementations, the weighted table, rather than directly containing representations of the value increments, may store representative indicators, which when selected, can be correlated with a specific value increment, such as through reference to a lookup table or similar data structure. Such an implementation may facilitate, for example, use of a common weighted table in multiple game pipeline processes in which corresponding symbols may have different corresponding values (for example corresponding values having a monetary value in cents, rather than dollars).

As indicated at 640, the selected value increment will then be associated (e.g. added) with the corresponding value of the individual value symbol, and as indicated at 642, a display system will be controlled to display the updated corresponding value of the individual value symbol. In some embodiments, the displayed corresponding value of the individual value symbol may merely be updated to the new corresponding value. However, to provide a more enjoyable gaming experience for the player of the enhanced feature game, the present embodiments contemplate alternative displays on the display system. As discussed above, aspects of the gameplay for providing interest to a player are the uncertainties in: (1) which, if any, value symbols will receive a value increment it any given time, and (2) the amount of that value increment. In the gameplay described above, even if a player remembered which value symbols had been previously incremented, and the number of increments; the player would still not know what a future increment would be. As a result, to reward the player with specific information regarding progress in the enhanced feature game, selected embodiments herein optionally control a display system to display a selected value increment relative to the corresponding value symbol, as indicated at 644. For example, as optionally indicated at 646, the selected value increment may be displayed in combination with the associated value symbol for a selected time interval. For example, in selected embodiments, the selected value increment may be presented superimposed over, and/or adjacent, the associated value symbol. In selected embodiments, the displaying of the selected value increment for a time interval may be a portion of an animation, which in addition to displaying the selected value increment, will also display (at least partially concurrently, or in succession) incrementing of the prior value of the value symbol (for example, either counting individually or in selected whole numbers) from the prior value of the value symbol to the incremented corresponding value of the value symbol. See, for example, FIG. 9C; and FIGS. 10D-10F.

After operation 624 as described above, and any optional operations, such as example operations 642, and 644, if there are other value symbols for which a decision was made, at 624, to increment the corresponding value, the above process can return to 626 for determining that incremented value, as discussed above.

Figure 7C:
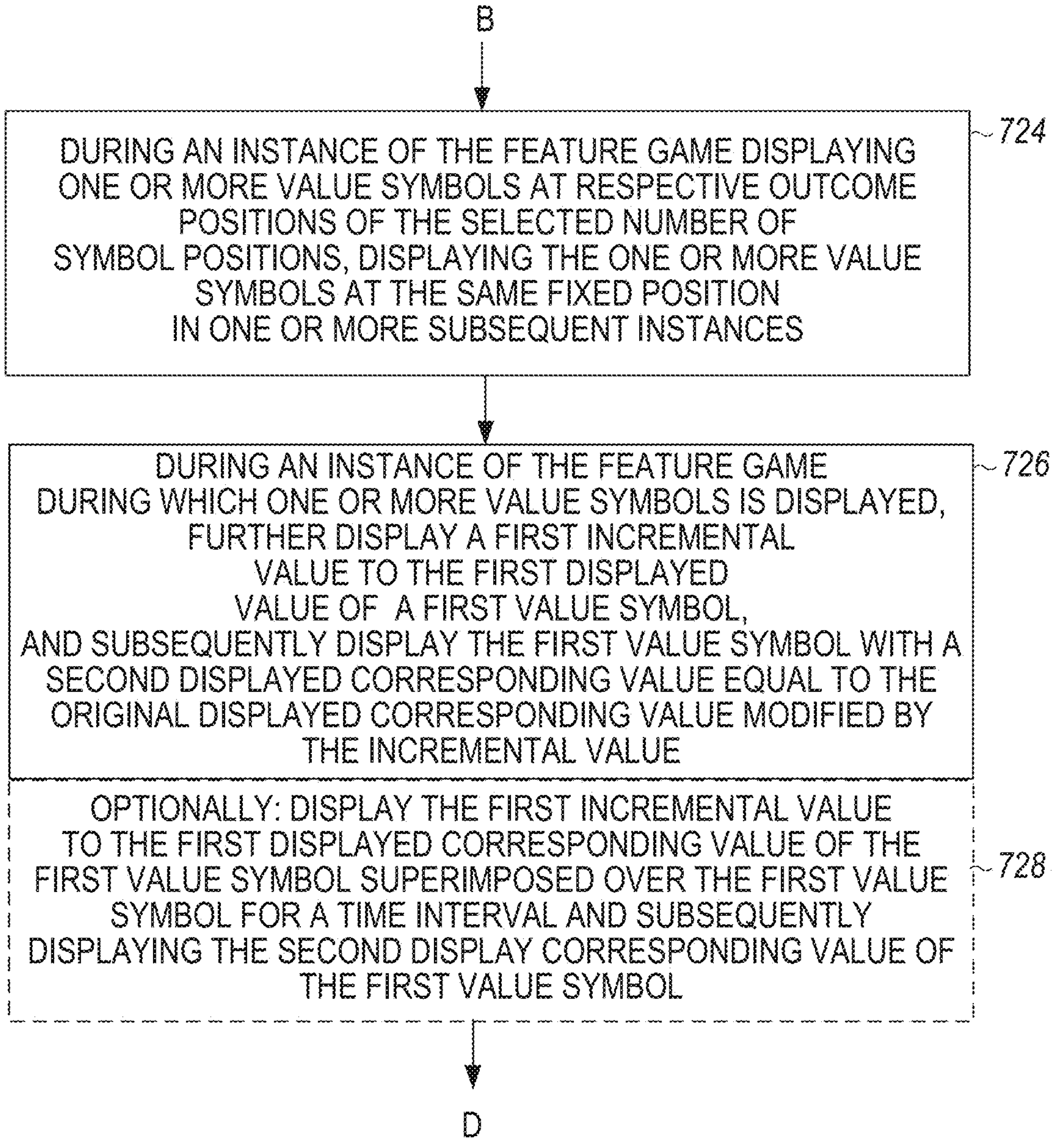
Figure 7D:
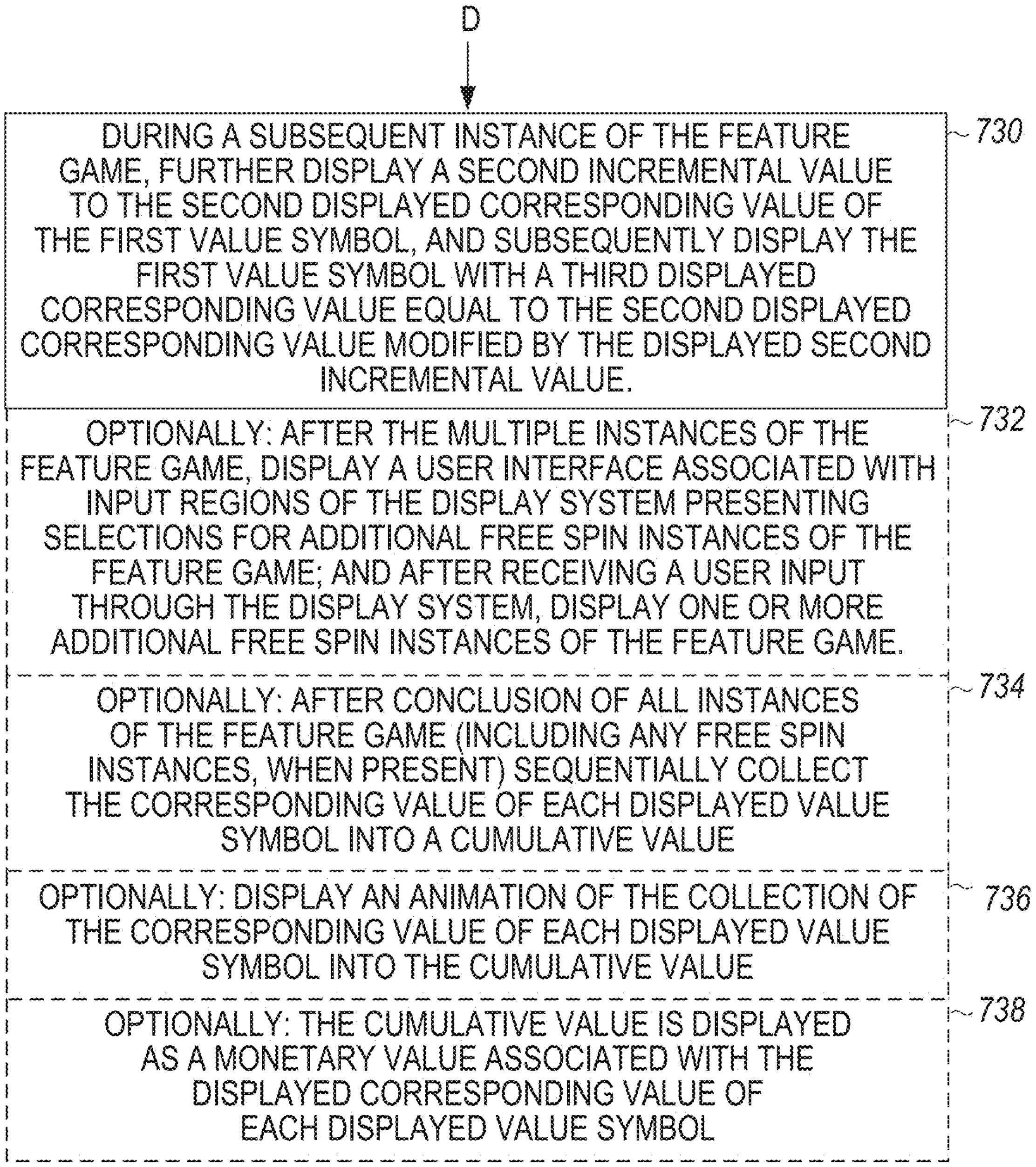

Referring now to FIGS. 7A-7C, the figures depict an example flowchart 700 for controlling a display system, for example of a gaming machine 200 of FIG. 2A, as may be controlled through game processing backend system 314 and/or UI system 302, described in reference to FIG. 3 to display a user interface to a player through a gaming machine. For clarity and simplicity in the present description, the method for controlling a display of flowchart 700 will be discussed as being under control of UI system 302, with the express understanding that all or part of such control could instead be within game processing backend system 314. Either of such control systems may include one or more non-transitory storage media (for example memory devices) storing instructions that may be executed by one or more processors within the control system to control the display system in the manner described. Such stored instructions may include, for example, instructions for presenting display screens as described in flowchart 700 and/or as generally depicted in FIGS. 9A-9F, and 10A-10I. In many embodiments, game processing backend system 314 establishes conditions of the gameplay, including base game and feature game outcomes, and incremented values of value symbols, during the feature game, that are presented to a player through the display system.

As indicated at 702, UI control system 302 will control a display system (such as one comprising primary display 240, secondary display 242, and potentially topper display 216, of gaming machine 200). UI control system 302 may cause the display system to display a base game on a display system of the gaming machine, typically in response to one or more user inputs to the gaming machine, as discussed earlier herein. The base game, may be presented as portions of a game play UI 304, comprising multiple game play UI elements 306A-306N.

As indicated at 704, in accordance with selected embodiments herein, in which the base game is a "hold and spin" game, the base game will include multiple reels of display symbols, which will display a respective arrangement of selected display symbols of a first set of display symbols at a selected number of display positions located on a display screen. In various described embodiments as discussed earlier herein, the first set of display symbols will include both configurable and non-configurable display symbols. As indicated at 706, control of the display system will include displaying the value symbols with the corresponding value.

As indicated at 708, in selected embodiments, the base game will be displayed to the user on the display system after a user input to the gaming machine; and as indicated at 710, the base game will include a period of moving symbols (which may be depicted as spinning of the reels of display symbols), and an outcome having display symbols fixed at respective symbol positions. And as indicated at 712, optionally, any value symbol displayed at a base game outcome is displayed at a common position in a subsequent feature game instance. In selected embodiments, configurable symbols (including value symbols) displayed in a base game outcome may be carried over to the feature game in a new form. For example, one or more value symbols in a base game outcome may be presented as upgradable value symbols in an initial instance of a feature game (and potentially in subsequent instances of the feature game). Other configurable symbols in a base game outcome may be converted to value symbols for the feature game. Where configurable symbols in a base game outcome have different properties when carried over to the feature game, many embodiments will change the appearance of the configurable symbols as an identification of that change in properties, as discussed elsewhere herein.

UI system 302 will in some instances control the display system to present a base game outcome including one or more trigger symbols, as indicated at 714, as discussed previously in more detail in relation to operation 414 of FIG. 4. When the one or more trigger symbols results in the determination to present a feature game to the player, the bonus game play UI, such as depicted at 308 in FIG. 3, may be presented, at 718, by UI system 302. In the present example, the bonus game play game UI will be of the type described herein as an "enhanced feature game."

Optionally, after display of the base game outcome but before sequential display of multiple instances of the feature game on the display system, the display system may be controlled to display a metamorphic graphic image, at 716. Such a metamorphic image can provide a transition to a first instance of the feature game, as previously discussed, and as further represented by, and discussed relative to, example screens at FIGS. 10A-10B. Such a metamorphic graphic image can change in form, size, and/or color, in a manner to identify achievement of the milestone during the gameplay. Such a graphic portrayal of the milestone can guide the player through the gameplay more effectively, and in a more entertaining manner, than might be conveyed, for example, by a textual representation. As discussed, relative to FIG. 8, a metamorphic image may also be displayed during instances of a feature game (either a standard feature game or an enhanced feature game).

Referring again to displaying multiple instances of a feature game at 718, UI system 302 will cause the display system to sequentially display multiple instances of an enhanced feature game in which each instance includes an outcome in which an array of selected display symbols selected from a second set of display symbols is displayed. The second set of display symbols may be different from the first set of display symbols used in the base game, but will again include configurable symbols (including value symbols) and non-configurable symbols, in which the value symbols are displayed with the respective corresponding values. Additionally, as previously described relative to the base game, display of each instance of the enhanced feature game will include displaying a period of moving display symbols (in the form of rotating reels), and display of an instance outcome having selected display symbols representative of the instance outcome fixed at respective display symbol positions, as indicated at 720. Optionally, displayed value symbols of the base game outcome (at 714) would be displayed in corresponding symbol positions in the initial instance of the enhanced feature game, at 722. Additionally, when an instance of the enhanced feature game displays one or more value symbols at respective outcome positions, those value symbols may be displayed at the same fixed position in one or more subsequent instances of the enhanced feature game, at 724.

During an instance of the feature game during which one or more value symbols is displayed, after a determination to apply an incremented value to a first of the displayed value symbols, and after determining the incremented value to apply, (both as discussed relative to operations 462 to 472 in FIG. 4), UI system 302 will control the display system to further display the incremental value selected for the first value symbol, and to subsequently display the first value symbol with an updated corresponding value equal to the prior value of the first value symbol as incremented by the selected incremental value, as indicated at 726. Example implementations are depicted in FIGS. 9C and 9E-9F, and in FIGS. 10D-10F.

Optionally, the display system will be controlled to display the first incremental value of the first value symbol and the original value of the first value symbol simultaneously, for a selected period. In some examples, the first incremental value may be displayed superimposed over, or displayed adjacent the prior corresponding value of the first value symbol, at 728. In some cases, incrementing of the prior value (by selected units) and of the first value symbol by the amount of the first incremental value may be displayed as an animation on the display system.

During a subsequent instance of the feature game, in response to a determination to further increment the value of the displayed first value symbol, UI system 302 may operate to further display a second incremental value of the first value symbol, and to subsequently display the first value symbol with a third displayed corresponding value equal to the second display corresponding value modified by the displayed second incremental value, as indicated at 730. As discussed, relative to FIGS. 4C-D, the value symbols may be updated multiple times during the multiple instances of the enhanced feature game. Thus, UI system 302 may control the display system to display increments to displayed value symbols in the manner described above.

Optionally, after multiple instances of the enhanced feature game, UI system 302 may operate to control the display system to present free spin instances subsequent to, or as part of, the enhanced feature game, as indicated at 732. For purposes of the present description, such additional free spin instances will be discussed as further instances of the enhanced feature game. However, the presentation of such free spin instances can be essentially the same as prior spins of the enhanced feature game. If the free spin instances are offered separate from the enhanced feature game, they may be presented with a different (third) set of display symbols.

Optionally, control of the display system to present the free spin instances may include displaying an on-screen menu for receiving a user input (which may be through the display, or through another mechanism such as mechanical or virtual buttons), after which input, a determined number of free spin instances may be identified to the player, as indicated at 734.

Figure 10B:
FIGS. 10A-10I are screenshots of example display screens as representative presentations of a base game and an enhanced feature game on a display system such as that of the EGM of FIG. 2A, and which may be presented to represent incremental displayed outcomes in accordance with the flow diagram of FIGS. 4A-4C, and/or the flowcharts of FIGS. 6A-6C or FIGS. 7A-7D.
Figure 10A:
Figure 10D:
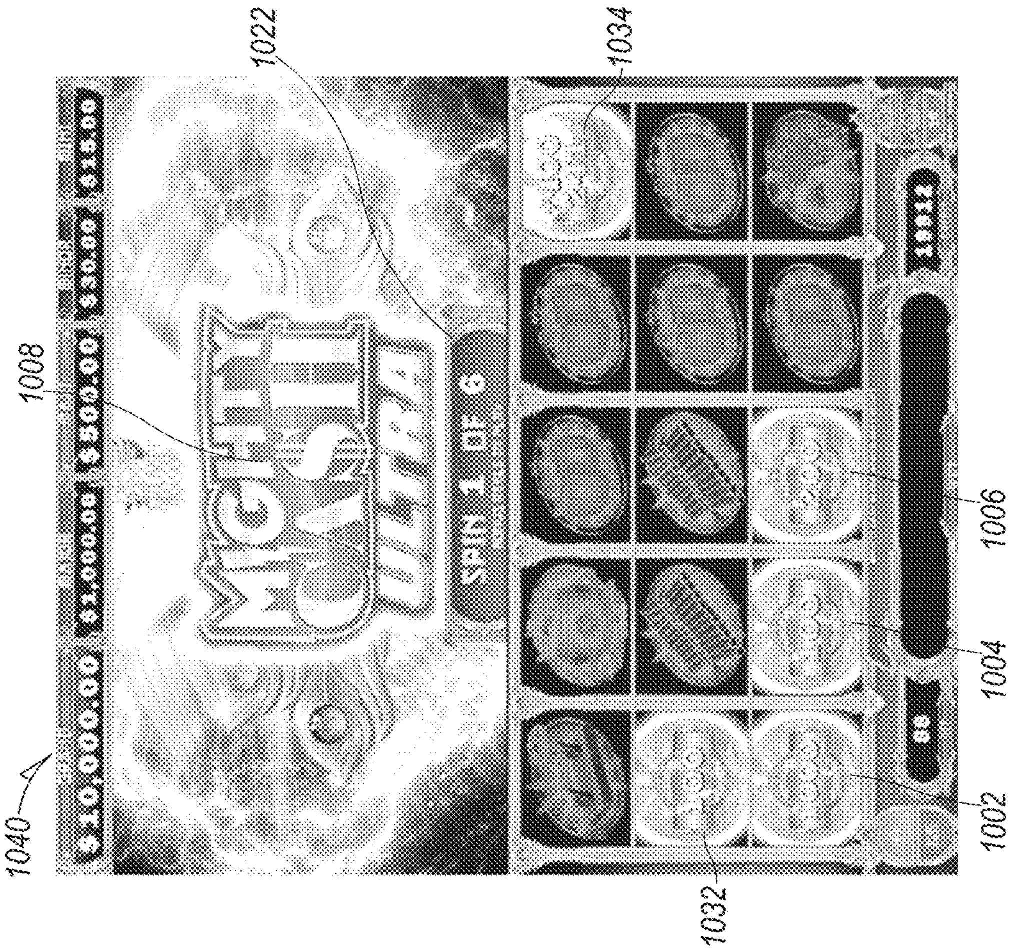
Figure 10C:
Figure 10E:
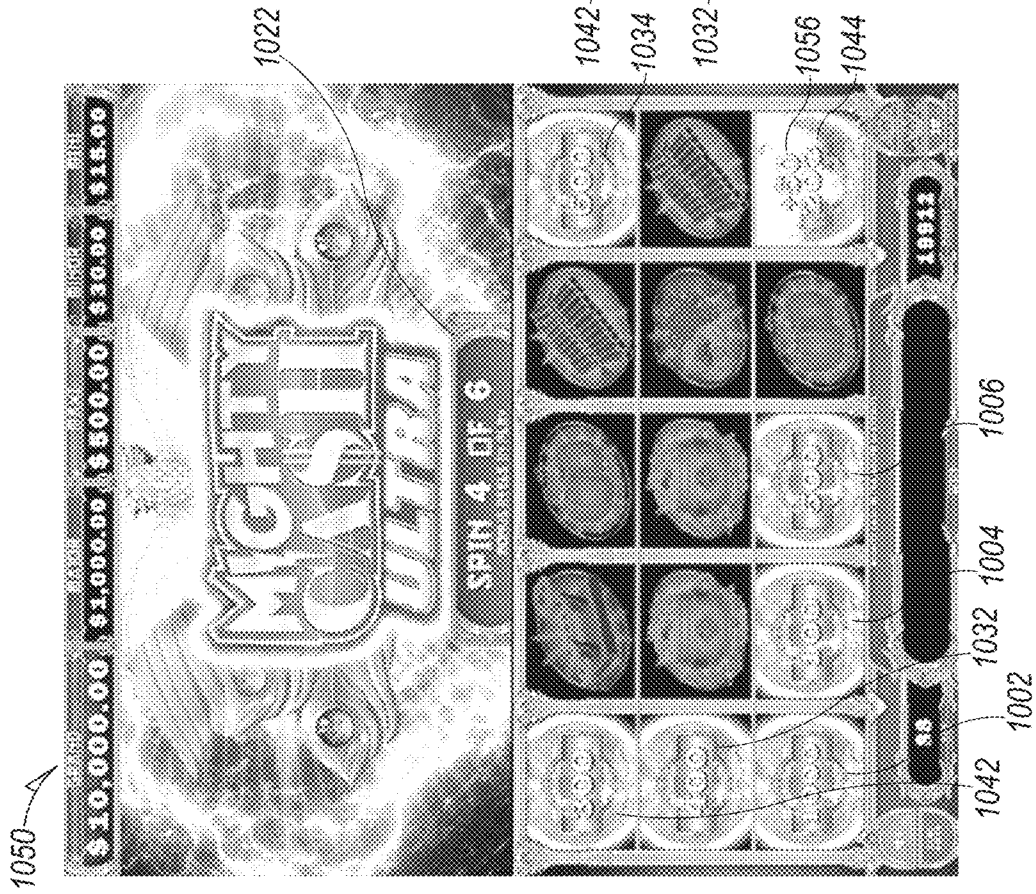
Figure 10F:
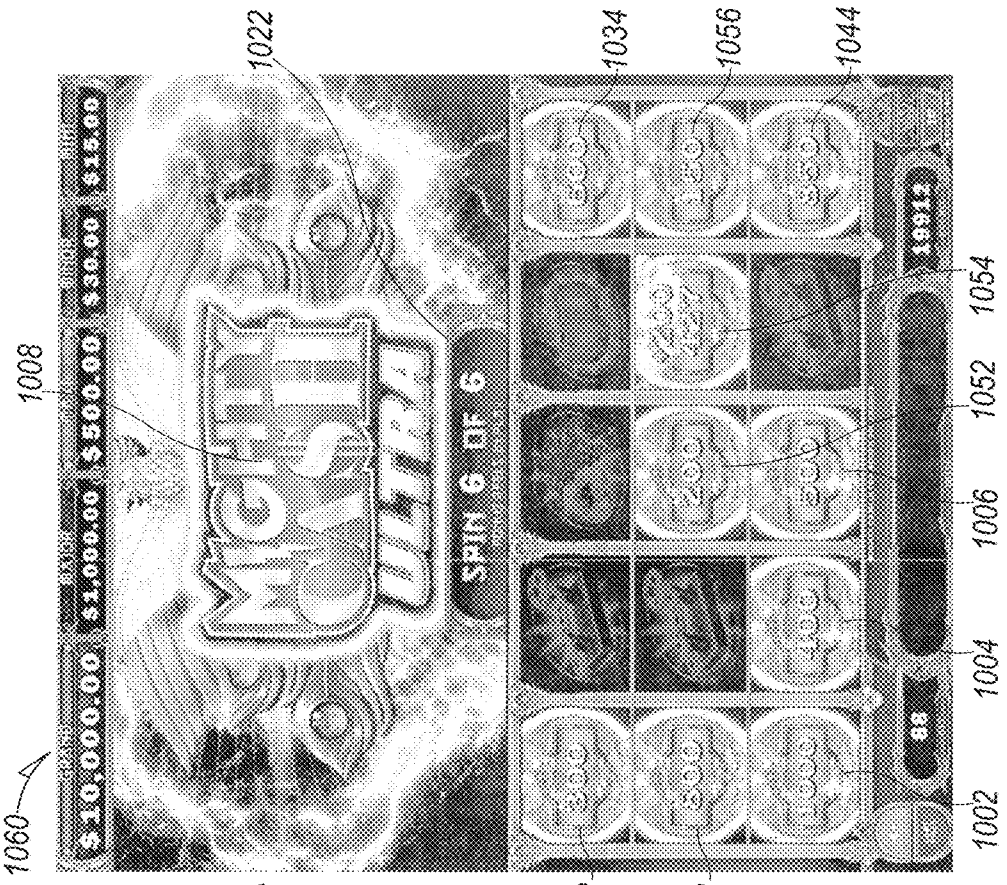
Figure 10H:
Figure 10G:
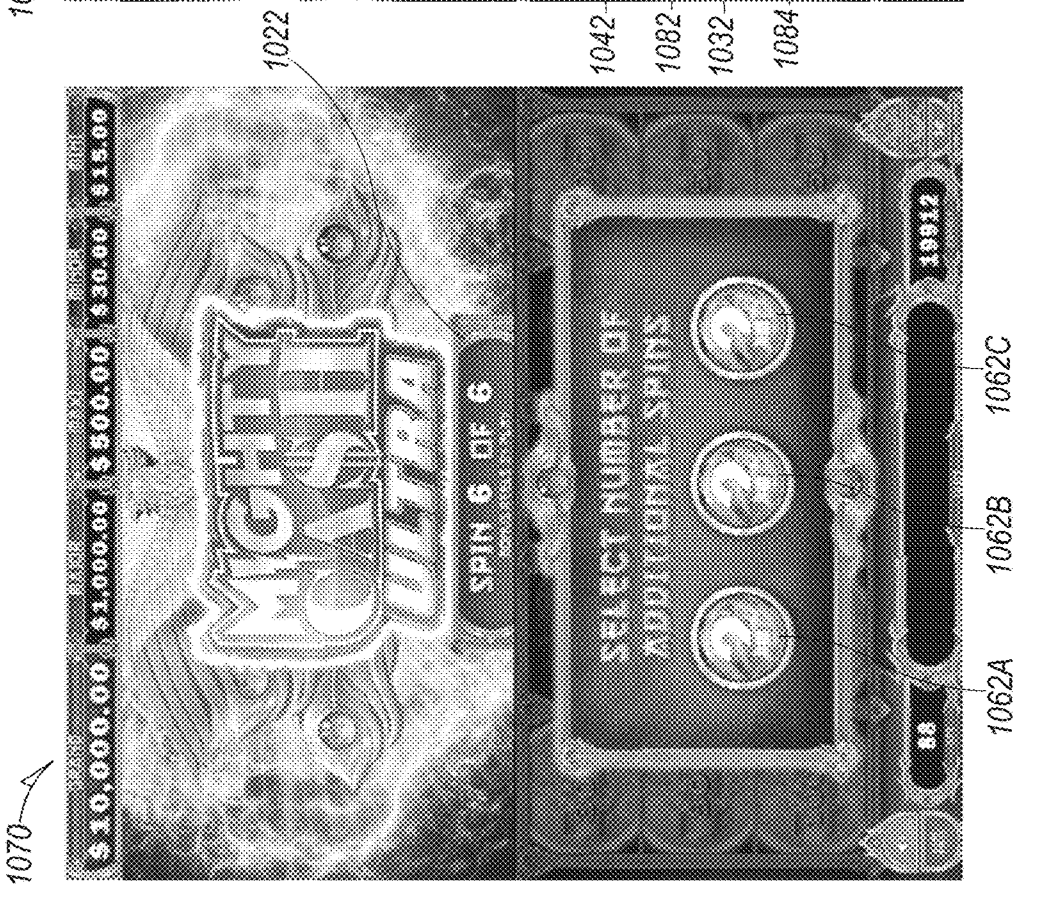
Figure 10I:
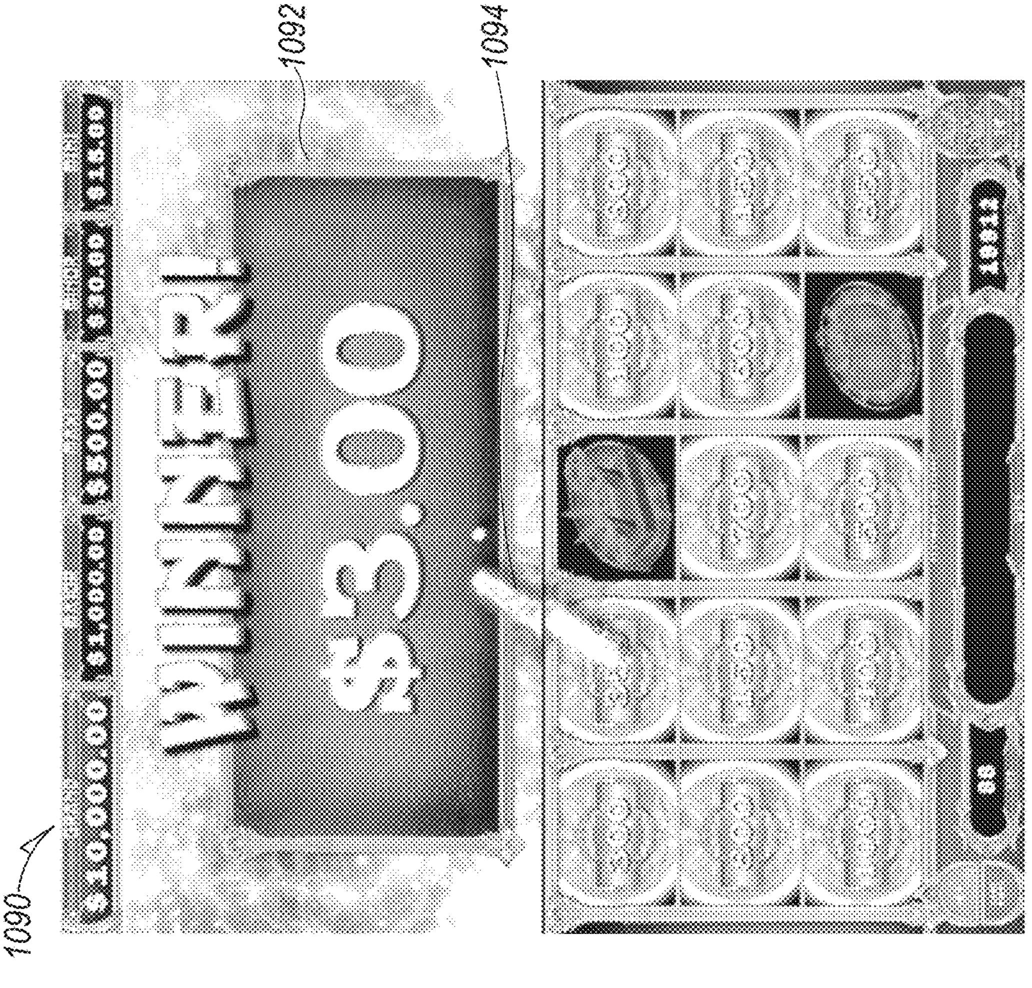

Optionally, after conclusion of all instances of the feature game, including any free spin instances, the display system may display collection of the corresponding values of all displayed value symbols into a cumulative value, as indicated at 736 (and as also depicted in FIG. 10I). Optionally, as indicated 738, collection of the corresponding values of the display value symbols may be represented by an animation depicting sequential collection of the values into the cumulative value (FIG. 10I). Further optionally, the collection of values from the displayed value symbols into the cumulative value may depict a translation of the values from units on the value symbols (points, credits, etc.) into a cumulative monetary value.

Referring now to FIG. 8, the figure depicts a block diagram example display screen 800 that may be used to present an enhanced feature game on a display system, for example primary game display 240, as described herein. Display screen 800 includes a reel display region 814 including a display matrix of individual display symbol positions. In some examples, each vertical column of display symbol positions, 808*a*-808*e* may represent a respective reel of display symbols. In other examples, each display symbol position may be associated with its own reel of display symbols.

Display screen 800 further includes a spin counter 812 to identify to a player which spin (instance) of the feature game is being conducted (or how many spins remain) which may be displayed during the feature game. In some examples, the instances of the feature game may have a predetermined number of instances (3, 4, 5, 6, etc.); and in some cases, may offer opportunities to acquire additional spins/instances as a result of the gameplay.

In selected examples, display screen 800 may include a metamorphic graphic image that changes in form, size and/or color during play of the feature game. Changes to the metamorphic graphic image may be generally associated with achieving objectives within the feature game. For example, metamorphic graphic image could be, for example, a pile or bowl of coins, or similar value image (chips, tokens, etc.), which grows in size or otherwise changes in character, as value symbols (or other configurable symbols) are displayed in instance outcomes. Presentation of such a metamorphic graphic image during the feature game, may be analogous to the previously discussed example of presenting a metamorphic graphic image as a transition from the base game to a feature game (FIGS. 10A-B). In other examples, a metamorphic graphic image may merely change appearance independent of gameplay, solely as entertainment to a player.

In the depicted example, display screen 800 includes regions to identify values of additional objectives, such as additional jackpots such as a Grand jackpot 802, a Major jackpot 804, a Minor jackpot 808, a Maxi jackpot 808 or a Mini jackpot 810. One or more of these additional jackpots may be linked jackpots which received contributions from multiple linked gaming machines, and in some examples any such linked to jackpots may be incremented based on turnover of the linked machines. Such linked jackpots may be a single site progressive (SSP), a multiple site progressive (MSP) or a wide area progressive (WAP). In some embodiments, a lower threshold of configurable symbols may be required for Major jackpot 804, a Minor jackpot 808, a Maxi jackpot 808 or a Mini jackpot 810 to be won. Alternatively, or additionally, Major, Minor, Maxi and Mini jackpots may be paid by assignment of those jackpots to one or more of the configurable symbols of the feature game. In some examples, there may be of further configurable symbol counter, reflecting a cumulative count of configurable symbols displayed in instance outcomes.

Figure 9A:
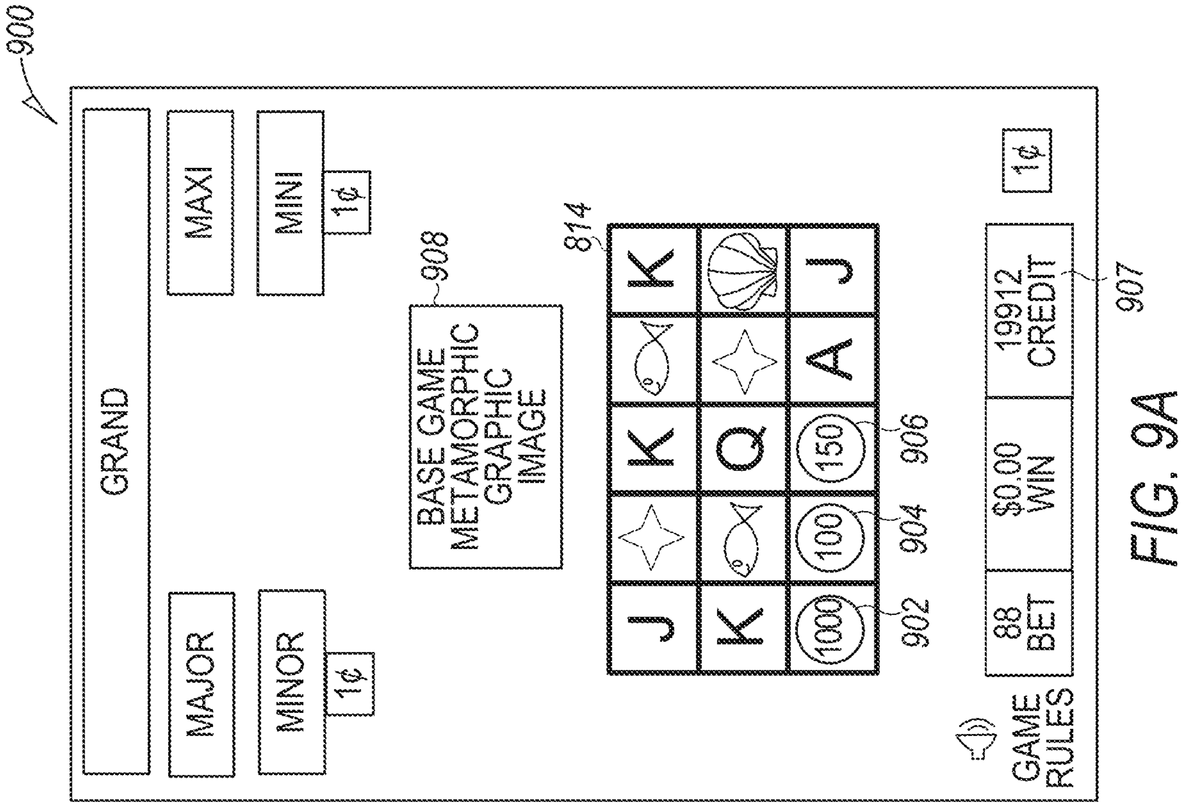
FIGS. 9A-9F are block representations of example display screens for presenting selected portions of a base game and of an enhanced feature game in accordance with various embodiments of the present disclosure.
Figure 9B:
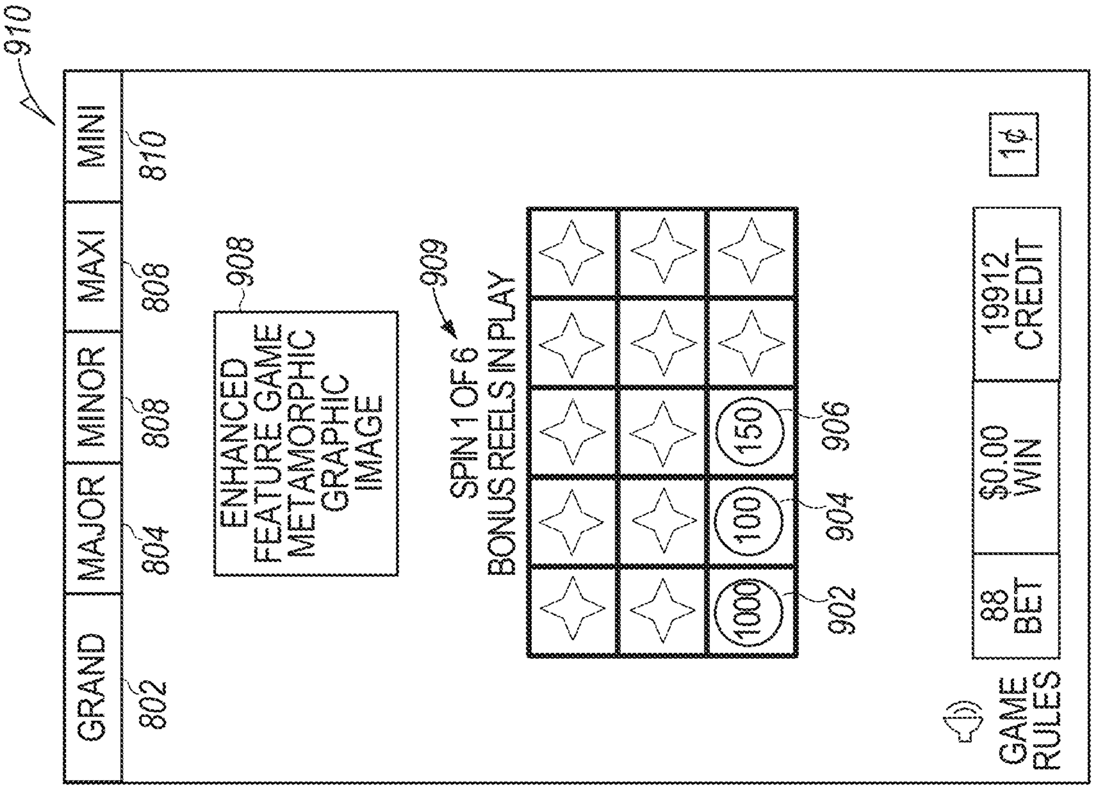
Figure 9D:
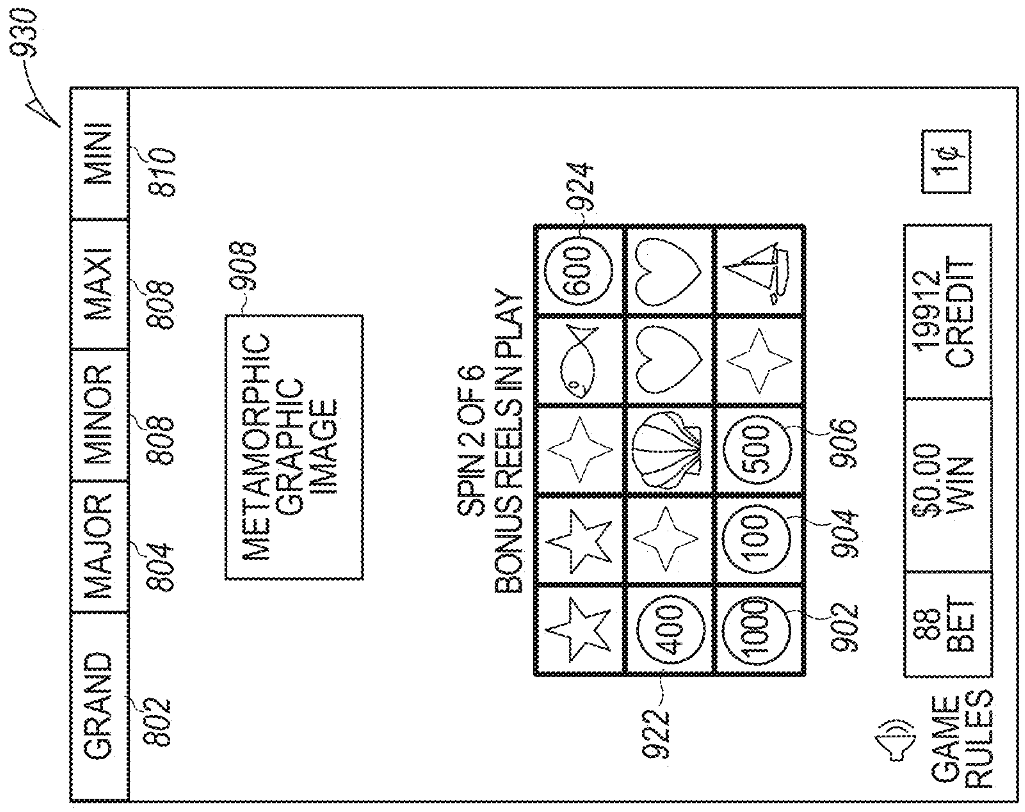
Figure 9C:
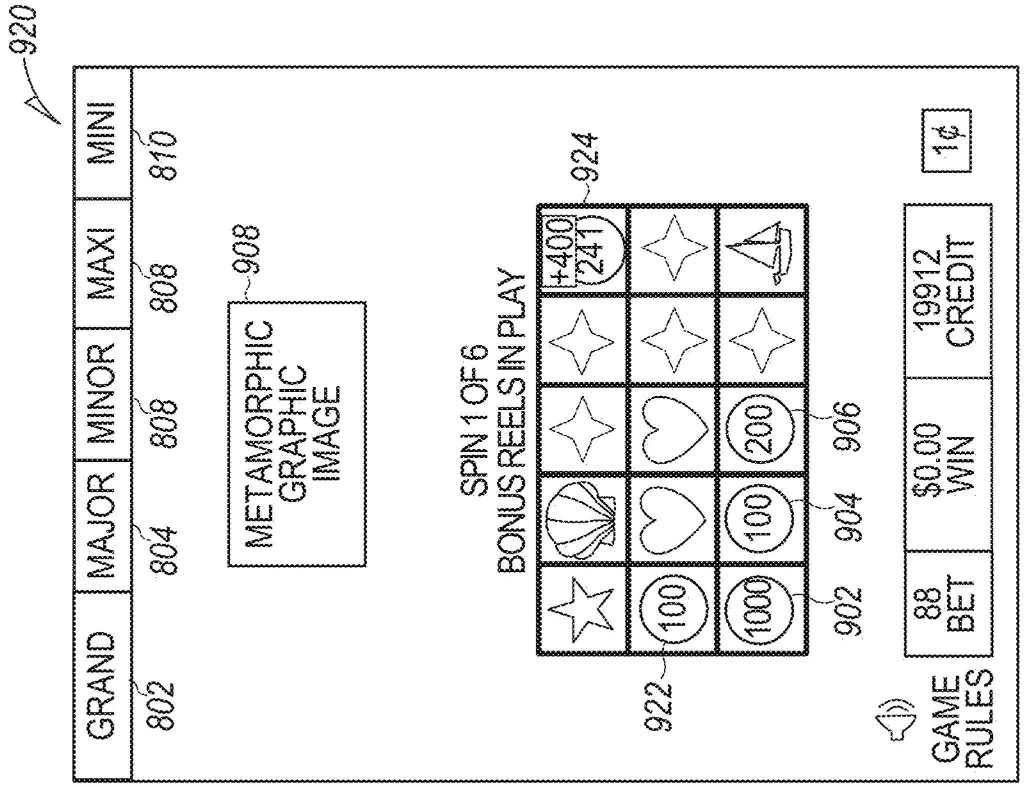
Figure 9F:
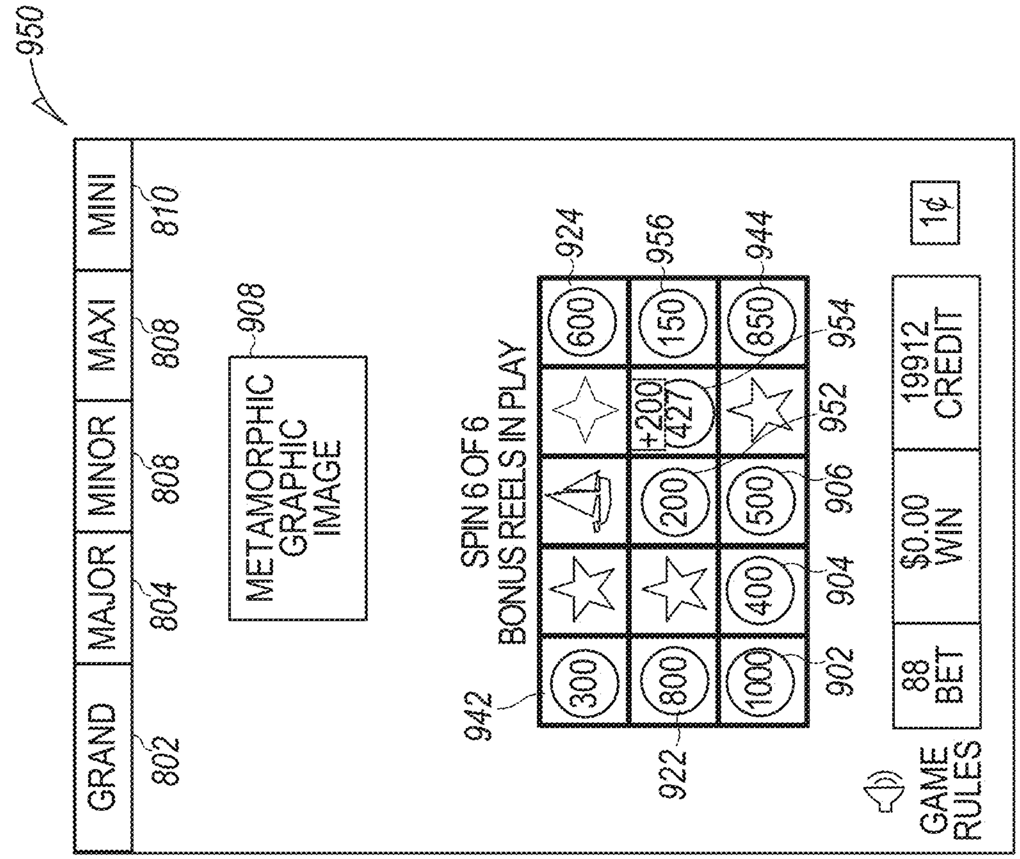
Figure 9E:
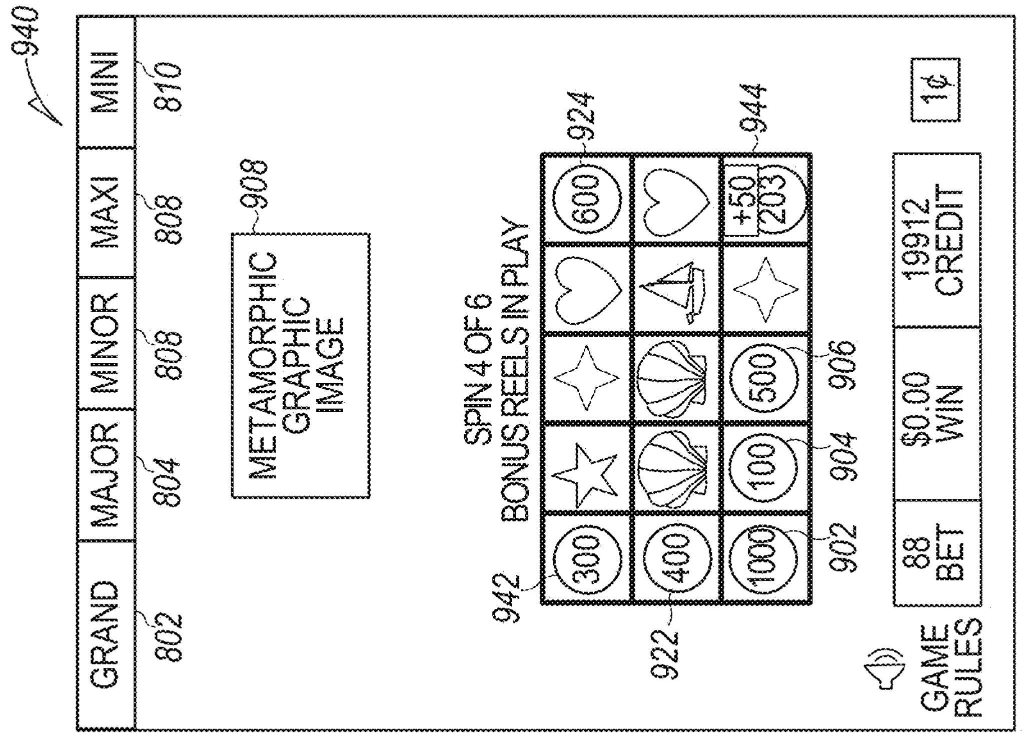

Referring now to FIGS. 9A-9F, the figures depict representations of example display screens that representative stages of a game in accordance with the flow diagram of FIG. 4, FIGS. 6A-C and/or FIGS. 7A-7D. FIG. 9A depicts a base game outcome screen 900 displaying a final outcome of a base game. In the base game outcome, three value symbols are displayed, symbol 902, with a corresponding value of 1000; symbol 904 with a corresponding value of 100; and symbol 906 with a corresponding value of 150. In the depicted example, one or more of displayed value symbols 902, 904 and/or 906, alone or in combination, establishes a trigger for an enhanced feature game, as discussed in more detail above relative to operation 414 of FIG. 4A. As discussed above, the depicted example base game outcome screen 900 includes a metamorphic graphic image 908, which may optionally be controlled, as previously described, to provide a graphic representation of the enhanced feature game having been triggered (See, FIGS. 10*a*-10B). The base game outcome screen may include a credit meter 907, identifying accumulated credits. A similar credit meter may be presented in screens of the enhanced feature game (depicted but not numbered).

FIG. 9B depicts an example display screen 910 early in a first instance of the enhanced feature game (as indicated by spin counter 909). Display screen 910 depicts the enhanced game reel display region 814, in which value symbols 902, 904, and 906 from base game outcome screen 900 have been replicated in their corresponding display positions. In display screen 910, other than these replicated value symbols, other symbol locations are spinning, as reflected by the uniform shapes at other symbol positions.

FIG. 9C depicts an example display screen 920 later within the first instance of the enhanced game. In addition to value symbols 902, 904, and 906, as a result of the spin of the first instance, additional value symbols 922 (with a value of 100) and 924 (in process of being incremented) have been displayed. Additionally, value symbol 906, previously having a corresponding value of 150, has been incremented to 200. New value symbol 924 had an initial corresponding value of 200. In the depicted example, the selected incremental value (400) is depicted superimposed over a portion of the original value, which is being incremented from the original value to a second corresponding value of 600 (as can be seen in FIG. 9D).

FIG. 9D depicts an example display screen 930 after the spin of the second instance of the feature game. In response to a determination to increment displayed value symbols by selected amounts, as discussed regarding operations 462 to 474 of FIGS. 4C-D, value symbol 922 has been incremented from 100 to 400, and value symbol 906 has been further incremented to a third corresponding value of 500 (from 150, by a first increment of 50; then from 200 with a second increment of 300). In contrast to the increments of value symbol 906: value symbol 924, received a first increment of 400; and value symbol 922 received a second increment of 300 (from 100 to 400). As previously described, these screens depict the previously-described uncertainty of a player as to which if any value symbols will be incremented, with the further uncertainty as to the amount of the increment, to further increase suspense of the player regarding achievement of the game objectives.

In further examples, FIG. 9E depicts example display screen 940, after a spin of the fourth instance, in which additional value symbols 942 and 944 have been displayed, and in which value symbol 944 is in process of being incremented by 50, as represented by the superimposed incremental value.

FIG. 9F depicts an example display screen 950, after the sixth, and in this instance, last spin in the feature game, in which new value symbols 952, 954 and 956 have been displayed, of which new value symbol 954 is in process of being incremented by 200. Additionally, value symbol 922 has been further incremented to 800 (from an original value of 100, then incremented by 300 to 400); and value symbol 944 has been further incremented to 850.

While FIGS. 9A-9F depict the enhanced feature game with 6 initial instances, other embodiments may have a different quantity of instances. For example, in another embodiment, the enhanced feature game may begin with a different quantity of instances, such as 3, and after each instance, where additional configurable symbols are selected for that instance outcome, the spin counter may reset to the initial instance count (in this case 3).

Referring now to FIGS. 10A-10I, the figures depict screenshots of example display screens during conclusion of a base game and during presenting of an enhanced feature game as discussed in references to FIGS. 4A-4D, 6A-C, 7A-D, and 9A-F. FIG. 10A depicts a screenshot of an example base game outcome screen 1000 in which one or more of displayed value symbols 1002, 1004 and 1006, results in establishing of a trigger condition for institution of a feature game, as discussed in reference to FIG. 9A. In some examples, this may be represented by a change in color, shape or other aspect of appearance of one or more displayed value symbols 1002, 1004 and 1006. The figure also depicts a metamorphic graphic image, in the example of a bowl of chips or tokens, indicated generally at 1008.

FIG. 10B depicts an example base game outcome screenshot 1010 displayed in response to triggering of an enhanced feature game. Screenshot 1010 depicts an example metamorphic graphic transition of the bowl of chips or tokens 1008, in this example depicting an overflow of the chips (etc.) from the bowl, suggesting distribution of the chips. As previously described, this metamorphic graphic can provide a transition from the base game to the (enhanced) feature game, visually advising the player of achievement of the feature game objective.

FIG. 10C depicts an example display screenshot 1030, corresponding to FIG. 9B, during a spin of the first instance of the enhanced feature game, and depicting the replication of value symbols 1002, 1004, and 1006, from base game screenshots 1000 and 1010, while reels are spinning relative to other display symbol positions. A spin counter 1022 is provided to identify the current spin of the enhanced feature game.

FIG. 10D depicts an example display screenshot 1040 corresponding to FIG. 9C, depicting updating the corresponding incremental value of value symbol 1034, and the display of new value symbol 1032.

FIG. 10E depicts an example display screenshot 1050 corresponding to FIG. 9D, depicting a fourth instance of the enhanced feature game, displaying new value symbols 1042, and 1044 (which is in process of being incremented, as evidenced by the superimposed increment amount—50—imposed over an initial value of 200.

FIG. 10F depicts an example display screenshot 1060 corresponding to FIG. 9E, depicting the end of the sixth, and last preestablished, instance of the enhanced feature game. Screenshot 1060 depicts new value symbols 1052, 1054, and 1056, in which value symbol 1054 is still being incremented. Additionally, as can also be seen, value symbol 1044 has been incremented from a value of 250 established in FIG. 10E, to 800.

FIGS. 10G-10I, depict example screenshot screenshots of a gameplay in which additional free spins may be added to the enhanced feature game (or offered in addition to the enhanced feature game), as discussed in reference to FIG. 7, at optional operations 732-738. FIG. 10G displays an example screenshot 1070 of a UI transition screen offering multiple selection options 1062A-1062C, to result in an additional spins. After a user selection, and the determining of an additional member of spins, which may be determined in response to a random value.

FIG. 10H depicts an example screenshot 1080 of a first free spin instance indicating that three additional spins have been provided (indicated by corresponding increment in the spin counter 1022, from "of 6" to "of 9"). As is apparent from the displayed incrementing (in progress) of value symbol 1034, the same selective incrementing of corresponding values of value symbols may continue in the free spin instances. Additionally, new value symbols 1082, 1084, and 1086 are displayed.

FIG. 10I depicts an example screenshot of an award screen 1090 in which values corresponding to the displayed value symbols may be accumulated in a total award region 1092. In the depicted representation, a flash animation 1094 (which in the example may be analogous to a comet or lightning bolt) may be depicted collection of the value of individual value symbols into the total award region, as the value of that value symbol is added to the total award. In the depicted example, as previously discussed, the accumulation of value symbol values includes translating the symbol values to monetary values.

In addition to the variations and alternatives of gameplay and user interfaces as described above many other features and alternatives may be included in addition to those described above. As just a few examples, in some embodiments, an enhanced award may be awarded if the display matrix is completely filled with configurable symbols during the hold and spin feature game (either the standard feature game or the enhanced feature game). For example, in some embodiments, the enhanced award may be a multiplier, such as a 2× or 3× multiplier of the "hold" symbols, or an award of a jackpot value.

In some embodiments, the enhanced award may be determined using a second valuation game. The second valuation game may be a second spinning wheel game that provides different and/or enhanced values from those used in the first spinning wheel game. For example, the second spinning wheel game may include multipliers (i.e. 2× or 3×) or multipliers with jackpots (i.e. 2×+Grand or 3×+Major).

In some embodiments, the base game symbol set comprises non-configurable symbols and feature trigger symbols. In some embodiments, either or both of the standard feature game and enhance feature game symbol sets may include configurable symbols and blank symbols.

In certain embodiments, each of the symbol positions the feature game matrix may be associated with an individual reel, with each reel a reel strip. Some of the reel strips may be common with other reels, or each reel may have a unique reel strip.

Those of ordinary skill in the art having the benefit of this disclosure will appreciate that a wide variety variations may be adopted in combination with the teachings of the present disclosure; such as, for example: (1) the number of configurable symbols required to trigger the feature game; (2) the number of feature games awarded; (3) number of decrements of feature game counter; (4) the number of configurable symbols that have to be displayed to win a prize or jackpot in the feature game; (5) the multiplier to apply; (6) the value of a mystery symbol; (7) the quantity of spins or "free spins"; (8) the prize value of any configurable symbols; (9) the number of increments or decrements of the progressive free spin counter; (10) the value of the multiplier on a multiplier symbol; (11) the value on the value symbols; (12) the number of extra reels. Additionally, unless identified otherwise, any determination or variable described or contemplated in the present disclosure may at least in part be (a) randomly determined; (b) predetermined; (c) determined based on a wager amount and/or level; (d) centrally determined; (e) determined based on a generated symbol or symbol combinations; (f) determined based on player selection; (g) determined based on player skill; (h) determined based on a side wager or ante bet; (i) determined based on a status of the player; (j) determined as a combination of two or more determinations disclosed herein; etc.

To better illustrate the methods and apparatuses described herein, a non-limiting set of example embodiments are set forth below as numerically identified Examples.

Example 1 is a gaming system, including: a player interface; a display system including one or more display devices; and a control system including one or more processors, the control system executing instructions which cause the control system to: determine a base game outcome and corresponding display symbols, the base game outcome including a feature game trigger event; in response to the feature game trigger event, initiate a feature game having multiple instances; control the display system to present the multiple instances of the feature game; for each instance of the feature game, determine an outcome and corresponding display symbols for the instance, the display symbols selected from a feature game symbol set including configurable symbols and non-configurable symbols, wherein the configurable symbols include value symbols having a corresponding value; control the display to present a respective array of display symbols as multiple reels of display symbols at a selected number of symbol positions on a display screen, wherein the value symbols are displayed with the corresponding value, control the display to present an interval of moving display symbols, and a subsequent display of display symbols fixed at respective symbol positions representing the determined outcome, and control the display system to hold each value symbol displayed at an outcome of the instance in the corresponding display symbol position for a subsequent instance of the feature game; in response to determining that the outcome for an instance includes one or more value symbols, determine whether to increase the corresponding value of the one or more value symbols; for each value symbol for which a determination is made to increment the corresponding value of the value symbol, determine whether a corresponding value of the individual value symbol was previously incremented, in response to such determination, select a first group of value increments from multiple groups of value increments; select a value increment from the selected first group of multiple value increments, and update the corresponding value of the first value symbol to a second corresponding value in accordance with the selected value increment.

In Example 2, the subject matter of Example 1 wherein the instructions which cause the control system to determine whether a corresponding value of a value symbol was previously incremented further cause the control system to determine a number of times a corresponding value of the value symbol was previously incremented.

In Example 3, the subject matter of any one or more of Examples 1-2 wherein the multiple groups of value increments are maintained as respective tiers in a weighted table, wherein each tier includes at least three value increments.

In Example 4, the subject matter of Example 3 wherein selecting a first group of value increments from multiple groups of value increments includes accessing a first tier of the weighted table when a corresponding value of a value symbol is incremented for the first time.

In Example 5, the subject matter of Example 4 wherein selecting a first group of value increments from multiple groups of value increments includes accessing a second tier of the weighted table when a corresponding value of a value symbol has been previously incremented at least once.

In Example 6, the subject matter of any one or more of Examples 3-5 wherein the weighted table includes at least one tier for each instance of the feature game.

In Example 7, the subject matter of Example 6 wherein the weighted table includes a greater number of tiers than the number of instances of the feature game.

In Example 8, the subject matter of any one or more of Examples 6-7 wherein progressively higher tiers of the weighted table are successively accessed in response to a greater number of prior increments of a corresponding value of a given value symbol.

In Example 9, the subject matter of any one or more of Examples 3-8 wherein selecting an incremental value includes accessing a tier of the weighted table, and wherein an incremental value from the accessed tier is selected in response to a random value assigned by the controller.

In Example 10, the subject matter of any one or more of Examples 1-9 optionally include controlling the display to: display each value symbol of an instance outcome at the same position during all subsequent instances of the feature game; and display the corresponding value of each value symbol, including any value increments to the value symbol during an instance before initiating a subsequent instance of the feature game.

Example 11 is a gaming device, including: a player interface; a display system including one or more display devices; and a control system including one or more processors, the control system executing instructions which cause the control system to: determine a base game outcome and corresponding display symbols, the display symbols selected from a base game symbol set; control the display system to present the base game outcome; determine that a first feature game trigger condition exists when the base game outcome includes at least one a first trigger symbol; in response to the first feature game trigger condition, initiate a first feature game including multiple instances; control the display system to present the first feature game; and wherein for each instance of the first feature game, the instructions executed by the control system will: determine an outcome and corresponding display symbols for the instance, the display symbols selected from a feature game symbol set including configurable symbols and non-configurable symbols, wherein multiple of the configurable symbols are value symbols having a respective corresponding value; control the display system to hold each displayed value symbol at its corresponding display symbol position for a subsequent instance of the first feature game; determine that an outcome of an instance of the first feature game includes at least a second trigger symbol establishing a second trigger condition, and in response to the second trigger condition initiate an enhanced feature game having multiple instances; control the display system to present the enhanced feature game; wherein for each instance of the enhanced feature game the instructions executed by the control system further cause the control system to, determine an outcome and corresponding display symbols for the instance, the display symbols selected from an enhanced feature game symbol set including configurable symbols and non-configurable symbols, wherein the configurable symbols include value symbols having respective corresponding values; control the display system to hold any displayed value symbol at its corresponding display symbol position for a subsequent instance of the enhanced feature game; in response to determining that the outcome for an instance includes at least at least a first value symbol, determine whether to increase the corresponding value of the first value symbol; and in response to a determination to increment the corresponding value of the first value symbol, determine whether a corresponding value of the first value symbol was previously incremented, in response to such determination, select a group including multiple possible value increments; select a value increment from the selected tier, and associate the selected value increment with the first value symbol.

In Example 12, the subject matter of Example 11 wherein the determination to initiate the enhanced feature game in response to the second trigger condition further initiates termination of the first feature game.

In Example 13, the subject matter of any one or more of Examples 11-12 wherein all value symbols in the instance of the first feature game outcome resulting in the second trigger condition are carried over to an initial instance of the enhanced feature game.

In Example 14, the subject matter of Example 13 wherein the value symbols carried over to the initial instance of the enhanced feature game are displayed in corresponding display positions to their positions in the preceding instance of the first feature game.

In Example 15, the subject matter of any one or more of Examples 11-14 wherein all value symbols carried over to the initial instance of the enhanced feature game maintain their corresponding value that existed at the end of the preceding instance of the first feature game.

In Example 16, the subject matter of any one or more of Examples 11-15 wherein one or more value symbols carried over to the initial instance of the enhanced feature game are associated with an incremented value at the start of the initial instance of the enhanced feature game.

Example 17 is a gaming device, including: a player interface; a display system including one or more display devices; and a control system including one or more processors, the control system executing instructions which cause the control system to: determine a base game outcome and corresponding display symbols, the display symbols selected from a base game symbol set; control the display system to present the base game outcome; determine that a first feature game trigger condition exists when the base game outcome includes at least a first trigger symbol; determine to initiate either a first feature game or an enhanced feature game, wherein both the first feature game and the second feature game include multiple instances; in response to a determination to initiate the enhanced feature game, control the display system to present the enhanced feature game; and wherein for each instance of the enhanced feature game, the instructions executed by the control system will: determine an outcome and corresponding display symbols for the instance, the display symbols selected from a feature game symbol set including configurable symbols and non-configurable symbols, wherein multiple of the configurable symbols are value symbols having a corresponding value; in response to determining that the outcome for an instance includes at least at least a first value symbol, determine whether to increase the corresponding value of the first value symbol; in response to determining to increment the corresponding value of the first value symbol, determine whether a corresponding value of the first value symbol was previously incremented, and in response to such determination, select a tier including multiple possible value increments; select a value increment from the selected tier, and associate the selected value increment with the first value symbol.

In Example 18, the subject matter of Example 17 wherein for each instance of the enhanced feature game, the instructions executed by the control system will: determine an outcome and corresponding display symbols for the instance, the display symbols selected from a feature game symbol set including configurable symbols and non-configurable symbols, wherein the configurable symbols include value symbols having a respective corresponding value; control the display system to hold each displayed value symbol at its corresponding display symbol position for all subsequent instances of the first feature game.

In Example 19, the subject matter of Example 18 optionally includes before determining to institute the enhanced feature game, determining to institute the first feature game.

In Example 20, the subject matter of Example 19 wherein during an instance of the first feature game, the instructions executed by the control system further cause the control system to: determine that a second feature game trigger condition exists when the first feature game outcome includes at least a second trigger symbol; determine to initiate the enhanced feature game in response to the second feature game trigger condition.

Example 21 is a method of presenting a player graphic interface for a gaming machine, including: executing instructions stored on one or more non-transitory storage media to display multiple instances of a base game and of a feature game on a display system of a gaming machine, the multiple instances of the base game and of the feature game displayed after respective user inputs to the gaming machine; wherein displaying each of the multiple instances of the base game, includes, displaying a respective array of first display symbols as multiple reels of display symbols and at a selected number of symbol positions on a display screen, wherein the first display symbols include both configurable symbols and non-configurable symbols, displaying the value symbols with the corresponding value, and displaying a period of moving symbols, followed by instance outcome having display symbols fixed at respective symbol positions; after a final instance of the base game, displaying a base game outcome including a trigger symbol; after display of the base game outcome including a trigger symbol, sequentially displaying multiple instances of a feature game on the display system of the gaming machine, wherein displaying each of the multiple instances of the feature game includes, displaying a respective array of second display symbols at the selected number of symbol positions on the display screen, wherein the second display symbols include both configurable symbols and non-configurable symbols, the configurable symbols including value symbols with a corresponding value, displaying value symbols with the respective corresponding value, and displaying a period of moving symbols, followed by instance outcome having display symbols fixed at respective symbol positions; during an instance of the feature game, displaying one or more value symbols at respective outcome positions of the selected number of symbol positions, and during all following instances of the feature game displaying the one or more value symbols at the same respective outcome position; during one instance of the feature game during which one or more value symbols is displayed, further displaying a first incremental value to a first displayed corresponding value of a first value symbol, and subsequently displaying the first value symbol with a second displayed corresponding value equal to the original displayed corresponding value modified by the first incremental value; during a subsequent instance of the feature game relative to the one instance, further displaying a second incremental value to the second displayed corresponding value of the first value symbol, and subsequently displaying the first value symbol with a third displayed corresponding value equal to the second displayed corresponding value modified by the displayed second incremental value.

In Example 22, the subject matter of Example 21 optionally includes after conclusion of all instances of the feature game, displaying a feature game outcome as an array of second display symbols at respective symbol locations, the displayed feature game outcome including one or more value symbols.

In Example 23, the subject matter of any one or more of Examples 21-22 wherein displaying the first incremental value to the first displayed corresponding value of the first value symbol includes displaying the first incremental value superimposed over the first value symbol for a time interval, and subsequently displaying the second displayed corresponding value of the first value symbol.

In Example 24, the subject matter of any one or more of Examples 22-23 optionally include sequentially collecting the corresponding value of each displayed value symbol of the feature game outcome into a cumulative award value.

In Example 25, the subject matter of Example 24 wherein the cumulative award value is displayed as a monetary value associated with the displayed corresponding value of each displayed value symbol of the feature game outcome.

In Example 26, the subject matter of any one or more of Examples 21-25 wherein all value symbols displayed at an outcome position of an instance of the feature game are replicated in a corresponding position in all subsequent instances of the feature game.

In Example 27, the subject matter of any one or more of Examples 22-26 optionally include after displaying the base game outcome, displaying one or more metamorphic graphic elements as a transition to displaying the multiple instances of the feature game.

In Example 28, the subject matter of Example 27 wherein the displaying of one or more metamorphic graphic elements is performed in response to identification of a feature game trigger condition in the base game outcome.

In Example 29, the subject matter of any one or more of Examples 21-28 wherein the multiple instances of the feature game comprise: an initially established number of feature game instances; and one or more free spin instances added to the initially established number of feature game instances.

In Example 30, the subject matter of Example 29 optionally includes after the initially established number of feature game instances: displaying a user interface associated with input regions of the display system presenting selections for additional free spin instances of the feature game; and after receiving a user input through the display system, displaying one or more additional free spin instances of the feature game.

In Example 31, the subject matter of any one or more of Examples 21-30 optionally include replicating all displayed value symbols of the displayed base game outcome in corresponding symbol positions in the initial instance of the feature game.

In Example 32, the subject matter of any one or more of Examples 21-31 optionally include after display of the base game outcome including a trigger symbol but before sequentially displaying multiple instances of a feature game on the display system, displaying a metamorphic graphic image transition to a first instance of the feature game.

Example 33 is a gaming device, including: a player interface; a display system including one or more display devices; and a control system including one or more processors, the control system executing instructions which cause the control system to: determine a base game outcome and corresponding display symbols, the display symbols selected from a base game symbol set; control the display system to present the base game outcome; determine that a first feature game trigger condition exists when the base game outcome includes at least one trigger symbol; control the display system to present a feature game having multiple instances; and for each instance of the feature game, determine an outcome and corresponding display symbols for the instance, the display symbols selected from a feature game symbol set including configurable symbols and non-configurable symbols, wherein the configurable symbols include value symbols, and wherein the determined outcome includes at least one value symbol; control the display system to display the corresponding display symbols for the instance outcome at respective display positions, including holding each displayed configurable symbol at its corresponding display symbol position for a subsequent instance of the feature game; in response to determining that the outcome for an instance includes at least a first value symbol having a corresponding value, determine whether to increase the corresponding value of at least the first value symbol; and in response to determining to increment the corresponding value of at least the first value symbol, determine whether a corresponding value of the at least the first value symbol was previously incremented, in response to such determination, select a first group of value increments from multiple groups of value increments; select a value increment from the selected first group of multiple value increments, and associate the selected value increment with the first value symbol.

In Example 34, the subject matter of Example 33 wherein each of the value symbols displays a value corresponding to that value symbol.

In Example 35, the subject matter of any one or more of Examples 33-34 wherein the instructions which cause the control system to determine whether a corresponding value of at least the first value symbol was previously incremented further cause the control system to determine a number of times a corresponding value of at least the first value symbol was previously incremented.

In Example 36, the subject matter of Example 35 wherein the instructions which cause the control system to select a first group of value increments further cause the control system to make the selection of the first group of value increments in response to a number of times at least the first value symbol was previously incremented.

In Example 37, the subject matter of any one or more of Examples 35-36 wherein the multiple groups of value increments each include at least two value increments, and wherein the at least two value increments in a group have unequal weighting of selection.

In Example 38, the subject matter of Example 37 wherein the multiple groups of value increments are represented as multiple tiers in a weighted table, and wherein each tier includes at least three value increments.

In Example 39, the subject matter of Example 38 wherein the weighted table includes at least one tier for each instance of the feature game.

In Example 40, the subject matter of any one or more of Examples 38-39 wherein the weighted table includes a greater number of tiers than the number of instances of the feature game.

In Example 41, the subject matter of any one or more of Examples 38-40 wherein tiers of the weighted table are successively accessed in response to the number of prior increments of a given value symbol.

In Example 42, the subject matter of Example 41 wherein the highest value increment within a tier of the weighted table is greater than the highest value increment within a lower tier of the weighted table.

In Example 43, the subject matter of any one or more of Examples 38-42 wherein the value increments in tiers of the weighted table are fixed value increments.

In Example 44, the subject matter of any one or more of Examples 38-43 wherein the value increments in the tiers of the weighted table are percentage of value increments.

In Example 45, the subject matter of any one or more of Examples 38-44 wherein the probability weighting between value increments in a first tier of the weighted table is different from the probability weighting between value increments in a second tier of the weighted table.

In Example 46, the subject matter of any one or more of Examples 33-45 wherein the instructions to control the display system to display the corresponding display symbols for the instance outcome further control the display system to display the selected value increment associated with at least the first value symbol for that instance.

In Example 47, the subject matter of any one or more of Examples 33-46 wherein the instructions to control the display system to display the corresponding display symbols for the instance outcome further control the display system to display the selected value increment superimposed over the corresponding value of the value symbol that existed at the start of the instance.

In Example 48, the subject matter of any one or more of Examples 46-47 wherein the instructions to control the display system to display the corresponding display symbols for the instance outcome, further control the display system to display the selected value increment associated with at least the first value symbol for that instance for selected period of time; and to further display the total incremented value associated with at least the first value symbol.

In Example 49, the subject matter of Example 48 wherein the instructions to control the display system to display the selected value increment associated with at least the first value symbol for that instance further control the display system to display each value symbol of the instance with the corresponding value as a result of the instance, before presenting a subsequent instance.

In Example 50, the subject matter of any one or more of Examples 33-49 wherein the instructions to control the display system further control the display system to: replace the trigger symbols of the base game with value symbols prior to the presentation of the feature game; and hold each displayed value symbol at its corresponding display symbol position for all instances of the feature game.

In Example 51, the subject matter of Example 50 wherein the instructions to control the display system to present multiple instances of the feature game further control the display system to hold each displayed value symbol during an instance of the feature game at its corresponding display symbol position for all subsequent instances of the feature game.

In Example 52, the subject matter of Example 51 wherein the instructions control the display system to present multiple instances of the feature game further control the display system to display, for each instance, the corresponding value of each displayed value symbol at the end of an instance during the spin of a subsequent instance.

In Example 53, the subject matter of any one or more of Examples 33-52 wherein the instructions to cause the control system to control the display system to present a feature game having multiple instances cause the display system to present a feature game having a fixed number of instances.

In Example 54, the subject matter of any one or more of Examples 33-53 wherein the instructions to cause the control system to control the display system to present a feature game having multiple instances cause the display system to present a feature game having at least three instances.

In Example 55, the subject matter of any one or more of Examples 33-54 wherein the instructions to cause the control system to determine that the first feature game trigger condition exists when the base game outcome includes at least one trigger symbol further cause the control system to determine that the first feature game trigger condition exists when the base game outcome includes at least one trigger symbol and at least one additional symbol.

In Example 56, the subject matter of any one or more of Examples 33-55 wherein the instructions to cause the control system to control the display system to display a base game outcome control the display system to present a first metamorphic graphic in response to the determination that the first feature game trigger condition exists.

In Example 57, the subject matter of any one or more of Examples 33-56 wherein the instructions to cause the control system to control the display system to display the feature game cause the display system to display at least nine symbol positions for each instance of the feature game.

In Example 58, the subject matter of Example 57 wherein the instructions to cause the control system to control the display system cause the display system to display at least fifteen symbol positions for each instance of the feature game.

In Example 59, the subject matter of Example 58 wherein multiple symbol display positions are associated with a single reel of configurable symbols and non-configurable symbols.

In Example 60, the subject matter of any one or more of Examples 58-59 wherein each displayed symbol position for each instance of the feature game is associated with a respective reel including configurable symbols and non-configurable symbols.

In Example 61, the subject matter of any one or more of Examples 33-60 wherein the base game outcome includes value symbols, and wherein the value symbols are carried over to an initial instance of the feature game.

In Example 62, the subject matter of Example 61 wherein the value symbols carried over to the initial instance of the feature game are displayed in corresponding display positions to their positions in the base game outcome.

In Example 63, the subject matter of Example 62 wherein all value symbols carried over to the initial instance of the feature game maintain their corresponding value that existed in the base game outcome.

In Example 64, the subject matter of any one or more of Examples 61-63 wherein one or more value symbols carried over to the initial instance of the feature game are associated with an incremented value relative to the value in the base game outcome.

In Example 65, the subject matter of any one or more of Examples 33-64 wherein the base game outcome wherein the instructions cause the control system to combine two or more value symbols of the base game outcome with one another into a unified value symbol at an initial instance of the feature game.

In Example 66, the subject matter of Example 65 wherein the unified value symbol has a corresponding value at least as great as the combination as the values of the two or more value symbols combined into that unified value symbol.

Example 67 is a method of operating a gaming device including a player interface, a display system including one or more display devices, and a control system including one or more processors and executing instructions which cause the control system to control game operations, including: determining a base game outcome and corresponding display symbols, the display symbols selected from a base game symbol set; controlling the display system to present the base game outcome; determining that a first feature game trigger condition exists when the base game outcome includes at least one trigger symbol; controlling the display system to present a feature game having multiple instances; and for each instance of the feature game, determining an outcome and corresponding display symbols for the instance, the display symbols selected from a feature game symbol set including configurable symbols and non-configurable symbols, the configurable symbols including value symbols having respective corresponding values; controlling the display system to display the corresponding display symbols for the instance outcome at respective display symbol positions, and to hold each displayed value symbol at its corresponding display symbol position for each remaining instance of the feature game; in response to determining that the outcome for an instance includes at least a first value symbol, determining whether to increase the corresponding value of at least the first value symbol; in response to determining to increment the corresponding value of at least the first value symbol, determining whether a corresponding value of the at least the first value symbol was previously incremented, and in response to such determination, select a first group of value increments from multiple groups of value increments; selecting a value increment from the selected first group of multiple value increments, and associating the selected value increment with the first value symbol.

In Example 68, the subject matter of Example 67 wherein displaying each value symbol includes displaying a value corresponding to that value symbol.

In Example 69, the subject matter of any one or more of Examples 67-68 wherein determining whether a corresponding value of at least the first value symbol was previously incremented further includes determining a number of times a corresponding value of at least the first value symbol was previously incremented.

In Example 70, the subject matter of Example 69 wherein selecting a first group of value increments includes selecting the first group of value increments in response to a number of times at least the first value symbol was previously incremented.

In Example 71, the subject matter of any one or more of Examples 69-70 wherein the multiple groups of value increments each include at least two value increments, and wherein the at least two value increments in a group have unequal weighting of selection.

In Example 72, the subject matter of Example 71 wherein the multiple groups of value increments are represented as multiple tiers in a weighted table, and wherein each tier includes at least three value increments.

In Example 73, the subject matter of Example 72 wherein the weighted table includes at least one tier for each instance of the feature game.

In Example 74, the subject matter of any one or more of Examples 72-73 wherein the weighted table includes a greater number of tiers than the number of instances of the feature game.

In Example 75, the subject matter of any one or more of Examples 72-74 wherein tiers of the weighted table are successively accessed in response to the number of prior increments of a given value symbol.

In Example 76, the subject matter of Example 75 wherein the highest value increment within a tier of the weighted table is greater than the highest value increment within a lower tier of the weighted table.

In Example 77, the subject matter of any one or more of Examples 72-76 wherein the value increments in tiers of the weighted table are fixed value increments.

In Example 78, the subject matter of any one or more of Examples 72-77 wherein the value increments in the tiers of the weighted table are percentage value increments.

In Example 79, the subject matter of any one or more of Examples 72-78 wherein the probability weighting between value increments in a first tier of the weighted table is different from the probability weighting between value increments in a second tier of the weighted table.

In Example 80, the subject matter of any one or more of Examples 67-79 optionally include for each instance, controlling the display system to display the selected value increment associated with at least the first value symbol for that instance.

In Example 81, the subject matter of Example 80 wherein controlling the display system to display the selected value increment associated with at least the first value symbol for that instance includes controlling the display system to display the selected value increment superimposed over the corresponding value of the value symbol displayed at the start of the instance for a selected period of time.

In Example 82, the subject matter of any one or more of Examples 80-81 wherein controlling the display system to display the selected value increment superimposed over the corresponding value of the value symbol displayed at the start of the instance further includes displaying during the selected period of time incremental increases of the value of the displayed value symbol up to the incremented corresponding value of the value symbol.

In Example 83, the subject matter of Example 82 optionally includes displaying each value symbol of the instance with the respective corresponding value as a result of the instance, before presenting a subsequent instance.

In Example 84, the subject matter of any one or more of Examples 67-83 wherein controlling the display system to display the base game outcome includes replacing the trigger symbols of the base game with replacement value symbols prior to the presentation of the feature game; and wherein controlling the display system to present a feature game having multiple instances includes holding each replacement value symbol at its corresponding displayed symbol position for all subsequent instances of the feature game.

In Example 85, the subject matter of any one or more of Examples 67-84 wherein controlling the display system to present a feature game having multiple instances includes controlling the display system to present a feature game having a fixed number of instances.

In Example 86, the subject matter of Example 85 wherein controlling the feature game having a fixed number of instances includes controlling the feature game to display free spin instances of the feature game in addition to the fixed number of instances.

In Example 87, the subject matter of any one or more of Examples 67-86 wherein controlling the display system to present a feature game having multiple instances includes controlling the display system to present a feature game having at least three instances.

In Example 88, the subject matter of any one or more of Examples 67-87 wherein determining that the first feature game trigger condition exists when the base game outcome includes at least one trigger symbol includes determining that the first feature game trigger condition exists when the base game outcome includes at least one trigger symbol and at least one additional symbol.

In Example 89, the subject matter of any one or more of Examples 67-88 optionally include controlling the display system to present a first metamorphic graphic image in response to the determination that the first feature game trigger condition exists.

In Example 90, the subject matter of any one or more of Examples 67-89 wherein controlling the display system to display the corresponding display symbols for the instance outcome at respective display symbol positions includes controlling the display system to display at least nine symbol positions for each instance outcome of the feature game.

In Example 91, the subject matter of Example 90 wherein controlling the display system to display the corresponding display symbols for the instance outcome at respective display symbol positions includes controlling the display system to display at least fifteen symbol positions for each instance outcome of the feature game.

In Example 92, the subject matter of Example 91 wherein multiple symbol display positions are associated with a single reel of configurable symbols and non-configurable symbols.

In Example 93, the subject matter of any one or more of Examples 91-92 wherein each displayed symbol position for each instance of the feature game is associated with a respective reel including configurable symbols and non-configurable symbols.

Example 94 is one or more non-transitory storage devices having instructions stored thereon wherein the instructions, when executed cause one or more devices to perform operations, including: determining a base game outcome and corresponding display symbols, the display symbols selected from a base game symbol set; controlling the display system of a gaming machine to present the base game outcome; determining that a first feature game trigger condition exists when the base game outcome includes at least one trigger symbol; controlling the display system of the gaming machine to present a feature game having multiple instances; and for each instance of the feature game, determining an outcome and corresponding display symbols for the instance, the display symbols selected from a feature game symbol set including configurable symbols and non-configurable symbols, wherein the configurable symbols include value symbols having a respective corresponding value; controlling the display system to display the corresponding display symbols for the instance outcome at respective display symbol positions, and to hold any displayed value symbol at its corresponding display symbol position for further instances of the feature game; in response to determining that the outcome for an instance of the feature game includes at least a first value symbol having a corresponding value, determining whether to increase the corresponding value of the first value symbol; in response to determining to increment the corresponding value of at least the first value symbol, determining whether a corresponding value at least the first value symbol was previously incremented, and in response to such determination, selecting a first group of value increments from multiple groups of value increments; selecting a value increment from the selected first group of multiple value increments; and associating the selected value increment with the first value symbol.

In Example 95, the subject matter of Example 94 wherein the operations include, for each of the value symbols, displaying a value corresponding to the value symbol.

In Example 96, the subject matter of any one or more of Examples 94-95 wherein the operation of determining whether a corresponding value of at least the first value symbol was previously incremented further includes determining a number of times a corresponding value of at least the first value symbol was previously incremented.

In Example 97, the subject matter of Example 96 wherein the operation of selecting a first group of value increments is performed in response to a determined number of times at least the first value symbol was previously incremented.

In Example 98, the subject matter of any one or more of Examples 96-97 wherein the multiple groups of value increments each include at least two value increments, and wherein the at least two value increments in a group have unequal weighting of selection.

In Example 99, the subject matter of Example 98 wherein the multiple groups of value increments are represented as multiple tiers in a weighted table, and wherein each tier includes at least three value increments.

In Example 100, the subject matter of Example 99 wherein the weighted table includes at least one tier for each instance of the feature game.

In Example 101, the subject matter of any one or more of Examples 99-100 wherein the weighted table includes a greater number of tiers than the number of instances of the feature game.

In Example 102, the subject matter of any one or more of Examples 99-101 wherein tiers of the weighted table are successively accessed in response to the number of prior increments of a given value symbol.

In Example 103, the subject matter of Example 102 wherein the highest value increment within a tier of the weighted table is greater than the highest value increment within a lower tier of the weighted table.

In Example 104, the subject matter of any one or more of Examples 99-103 wherein the value increments in tiers of the weighted table are fixed value increments.

In Example 105, the subject matter of any one or more of Examples 99-104 wherein the value increments in the tiers of the weighted table are percentage value increments.

In Example 106, the subject matter of any one or more of Examples 99-105 wherein the probability weighting between value increments in a first tier of the weighted table is different from the probability weighting between value increments in a second tier of the weighted table.

In Example 107, the subject matter of any one or more of Examples 94-106 wherein the operations further comprise, for each instance of the feature game, controlling the display system to display the selected value increment associated with at least the first value symbol for that instance.

In Example 108, the subject matter of any one or more of Examples 94-107 wherein the operations comprise, for each instrument of the feature game, controlling the display system to display a value of the selected value increment superimposed over the corresponding value of the value symbol at the start of the instance.

In Example 109, the subject matter of any one or more of Examples 107-108 optionally include the operations further comprise, for each instance of the feature game, controlling the display system to display the selected value increment associated with at least the first value symbol for that instance for selected period of time; and further displaying the total incremented value associated with at least the first value symbol.

In Example 110, the subject matter of Example 109 wherein the operations further comprise, for each instance of the feature game, controlling the display system to display each value symbol of the instance with a corresponding value as a result of the instance, before presenting a subsequent instance.

In Example 111, the subject matter of any one or more of Examples 94-110 wherein the operations further comprise controlling the display system to: replace the trigger symbols of the base game with value symbols prior to the presentation of the feature game; and hold each displayed value symbol at its corresponding display symbol position for all instances of the feature game.

In Example 112, the subject matter of Example 111 wherein the operations further comprise, for each instance of the feature game, controlling the display system to hold each displayed value symbol during an instance of the feature game at its corresponding display symbol position for all subsequent instances of the feature game.

In Example 113, the subject matter of Example 112 wherein the operations further comprise controlling the display system to display, for each instance of the feature game, the corresponding value of each displayed value symbol at the end of the instance during a spin of the following subsequent instance.

In Example 114, the subject matter of any one or more of Examples 94-113 wherein the operation of controlling the display system to present a feature game having multiple instances further includes controlling the display system to present a feature game having a fixed number of instances.

In Example 115, the subject matter of any one or more of Examples 94-114 wherein the operation of controlling the display system to present a feature game having multiple instances includes controlling the display system to present a feature game having at least three instances.

In Example 116, the subject matter of any one or more of Examples 94-115 wherein the operation of determining that the first feature game trigger condition exists when the base game outcome includes at least one trigger symbol includes determining that the first feature game trigger condition exists when the base game outcome includes at least one trigger symbol and at least one additional symbol.

In Example 117, the subject matter of any one or more of Examples 94-116 wherein the operations further comprise controlling the display system to display a first metamorphic graphic image in response to the determination that the first feature game trigger condition exists.

In Example 118, the subject matter of any one or more of Examples 94-117 wherein the operation of controlling the display system to display multiple instances of the feature game includes controlling the display system to display at least nine symbol positions for each instance of the feature game.

In Example 119, the subject matter of Example 118 wherein the operation of controlling the display system to display multiple instances of the feature game includes controlling the display system to display at least at least fifteen symbol positions for each instance of the feature game.

In Example 120, the subject matter of Example 119 wherein multiple symbol display positions are associated with a single reel of configurable symbols and non-configurable symbols, and wherein multiple reels of configurable symbols and non-configurable symbols are displayed.

In Example 121, the subject matter of any one or more of Examples 119-120 wherein each displayed symbol position for each instance of the feature game is associated with a respective reel including configurable symbols and non-configurable symbols.

In Example 122, any of the gaming apparatus of any of Examples 1-20 and Examples 33-66, may incorporate structures or functionality of any other of such Examples.

In Example 123, any of the gaming apparatus of any of Examples 1-20 and Examples 33-66 may further contain structure and/or stored instructions to perform any of the methods of Examples 21-32 and 67-93.

In Example number 124, any of the gaming apparatus of any of Examples 1-20 or Examples 33-66 may contain structure and/or stored instructions to display the user interface in accordance with any one or more of Examples 21-32.

In Example 125, any of the methods of displaying a user interface of Examples 21-32 may be implemented to display the subject user interface on any of the gaming apparatus of any of Examples 1-20 and 33-66.

In Example 126, any of the non-transitory storage devices of any of Examples 94-121 may further include instructions which when executed perform any of the methods of Examples 21-32 and 67-93.

In Example 127, any of the non-transitory storage devices of any of the Examples 94-121 may further include instructions to provide any functionality of any of the gaming apparatus of Examples 1-20 and Examples 33-66.

While the invention has been described with respect to the figures it will be appreciated that many modifications and changes may be made by those skilled in the art without departing from the spirit of the invention. Any variation and derivation from the above description and figures are included in the scope of the present invention as defined by the claims.

What is claimed is:

1. A gaming device, comprising:
- one or more display devices; and
- one or more processors, wherein execution of instructions by the one or more processors causes the one or more processors to:
- present a base game outcome via the one or more display devices;
- trigger a feature game based on configurable symbols in the base game outcome, wherein each configurable symbol is a value symbol that displays a respective numeric prize value;
- combine two or more value symbols of the base game outcome with one another into a unified value symbol at an initial instance of the feature game, thereby opening one or more display symbol positions;
- present a feature game outcome comprising symbols via the one or more display devices, wherein each configurable symbol of the feature game outcome is a value symbol that displays a respective numeric prize value;
- for each configurable symbol in the presented feature game outcome, randomly determine whether a respective configurable symbol is to be enhanced based on a weighted table that accounts for whether the respective configurable symbol has been previously enhanced; and
- in response to determining to enhance the respective configurable symbol:
  - randomly select, for the respective configurable symbol, a group of value increments from multiple groups of value increments such that a probability of each group of value increments is dependent upon a weighting associated with each group of value increments, wherein the group of value increments is also selected from the multiple groups of value increments based on weightings dynamically associated with the multiple groups;
  - randomly select, for the respective configurable symbol independently from any value increment selected for other configurable symbols, a value increment from the group of value increments selected for the respective configurable symbol; and
  - enhance the respective configurable symbol by incrementing its respective numeric prize value by the value increment independently selected for the respective configurable symbol.

2. The gaming device of claim 1, wherein execution of the instructions causes the one or more processors to select the value increment from the group of value increments based on weightings associated with the value increments of the group.

3. The gaming device of claim 1, wherein execution of the instructions causes the one or more processors to select the group of value increments from multiple groups of value increments based on predefined weights assigned to each group of value increments.

4. The gaming device of claim 1, wherein execution of the instructions causes the one or more processors to select the group of value increments from multiple groups of value increments based on a number of times the respective configurable symbol has been previously enhanced.

5. The gaming device of claim 1, wherein execution of the instructions causes the one or more processors to present the value increment selected for the respective configurable symbol and the numeric prize value of the respective configurable symbol for a period of time before presenting an incremented numeric prize value of the respective configurable symbol.

6. The gaming device of claim 1, wherein execution of the instructions causes the one or more processors to present an update of the numeric prize value of the respective configurable symbol that includes one or more intermediary numeric prize values as the numeric prize value is increased to its incremented numeric prize value.

7. The gaming device of claim 1, wherein execution of the instructions causes the one or more processors to:

hold any configurable symbols in the feature game outcome at their respective display positions for each spin in an initial quantity of spins; and for each configurable symbol in the presented feature game outcome after each spin, determine whether the respective configurable symbol is to be enhanced; and in response to determining to enhance the respective configurable symbol, select a value increment from a group of value increments, and increment a numeric prize value presented by the respective configurable symbol per the value increment selected for the respective configurable symbol.

8. A method of a gaming system, the method comprising:

presenting a base game outcome via one or more display devices;

triggering a feature game based on configurable symbols in the base game outcome, wherein each configurable symbol is a value symbol that displays a respective numeric prize value;

combining two or more value symbols of the base game outcome with one another into a unified value symbol at an initial instance of the feature game, thereby opening one or more display symbol positions; and for each spin of the feature game, holding any configurable symbols in a feature game outcome and replacing other symbols in the feature game outcome;

randomly determining whether a respective configurable symbol in the feature game outcome is to be enhanced based on a weighted table that accounts for whether the respective configurable symbol has been previously enhanced; and in response to determining to enhance the respective configurable symbol:

randomly selecting, for the respective configurable symbol, a group of value increments from multiple groups of value increments such that a probability of each group of value increments is dependent upon a weighting associated with each group of value increments, wherein the group of value increments is also selected from the multiple groups of value increments based on weightings dynamically associated with the multiple groups;

independently selecting, for the respective configurable symbol independently from any value increment selected for other configurable symbols, a value increment for the respective configurable symbol from a group of value increments; and incrementing the respective numeric prize value per the value increment independently selected for the respective configurable symbol from the group of value increments.

9. The method of claim 8, comprising selecting the value increment from the group of value increments based on weightings associated with the value increments of the group.

10. The method of claim 8, comprising selecting the group of value increments from multiple groups of value increments.

11. The method of claim 8, comprising selecting the group of value increments from multiple groups of value increments based on a number of times the respective configurable symbol has been previously enhanced.

12. The method of claim 8, comprising selecting to select the group of value increments from multiple groups of value increments based on weightings associated with the multiple groups.

13. The method of claim 8, comprising presenting, via the one or more display devices, a value increment and the numeric prize value of the respective configurable symbol for a period of time before presenting an incremented numeric prize value of the respective configurable symbol.

14. The method of claim 8, comprising presenting, via the one or more display devices, an update of the numeric prize value of the respective configurable symbol that includes one or more intermediary numeric prize values as the numeric prize value is increased to its incremented numeric prize value.

15. A non-transitory computer readable storage medium comprising instructions which, in response to being executed, cause a device to:

present a first phase outcome comprising symbols via one or more display devices; and present a second phase outcome of a second phase via the one or more display devices, wherein the second phase outcome includes any configurable symbols of the first phase outcome, and wherein each configurable symbol is a value symbol that displays a numeric value;

combining two or more value symbols of the first phase outcome with one another into a unified value symbol at an initial instance of the second phase, thereby opening one or more display symbol positions; and for each configurable symbol in the second phase outcome, randomly determine whether a respective configurable symbol is to be enhanced based on a weighted table that accounts for whether the respective configurable symbol has been previously enhanced; and in response to determining to enhance the respective configurable symbol:

randomly select, for the respective configurable symbol, a group of value increments from multiple groups of value increments such that a probability of each group of value increments is dependent upon a weighting associated with each group of value increments, wherein the group of value increments is also selected from the multiple groups of value increments based on weightings dynamically associated with the multiple groups;

select a value increment independently for the respective configurable symbol from the group of value increments selected for the respective configurable symbol; and increment the respective numeric value displayed by respective configurable symbol per the value increment independently selected for the respective configurable symbol.

16. The non-transitory computer readable storage medium of claim 15, wherein the instructions, in response to being executed, cause the device to select the value increment from the group of value increments based on weightings associated with the value increments of the group.

17. The non-transitory computer readable storage medium of claim 15, wherein the instructions, in response to being executed, cause the device to select the group of value increments from multiple groups of value increments.

18. The non-transitory computer readable storage medium of claim 15, wherein the instructions, in response to being executed, cause the device to select the group of value increments from multiple groups of value increments based on a number of times the respective configurable symbol has been previously enhanced and weightings associated with the multiple groups.

19. The non-transitory computer readable storage medium of claim 15, wherein the instructions, in response to being executed, cause the device to:

hold any configurable symbols in the second phase outcome for each spin in an initial quantity of spins; and for each configurable symbol in the second phase outcome after each spin:

select a second group of value increments;

select a second value increment from the second group of value increments; and increment the numeric value presented by the respective configurable symbol per the second value increment.

* * * * *